(12) United States Patent
Otsuchi et al.

(10) Patent No.: US 6,629,462 B2
(45) Date of Patent: Oct. 7, 2003

(54) ACCELERATION SENSOR, AN ACCELERATION DETECTION APPARATUS, AND A POSITIONING DEVICE

(75) Inventors: Tetsuro Otsuchi, Osaka (JP); Takafumi Koike, Moriguchi (JP); Fumihiko Taniguchi, Kyotanabe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/908,635

(22) Filed: Jul. 20, 2001

(65) Prior Publication Data

US 2002/0011111 A1 Jan. 31, 2002

(30) Foreign Application Priority Data

Jul. 24, 2000 (JP) ..................................... P2000-222444

(51) Int. Cl.[7] ............................. G01P 15/09; H01L 41/02
(52) U.S. Cl. ..................................... 73/514.34; 310/331
(58) Field of Search .......................... 73/514.34, 514.35, 73/514.36, 514.16, 504.12, 504.15; 310/329, 331, 332; 360/103, 106, 109, 104

(56) References Cited

U.S. PATENT DOCUMENTS

| | | | |
|---|---|---|---|
| 4,431,935 A | * | 2/1984 | Rider .......................... 310/331 |
| 4,996,878 A | | 3/1991 | Kübler |
| 5,233,256 A | * | 8/1993 | Hayashi et al. .............. 310/332 |
| 5,597,954 A | * | 1/1997 | Nakamura ................ 73/504.03 |
| 5,763,982 A | * | 6/1998 | Tabota et al. ................ 310/332 |
| 6,263,734 B1 | * | 7/2001 | Fujii et al. ................ 73/514.34 |

FOREIGN PATENT DOCUMENTS

| | | | |
|---|---|---|---|
| EP | 768532 | * | 4/1997 |
| JP | 55-018959 | | 2/1980 |
| JP | 10-096742 | | 4/1998 |
| JP | 11-101816 | | 4/1999 |
| JP | 2000-171480 | | 6/2000 |
| JP | 2001-014782 | | 1/2001 |

* cited by examiner

Primary Examiner—Helen Kwok
(74) Attorney, Agent, or Firm—Wenderoth, Lind & Ponack, L.L.P.

(57) ABSTRACT

An acceleration sensor housed in a confined space can detect rotational acceleration with great accuracy. The acceleration sensor has first and second piezoelectric elements with electrodes for outputting a charge produced by strain deformation. Each of the first and second piezoelectric elements has at least one piezoelectric body and a support block for supporting the piezoelectric body. The electrodes are provided on opposite sides of the piezoelectric body. One surface of the first piezoelectric element and one surface of the second piezoelectric element are substantially parallel to each other.

39 Claims, 43 Drawing Sheets

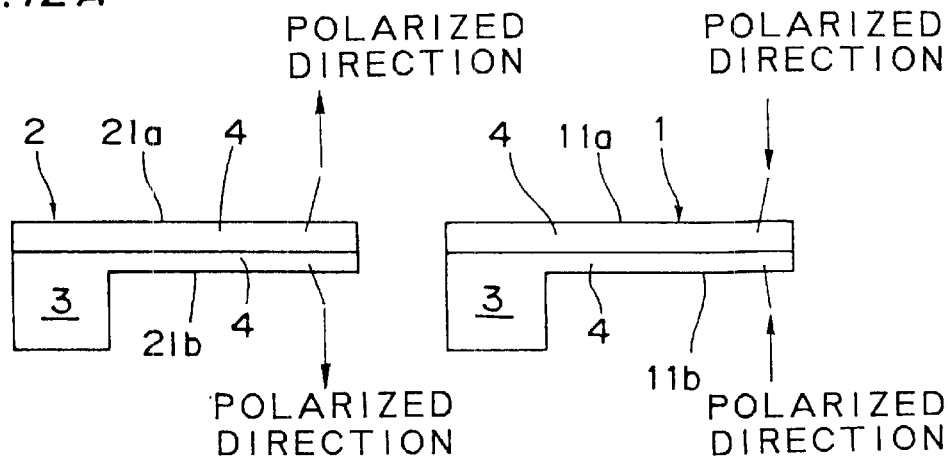
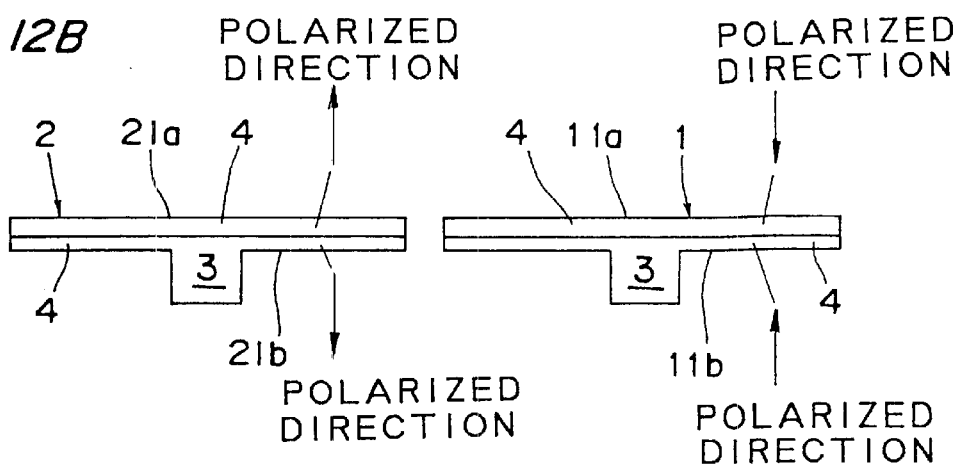
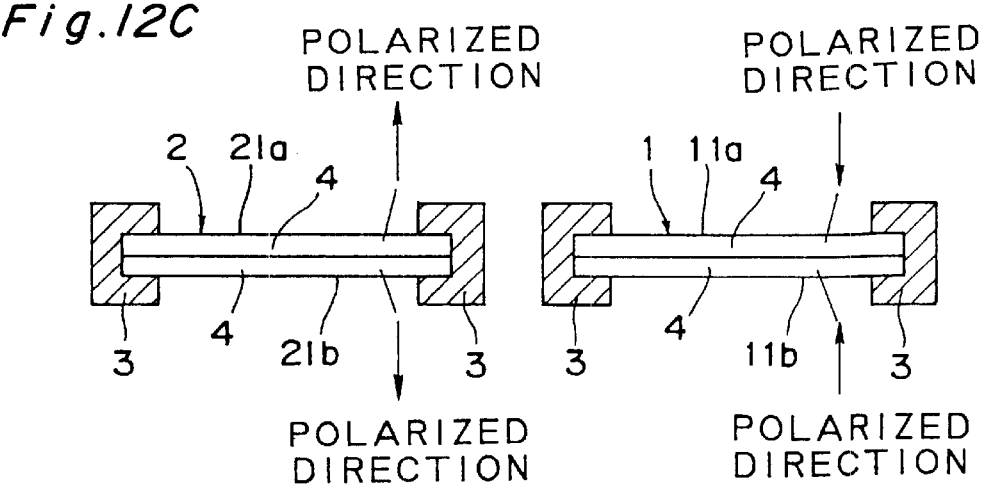

ACCELERATION

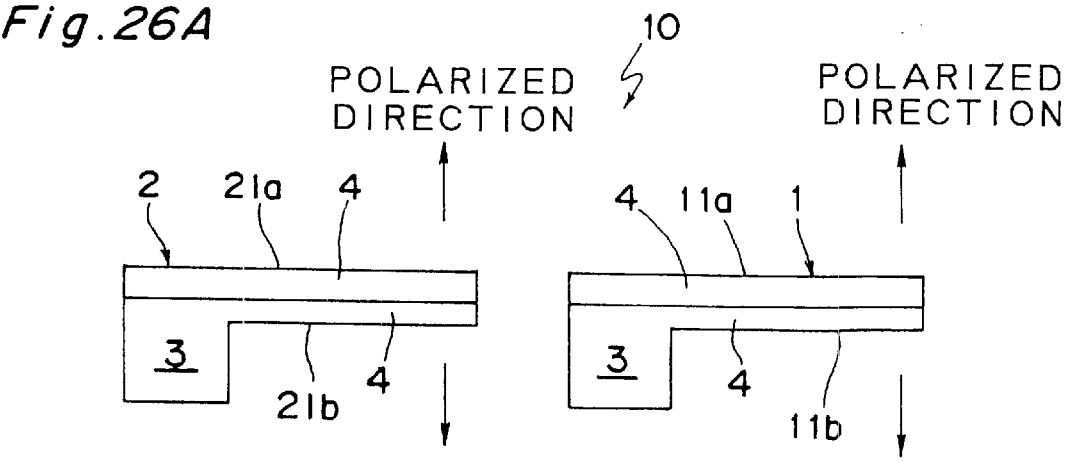
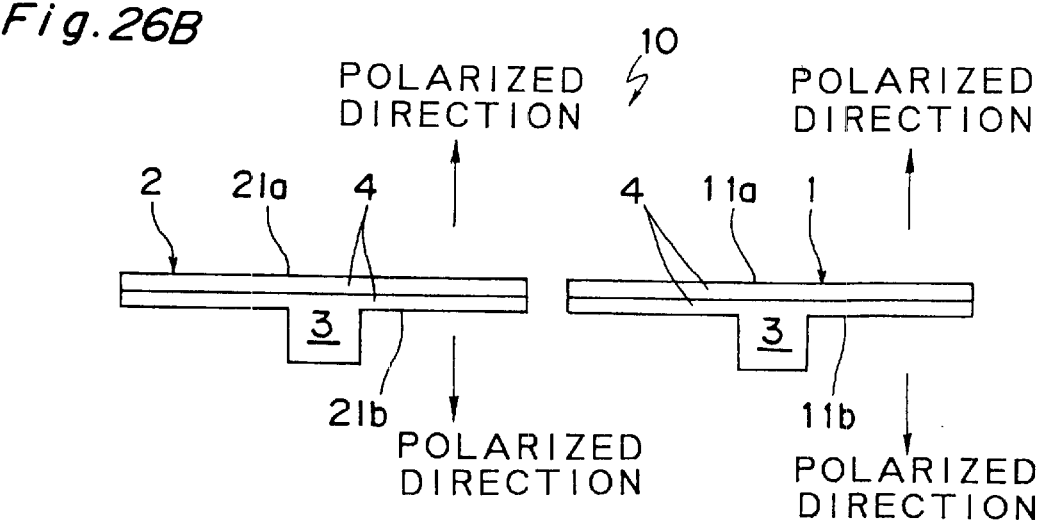
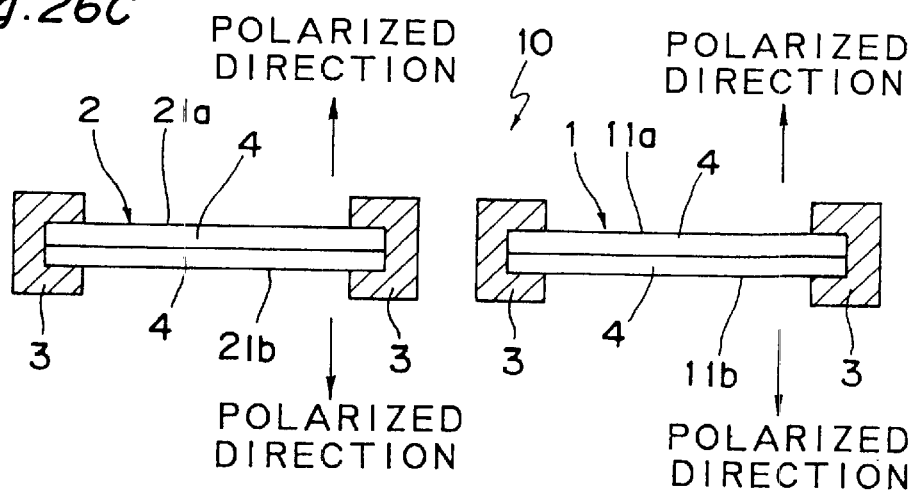

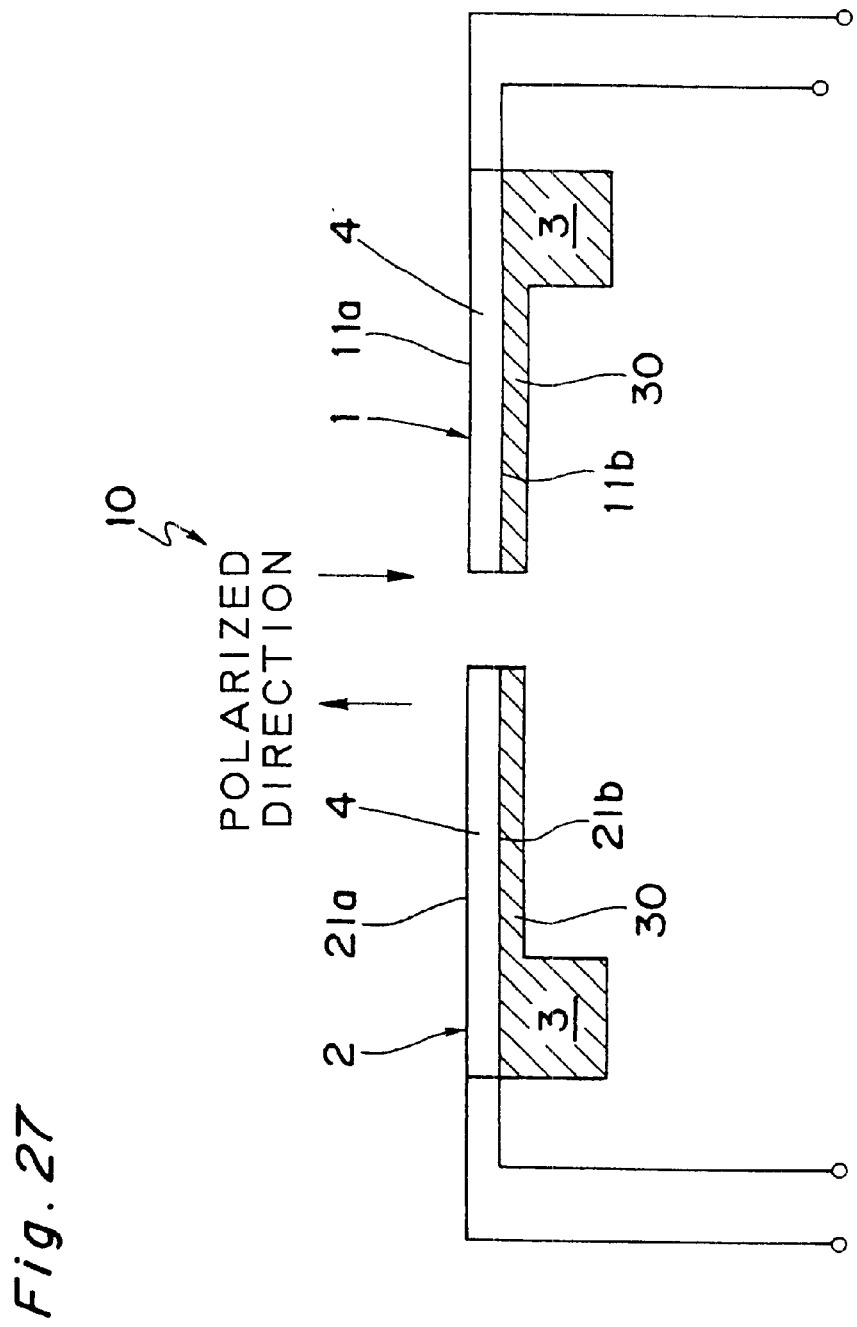

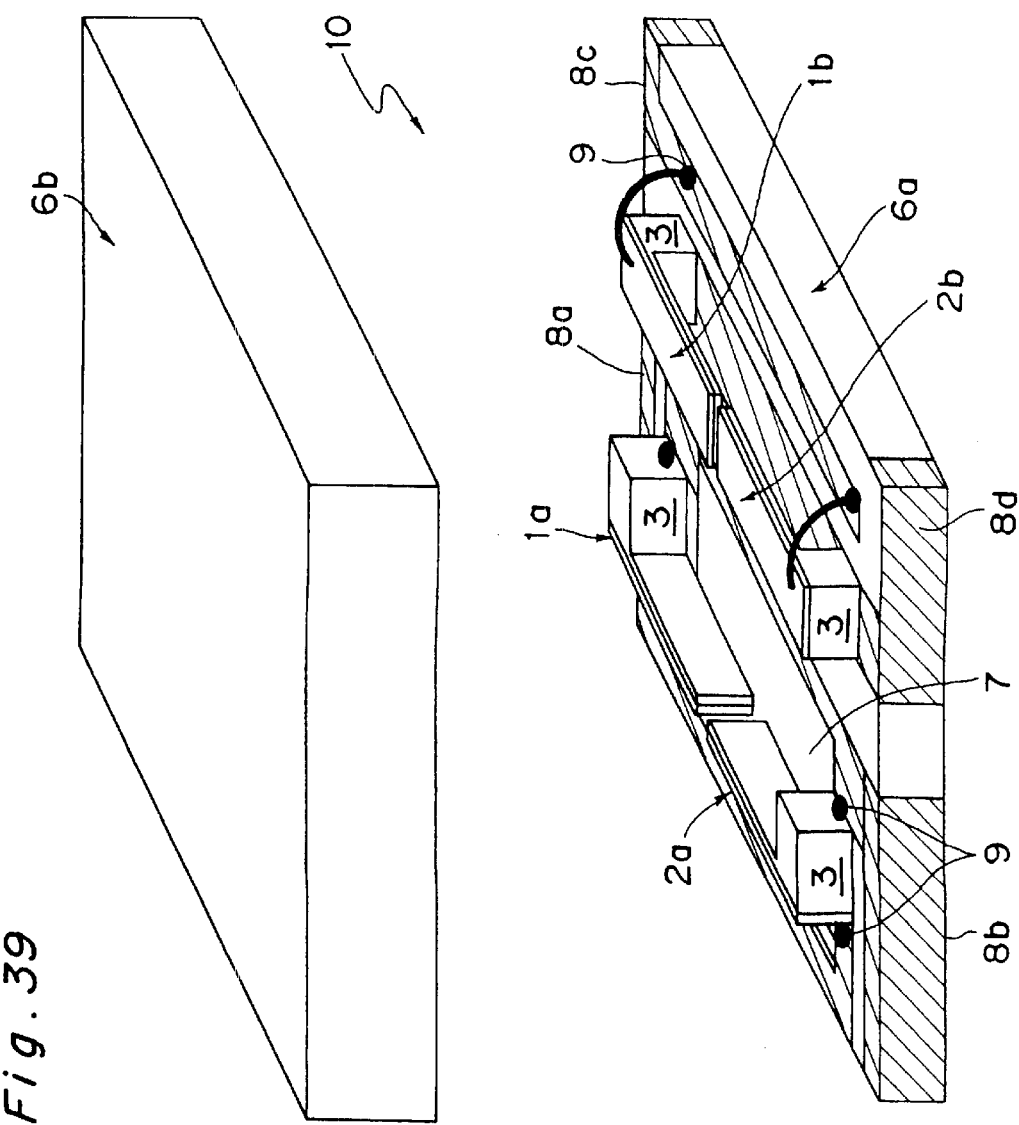

ACCELERATION SENSOR, AN ACCELERATION DETECTION APPARATUS, AND A POSITIONING DEVICE

BACKGROUND OF THE INVENTION

1. Field of the Invention

The present invention relates to detecting angular acceleration (rotational acceleration) and translational acceleration resulting from shock to an electronic device.

2. Description of Related Art

Miniaturization of electronic components has helped drive the rapid adoption and distribution of notebook computers and other types of portable electronics. This has also increased demand for small, surface-mountable, high performance acceleration (shock) detectors in order to assure and improve the reliability of these electronic devices. This is because physical shocks to a high density magnetic storage device while writing to the storage medium can, for example, cause the position of the write head to shift. This can result in data write errors and corruption or even damage to the head. It is therefore necessary and desirable to detect shock to the magnetic storage device and either interrupt the write operation or move the head to a safe position.

As the recording density of magnetic storage devices has increased, the track width on the disk surface has narrowed. This makes it even easier for the position of the head to shift (for the track to shift) at the slightest vibration. Another problem is that, in addition to impact and vibration from external sources acting on the magnetic storage device, small vibrations from the spinning of motors inside the magnetic storage device can also cause the magnetic head to skip tracks.

Vibrations acting on the magnetic storage device include both translational vibration and rotational vibration. For control purposes, it is therefore necessary to distinguish translational acceleration from angular acceleration (referred to below as rotational acceleration), and a sensor capable of detecting translational acceleration and rotational acceleration is needed. Translational acceleration can be detected using a single prior art acceleration sensor. Rotational acceleration can be detected with the greatest sensitivity using two or more acceleration sensors placed as far from each other and from the axis of rotation as possible. If two acceleration sensors are placed equidistantly from and on opposite sides of the rotational axis, the output signals from the acceleration sensors will be opposite sign but the same magnitude when rotational acceleration occurs. This will, however, only be true when the center of rotation is centered between the two acceleration sensors. Furthermore, when two acceleration sensors having the same practical characteristics are located on the same side of relative to the axis of rotation, translational acceleration will be the same at each acceleration sensor and the output signals from the acceleration sensors in response to translational acceleration will have the same magnitude. On the other hand, when rotational acceleration occurs, the output signals from the two acceleration sensors will differ in magnitude because the distance from the axis of rotation to each acceleration sensor differs. Rotational acceleration can therefore be detected by obtaining the difference between the two output signals.

A piezoelectric element, which produces a voltage as a result of deformation of a piezoelectric body in response to strain, can also be used as an acceleration sensor as described in Japanese Patent Laid-open Publication (kokai) No. 10-96742. One piezoelectric element used for an acceleration sensor is flat with a flat cantilevered portion. Strain deformation from acceleration is picked up as vibration of the cantilever portion of the piezoelectric body, thus producing a charge that can be detected to detect acceleration.

The problem is that when the acceleration sensor consists of plural piezoelectric elements, differences occur in the characteristics of the individual piezoelectric elements.

Furthermore, when the acceleration sensor has two piezoelectric elements disposed at separate positions, the sensitivity of the piezoelectric elements may be affected by where the elements are positioned. For example, temperature differences resulting from the position of the elements can offset the sensitivity of each piezoelectric element. In this case differences in the output signals from each piezoelectric element can cause rotational acceleration to be mistakenly detected when translational acceleration occurred, and rotational acceleration cannot be accurately recognized.

Yet further, reducing the distance between piezoelectric elements by housing two piezoelectric elements in the confined space inside a single package also reduces the detection signal difference. As a result, rotational acceleration cannot be detected with high sensitivity.

SUMMARY OF THE INVENTION

With consideration for the problems described above, it is therefore an object of the present invention to provide an acceleration sensor that can be disposed inside a limited space and can detect rotational acceleration with high sensitivity.

To achieve this object, an acceleration sensor according to the present invention has first piezoelectric element having electrodes for outputting a charge produced by strain deformation and second piezoelectric element having electrodes for outputting a charge produced by strain deformation. The first piezoelectric element has at least one piezoelectric body and a support block supporting the piezoelectric body. The second piezoelectric element has at least one piezoelectric body and a support block supporting the piezoelectric body. The electrodes are provided on opposite surfaces of the piezoelectric element, and one surface of the first piezoelectric element and one surface of the second piezoelectric element are effectively parallel to each other.

One surface of the first piezoelectric element and one surface of the second piezoelectric element are substantially parallel to each other so that the vibrating surfaces of the piezoelectric elements are parallel and each piezoelectric element will thus vibrate in the same direction in response to acceleration in a single direction. Yet further preferably, one surface of the first piezoelectric element and one surface of the second piezoelectric element are in the same plane. The piezoelectric elements normally vibrate perpendicular to the cantilever surface, and the surfaces of the cantilever portions of the piezoelectric elements are therefore preferably parallel to each other.

Yet further preferably, the cantilever portion and support block portion of the piezoelectric body in each piezoelectric element are a continuous monolithic portion, but the support block portion can be separate from the cantilever portion.

This configuration makes it possible to dispose first and second piezoelectric elements for detecting acceleration in the same direction in a confined space, and detect rotational acceleration with high sensitivity due to the distance between the support blocks supporting the piezoelectric body of the piezoelectric elements. Rotational acceleration can also be detected without being affected by environmental factors due to the installation.

Further preferably, the first and second piezoelectric elements are cantilevered, having a cantilever portion including a main piezoelectric body surface and a support block portion for supporting the piezoelectric body. The first and second piezoelectric elements are aligned with the longitudinal axes of the cantilever portion with the support block portions disposed to the outside mutually distant in opposite directions along the longitudinal axis, a free end portion of the cantilever of the first piezoelectric element and a free end portion of the cantilever of the second piezoelectric element are pointing to each other. Each free end portion of cantilever is located in mutual proximity to the inside, and the ends of the cantilever portions are substantially mutually parallel.

Yet further preferably, the first piezoelectric element includes one piezoelectric body and the second piezoelectric element includes one piezoelectric body. The direction of polarization of the piezoelectric body of the first piezoelectric element and the direction of polarization of the piezoelectric body of the first piezoelectric element are opposite. It is noted that the direction of polarization may be called the polarized direction.

Alternatively, the first piezoelectric element includes one piezoelectric body and the second piezoelectric element includes one piezoelectric body. The direction of polarization (polarized direction) of the piezoelectric body of the first piezoelectric element and the direction of polarization of the piezoelectric body of the second piezoelectric element are the same.

Alternatively, the first piezoelectric element includes a plurality of layers of bonded piezoelectric bodies and the second piezoelectric element includes a plurality of layers of bonded piezoelectric bodies. Thus bonding plural piezoelectric bodies to form the piezoelectric elements produces a stronger output signal.

Yet further preferably, the direction of polarization of all piezoelectric bodies forming the piezoelectric elements is the same in each of the first and second piezoelectric elements.

Alternatively, the directions of polarization of the piezoelectric bodies constituting the first piezoelectric element and the directions of polarization of the piezoelectric bodies constituting the second piezoelectric element are mutually opposite.

Yet further preferably, the direction of polarization of the piezoelectric bodies constituting the first piezoelectric element and the direction of polarization of the piezoelectric bodies constituting the second piezoelectric element are the same.

Yet further preferably, the first piezoelectric element includes at least two piezoelectric bodies and the second piezoelectric element includes at least two piezoelectric bodies. The piezoelectric bodies of each piezoelectric element are bonded with surfaces of the same polarity of polarization. Therefore, the direction of one piezoelectric body and the direction of another piezoelectric body are opposite.

Yet further preferably, the directions of polarization of the corresponding piezoelectric bodies are mutually opposite in the first and second piezoelectric elements.

Alternatively, the directions of polarization of the corresponding piezoelectric bodies are the same in the first and second piezoelectric elements.

Yet further preferably, in one piezoelectric element the piezoelectric bodies of the piezoelectric element are bonded with an intervening shim therebetween.

Substantially any material that can bond with the piezoelectric body can be used for the shim. Preferably, however, the shim will pass vibration due to acceleration to the piezoelectric body. Yet further preferably the shim is a silicon substrate.

Yet further preferably, the piezoelectric element is formed by bonding the plural piezoelectric bodies by direct bonding.

An adhesive layer is thus not formed at the interface between the piezoelectric bodies. Vibration due to acceleration is thus not absorbed by an adhesive layer, and acceleration can be detected with high sensitivity due to device stability.

Yet further preferably, the piezoelectric element is formed by bonding a plurality of piezoelectric bodies by direct bonding by way of at least one of oxygen atoms and hydroxyl groups.

The piezoelectric bodies can thus be strongly bonded to each other as a result of the oxygen atoms or hydroxyl groups.

Yet further preferably, the acceleration sensor has an output terminal for each electrode of the first and second piezoelectric elements.

Yet further preferably, the acceleration sensor also has for each of the first and second piezoelectric elements at least one output terminal interconnecting electrodes of mutually different generated charge polarity between different piezoelectric elements.

By connecting an electrode of one charge polarity in the first piezoelectric element to an electrode of the opposite charge polarity in the second piezoelectric element, and connecting the node therebetween as the output terminal, the charges from the two piezoelectric elements are mutually cancelling, and the excess charge is obtained as the difference between the piezoelectric element outputs. When rotational acceleration occurs the charges generated by the piezoelectric elements differ according to the distance from the center of rotation. On the other hand, the charges generated by the piezoelectric elements due to translational acceleration are the same. It is therefore possible to detect rotational acceleration based on the difference between the outputs. In other words, interconnecting the piezoelectric elements as described above obtains the difference of the outputs. It is therefore not necessary to provide an external differential circuit.

Yet further preferably, electrodes of the same generated charge polarity in different piezoelectric elements are connected, and the first and second piezoelectric elements each comprise an output terminal from an electrode other than the connected electrodes.

In this case electrodes of the same generated charge polarity are connected in series between the first and second piezoelectric elements, charges of the same polarity are mutually cancelling, and the difference between the charges generated by the piezoelectric elements is output. Any excess charge can thus be obtained as the difference in piezoelectric element output, and rotational acceleration can be detected from this difference. In other words, interconnecting the piezoelectric elements as described above obtains the difference of the outputs. It is therefore not necessary to provide an external differential circuit.

Yet further preferably, the acceleration sensor also has at least one output terminal set for outputting a charge generated at each electrode of the first and second piezoelectric elements.

Yet further preferably, the first piezoelectric element is effectively adjusted to the same sensitivity as the second piezoelectric element.

The first and second piezoelectric elements of this acceleration sensor normally have substantially the same sensitivity by manufacturing both piezoelectric elements to the same dimensions. However, to further improve acceleration detection sensitivity, the sensitivity of one piezoelectric element is preferably adjusted to effectively the same sensitivity as the other piezoelectric element. Adjusting piezoelectric element sensitivity can be accomplished by, for example, removing portion of the cantilever portion or adding a sensitivity adjusting mass to the cantilever portion.

Therefore, a portion of the cantilever portion of the first piezoelectric element is preferably removed in another acceleration sensor of this invention.

Alternatively, a sensitivity adjusting mass is affixed the cantilever portion of the first piezoelectric element in another acceleration sensor of this invention.

Yet further preferably, the first piezoelectric element is fixed by the support block portion inside a package and second piezoelectric element is fixed by the support block portion inside a package so that the cantilever portion can vibrate freely.

By thus housing the first and second piezoelectric elements in a package, output can be easily obtained from the electrodes of the piezoelectric elements.

Yet further preferably, the first and second piezoelectric elements are mounted inside the package with the cantilever portion inclined to the surface of the package.

By thus mounting the piezoelectric elements with the cantilever inclined to the surface of the package, the cantilever will also vibrate at an incline to the surface. It is therefore possible to detect acceleration parallel to the package surface as well as acceleration perpendicular to the package surface.

Yet further preferably, the first and second piezoelectric elements are mounted to the package so that the angle of inclination between the cantilever portions thereof and the package surface is mutually different.

Yet further preferably, two sets of piezoelectric elements are mounted in the package, the first and second piezoelectric elements of the first set mounted with the cantilever portion thereof perpendicular to the package surface, and the first and second piezoelectric elements of the second set mounted with the cantilever portion parallel to the package surface.

By thus providing two sets of piezoelectric elements mounted with the cantilever portions thereof respectively parallel and perpendicular to the package surface, acceleration components parallel and perpendicular to the package surface can be separately detected. It will also be obvious that a third set of piezoelectric elements could be added to detect acceleration components in a third axial direction.

This invention also provides an acceleration detection apparatus having an acceleration sensor according to the present invention and a signal processing circuit for processing output signals from the piezoelectric elements.

It is thus possible to contain both the acceleration sensor and a semiconductor element integrating the signal processing circuit in a single package, thereby shortening the wiring, making the acceleration detection apparatus more resistant to noise, and able to detect acceleration with high sensitivity.

Yet further preferably, the first and second piezoelectric elements are connected to output to the signal processing circuit same-polarity output signals for acceleration in the same direction; and the signal processing circuit determines the difference between the output signals.

Alternatively, the first and second piezoelectric elements are connected to output to the signal processing circuit opposite-polarity output signals for acceleration in the same direction; and the signal processing circuit determines the sum of the output signals.

Yet further preferably, the signal processing circuit comprises a circuit for detecting angular acceleration from the difference of the outputs from the first and second piezoelectric elements.

Rotational acceleration acting on first and second piezoelectric elements at different distances from the center of rotation will be different. Translational acceleration, however, will be the same. Therefore, by detecting the difference of the output from the two piezoelectric elements, output signal components relating to translational acceleration will cancel, and the output signal due to rotational acceleration can be detected.

Yet further preferably, the signal processing circuit adjusts output so that the sensitivity of the first and second piezoelectric elements is effectively equal.

Yet further preferably, the signal processing circuit comprises one impedance converting circuit for converting output signal impedance from the piezoelectric elements, and an amplifier circuit for amplifying the converted output signals.

Yet further preferably, the signal processing circuit comprises two impedance converting circuits for converting output signal impedance from the piezoelectric elements, and an adding circuit for adding the converted output signals.

Yet further preferably, the signal processing circuit comprises two impedance converting circuits for converting output signal impedance from the piezoelectric elements, and a differential amplifier circuit for detecting and amplifying the converted output signal difference.

Yet further preferably, the acceleration detection apparatus has a plurality of output terminals for simultaneously externally outputting the amplified output of the converted output after impedance conversion, and the impedance-converted output signal of at least one piezoelectric element.

Yet further preferably, the first and second piezoelectric elements are fixed at the support block portion in the package so that the cantilever portions can vibrate freely, and the signal processing circuit is also housed inside the package.

A positioning apparatus according to the present invention has an acceleration detection apparatus according to the present invention for detecting acceleration, a moving means for moving an object, and a control means for controlling the moving means. The control means controls the moving means to move and position the object based on an output signal from the acceleration detection apparatus corresponding to detected acceleration.

The object can therefore be accurately positioned even if external interference applies acceleration to the positioning apparatus.

Yet further preferably, the cantilever portions of the first and second piezoelectric elements of the acceleration detection apparatus are disposed effectively parallel to a means for supporting the object.

A disk recording and reading apparatus according to the present invention has an acceleration detection apparatus for detecting acceleration according to the present invention, a head moving means for moving a head for recording to and reading from the disk, and a control means for controlling the head moving means. The control means calculates movement of the head based on an output signal from the acceleration detection apparatus corresponding to detected acceleration, and moves and positions the head by means of the head moving means.

The head can therefore be accurately positioned even if external interference applies acceleration to the disk drive. As a result, the durability of the disk recording/reading mechanism can be improved, and a high density recording/reading apparatus can be achieved.

Yet further preferably, the cantilever portion of the first and second piezoelectric elements of the acceleration detection apparatus are disposed effectively parallel to an arm supporting the head.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 12A is a plan view of other arrangement of an acceleration sensor showing the cantilevers pointing in the same direction according to the present invention;

FIG. 12B is a plan view of other arrangement of an acceleration sensor showing the support block in the middle of the piezoelectric elements;

FIG. 12C is a plan view of other arrangement of an acceleration sensor showing a support block at both ends of the deflection member of the piezoelectric elements;

FIG. 26A is a plan view of other arrangement of an acceleration sensor showing the cantilevers pointing in the same direction according to the present invention;

FIG. 26B is a plan view of other arrangement of an acceleration sensor showing the support block in the middle of the piezoelectric elements;

FIG. 26C is a plan view of other arrangement of an acceleration sensor showing a support block at both ends of the deflection member of the piezoelectric elements;

FIG. 27 is a plan view of an acceleration sensor according to an 11th embodiment of the invention;

FIG. 39 is an exploded oblique view of an acceleration sensor according to a 19th embodiment of the invention;

DESCRIPTION OF THE PREFERRED EMBODIMENTS

Preferred embodiments of the present invention are described below with reference to the accompanying figures.

Embodiment 1

Figure 1A:
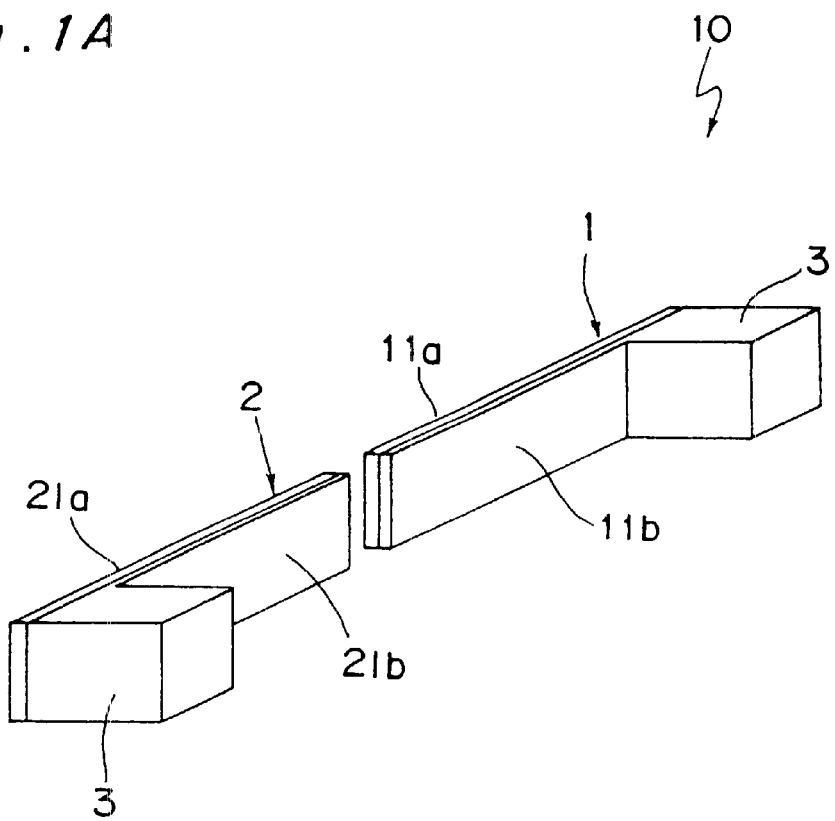
FIG. 1A is an oblique view of an acceleration sensor according to a first embodiment of the invention.
Figure 1B:
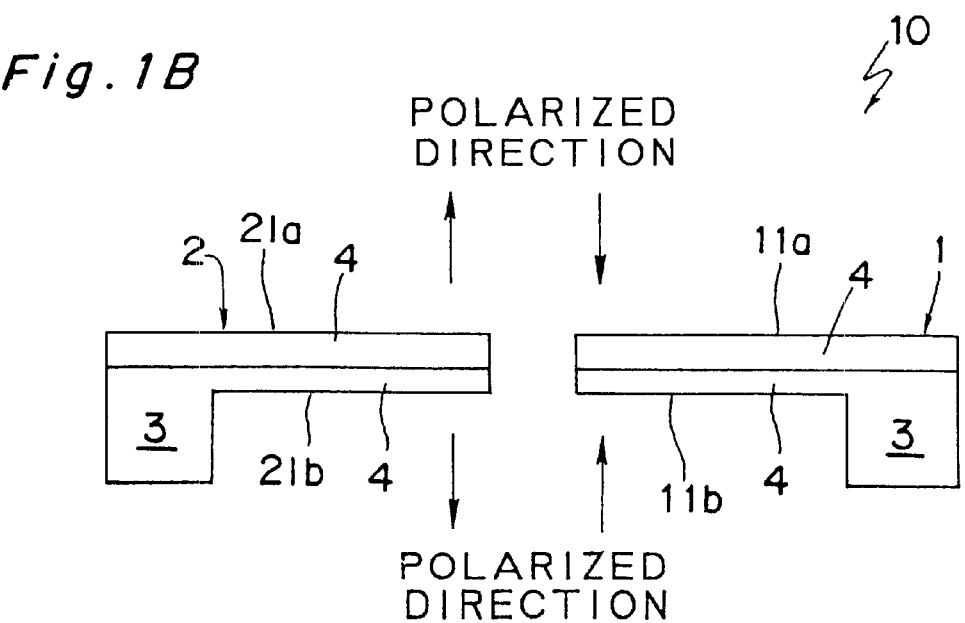
FIG. 1B is a plan view of the same.

FIG. 1A is an oblique view of an acceleration sensor according to this first embodiment of the invention, and FIG. 1B is a plan view of the same. As shown in FIGS. 1A and 1B, an acceleration sensor according to this embodiment comprises two piezoelectric elements 1 and 2. Each piezoelectric element has a cantilevered structure in which one end of a bimorph cantilever is supported by a support block 3. Each bimorph cantilever comprises two bonded piezoelectric bodies having opposite directions of polarization. An electrode 11a, 11b, 21a, 21b is formed on the two opposite sides of the cantilever of each piezoelectric element 1 and 2. Because of the step between the cantilever and support block 3, the electrodes 11b and 21b on the same side as the support block 3 are formed continuously to the step face so that there is electrical conductivity between the cantilever and support block 3. The electrodes 11a and 21a on the side opposite the support block 3 are formed over the entire surface.

As a result of the bimorph cantilever structure bonding two piezoelectric bodies 4 as described above, the piezoelectric bodies 4 of these piezoelectric elements 1 and 2 produce a potential difference as a result of the flexible vibration of the cantilever portion induced by acceleration transmitted to the cantilever from the support block 3. This potential difference can then be extracted from the electrodes 11a, 11b, 21a, 21b on the opposing sides of the cantilever. A construction having one or a plurality of bonded piezoelectric body layers with an electrode disposed to each side as described above is referred to below as a "piezoelectric element."

The piezoelectric elements 1 and 2 of the acceleration sensor 10 shown in FIG. 1 are disposed so that they have one mutually parallel side, and more specifically so that one side of each cantilever is on the same plane. The piezoelectric elements 1 and 2 are further aligned in line on the same longitudinal axis with the free ends of the cantilevers in proximity at the inside and the support block 3 ends of the cantilevers disposed to the outside in mutually opposite directions as shown in FIG. 1.

Piezoelectric element 1 and piezoelectric element 2 of this acceleration sensor 10 each comprise two piezoelectric bodies 4 with mutually opposite directions of polarization and the same-polarity sides of the two piezoelectric bodies 4 bonded together. In addition, the polarization direction of corresponding piezoelectric bodies are mutually opposite in piezoelectric element 1 and piezoelectric element 2. In other words, the polarity of the bonding surfaces in piezoelectric element 1 is opposite the polarity of the bonding surfaces in piezoelectric element 2. The polarization directions of the piezoelectric bodies are shown in FIG. 1B where the arrows point from the positive polarity side to the negative polarity side. The arrows thus start from the positive polarity side and point to the negative polarity side. The two piezoelectric bodies in piezoelectric element 1 are thus bonded together with the negative polarity sides thereof facing each other, and the two piezoelectric bodies in piezoelectric element 2 are bonded together with the positive polarity sides thereof facing each other.

The resonance frequency of a piezoelectric element is generally determined by the length and thickness of the piezoelectric element. The sensitivity of a piezoelectric element increases as the frequency of the acceleration approaches the resonance frequency, and the shape of the piezoelectric element can therefore be determined so that the resonance frequency is higher than the measured frequency range. In this first embodiment of the invention the piezoelectric element is 100 μm thick and 2 mm long with a resonance frequency of 20 kHz. The piezoelectric element is made by bonding two 50 μm thick piezoelectric bodies together. The piezoelectric bodies in this embodiment are lithium niobate (LiNbO$_3$), a piezoelectric single crystal.

A method of manufacturing the piezoelectric elements used in this acceleration sensor is described next.

First, two lithium niobate piezoelectric bodies each 400 μm thick are bonded by direct bonding. The bonding surfaces are polished to a uniform mirror surface during this direct bonding process, and the surfaces are then washed to remove any foreign matter and contaminants. The two piezoelectric bodies are then hydrophilically processed and surface activated, dried, and then placed together.

Figure 2A:
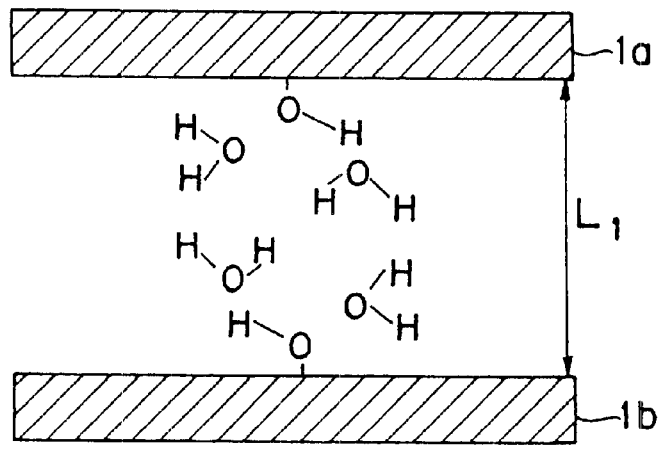
FIG. 2A is a section view showing the hydrophilically processed surfaces placed in proximity for bonding by direct bonding in the first embodiment of the invention.
Figure 2B:
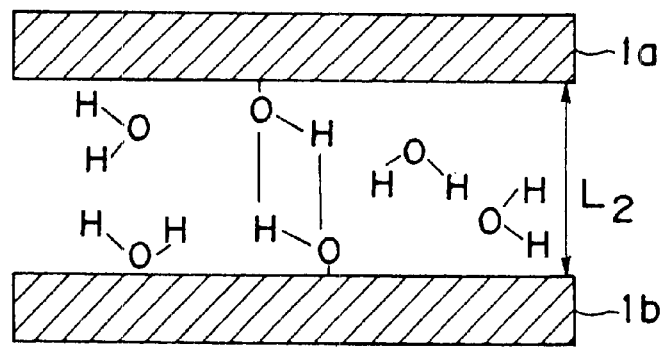
FIG. 2B is a section view showing bonding at the interface as a result of direct bonding by hydrogen bonds.
Figure 2C:
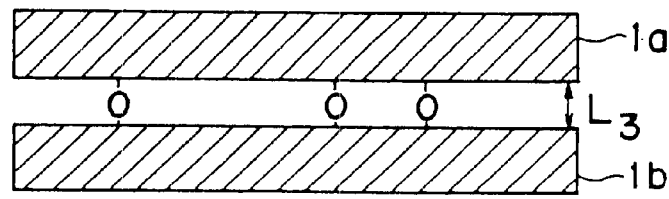
FIG. 2C is a section view showing bonding by direct bonding at the interface by way of oxygen atoms.

The principle whereby base layer and piezoelectric layer are bonded by direct bonding is described next with reference to FIGS. 2A–2C. FIGS. 2A–2C show the interfacial states of the piezoelectric layers at each step of the direct bonding operation in the method for manufacturing piezoelectric elements used in an acceleration sensor according to this first embodiment of the invention. L1, L2, and L3 in FIGS. 2A–2C indicate the distance between the piezoelectric layers. As noted above, both sides of the lithium niobate (LiNbO$_3$) substrates 1a and 1b, the piezoelectric layers, are first mirror polished. The lithium niobate substrates 1a and 1b are then hydrophilically processed by washing with a solution of ammonia, hydrogen peroxide, and water in a 1:1:6 volume ratio. As shown in FIG. 2A, the surfaces of the piezoelectric layers 1a and 1b washed with this solution are terminated by a hydroxyl group (—OH), and are thus made hydrophilic. This is the state before bonding.

Then, as shown in FIG. 2B, the two hydrophilically processed piezoelectric layers (LiNbO$_3$) 1a and 1b are placed together so that the polarization axes are oriented in opposite directions, and bonded (L1>L2). This causes dehydration, and results in piezoelectric layer (LiNbO$_3$) 1a and piezoelectric layer (LiNbO$_3$) 1b being pulled together by the attraction of hydroxyl group polymerization and hydrogen coupling. Bonding as a result of thus surface processing the mirror polished surfaces, then placing these surfaces in contact, and thereby bonding the mated surfaces without using a layer of adhesive, for example, at the bonding interface is called bonding by "direct bonding."

Because adhesive is not used in bonding by direct bonding, there is no adhesive layer at the bonding interface. An adhesive layer is known to absorb vibrations and thus lower sensitivity, cause variations, and degrade temperature characteristics. Bonding by direct bonding, however, has no vibration absorption at the bonding interface, and can thus provide a bond free of such variations and degraded temperature characteristics. Heat treatment will also generally change an intermolecular force bond to a strong bond such as a covalent bond, ionic bond, or other atomic level bond.

The piezoelectric layers (LiNbO$_3$) 1a and 1b bonded by direct bonding as described above can therefore be heated at 450 degrees centigrade as desired. As shown in FIG. 2C, this produces a covalent bond between the constituent atoms of piezoelectric layer (LiNbO$_3$) 1a and the constituent atoms of piezoelectric layer (LiNbO$_3$) 1b by way of the oxygen atoms (L2>L3), and the piezoelectric layers 1a and 1b are thus bonded even more strongly by direct bonding at the atomic level. That is, a bond that does not have a layer of adhesive at the bonding interface can be achieved. It should be noted that a covalent bond between the constituent atoms of piezoelectric layer (LiNbO$_3$) 1a and the constituent atoms of piezoelectric layer (LiNbO$_3$) 1b by way of hydroxyl groups can also be achieved, again resulting in the piezoelectric layers 1a and 1b bonding strongly by direct bonding at the atomic level.

It should be noted that if the piezoelectric layers are not particularly resistant to heat, heat treatment can be omitted.

It is also important to note that when heat treatment is used, the temperature should not exceed the Curie point, that is, the temperature at which the piezoelectric body loses polarization. The Curie point of lithium niobate (LiNbO$_3$) is 1210 degrees centigrade. Because the characteristics of lithium niobate degrade when the temperature hysteresis approaches this temperature, heat treatment is preferably limited to a temperature range below the Curie point so as to assure bonding by strong direct bonding.

The entire surface of one of the two bonded lithium niobate layers is then polished by surface grinding to a thickness of 50 μm. The other layer is also ground to a 50 μm thickness except in the part where the support block is formed. The thickness of the cantilever portion of the piezoelectric element thus becomes 100 μm and the thickness of the support block portion becomes 450 μm. A 50 nm thick layer of chrome and then a 200 nm thick layer of gold is then deposited to both ground surfaces to form the electrodes. A flat electrode is thus formed on one side because the surface is flat, but the presence of the support block on the other side produces a step between the cantilever surface and the support block. The electrode films are deposited using a metal mask on the step face between the support block and the cantilever to assure electrical conductivity between the electrodes on the cantilever surface and the support block. A dicing saw is then used to cut 0.5 mm wide strips parallel to the longitudinal axis of the cantilever portion.

The principle whereby rotational acceleration is detected using an acceleration sensor comprising two piezoelectric elements according to this preferred embodiment is described next with reference to FIG. 3.

Figure 3:
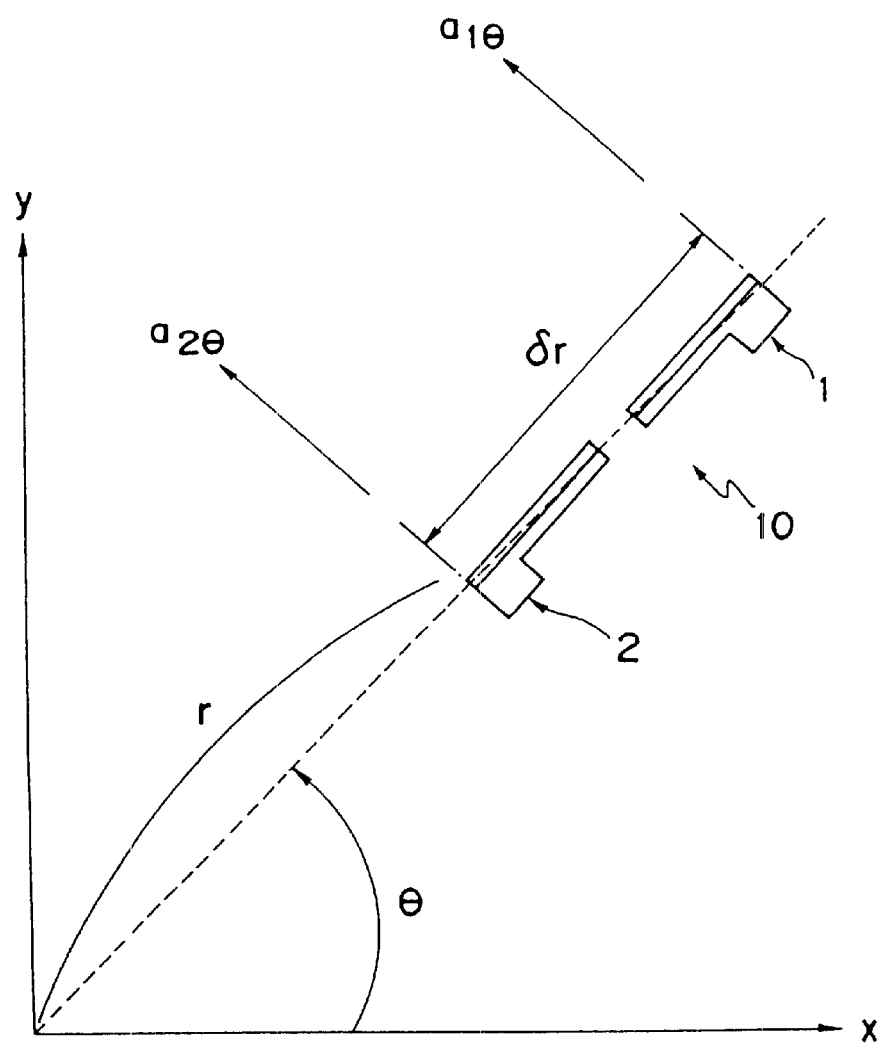
FIG. 3 describes the principle of rotational acceleration detection using the acceleration sensor of the first embodiment.

Referring to FIG. 3, piezoelectric elements 1 and 2 are located distance r from center of rotation O. The piezoelectric elements 1 and 2 are disposed with the support blocks 3 that sense acceleration separated distance δ r. When rotational acceleration of $d^2 \theta/dt^2$ occurs, acceleration a1 θ and a2 θ is applied in the direction tangential to the rotation. When the center of rotation does not vary, a1 θ is proportional to $rd^2 \theta/dt^2$, and a2 θ is proportional to $(r+\delta r)d^2 \theta/dt^2$. Because each piezoelectric element outputs a potential difference proportional to the amount of acceleration, output voltage difference V2−V1 of the two piezoelectric elements 1 and 2 having the same proportional coefficient will be proportional to $\delta r(d^2 \theta/dt^2)$, and an output signal proportional to the rotational acceleration (angular acceleration) $d^2 \theta/dt^2$ can be obtained.

When translational acceleration occurs, the translational acceleration acting on piezoelectric elements 1 and 2 has the same magnitude, the signals output as a result of this translational acceleration are substantially the same in magnitude, and the practical difference therebetween is nearly zero. However, when rotational acceleration occurs, there is an output signal difference proportional to the product of rotational acceleration $d^2 \theta/dt^2$ and distance δ r between the two piezoelectric elements 1 and 2. It is therefore possible to detect rotational acceleration by obtaining the difference between the output signals of the two piezoelectric elements 1 and 2. To improve the accuracy of the detected rotational acceleration, the distance between the two piezoelectric elements should be as great as possible to increase the output signal difference. Because acceleration is transmitted from the support block 3 to the cantilever with the cantilevered piezoelectric elements shown in FIG. 1, the distance between the point of contact between the cantilever and support block 3 in each piezoelectric element can be treated as the distance between the two piezoelectric elements. As a result, the arrangement shown in FIG. 1 yields the highest possible sensitivity to angular velocity within a confined space. When the output signals of the two piezoelectric elements are at least a particular level but the difference between the signals is substantially zero, rotational acceleration is effectively zero and can be ignored. In this case, translational acceleration can be detected from the output of either piezoelectric element.

Embodiment 2

Figure 4:
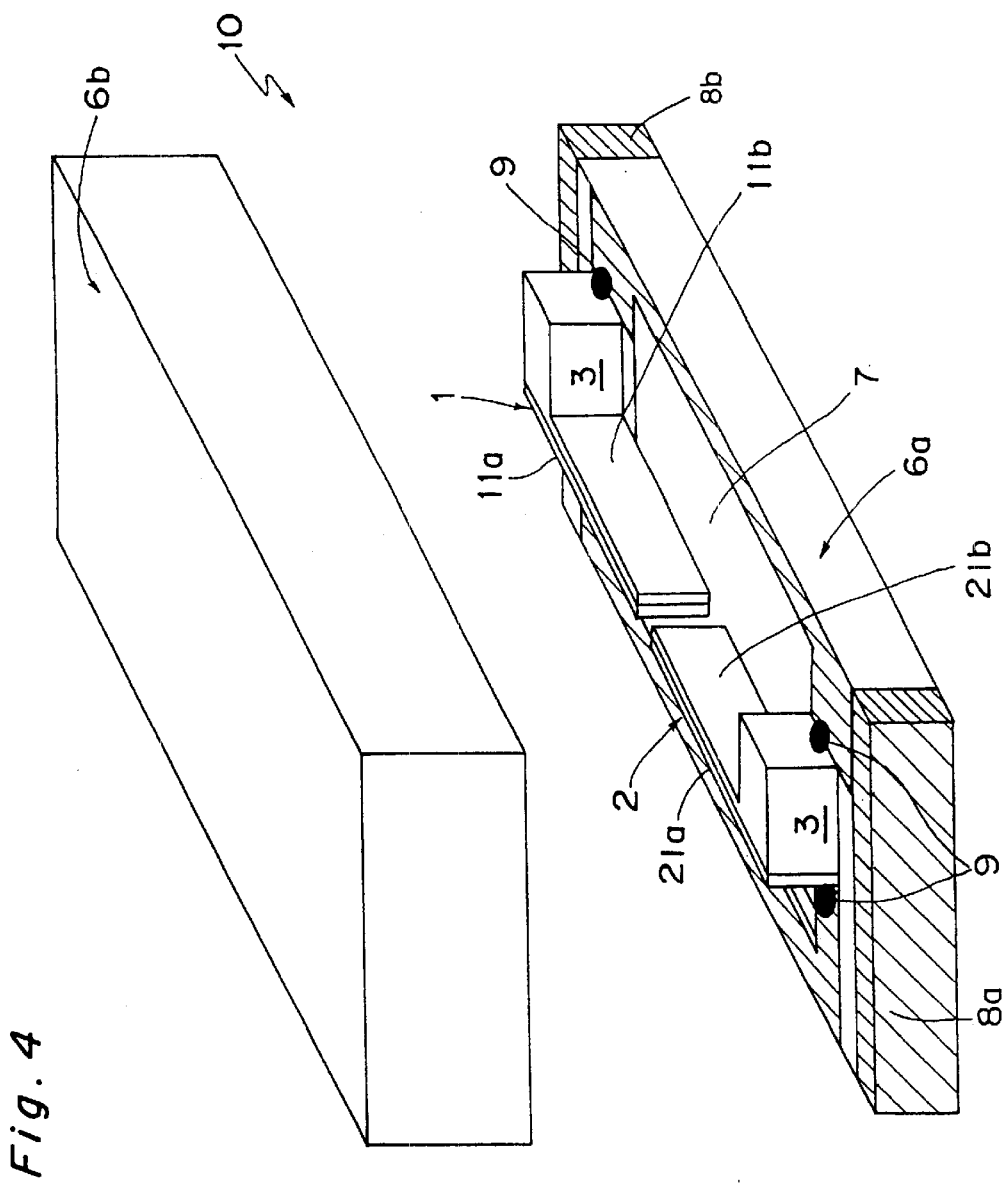
FIG. 4 is an oblique view of an acceleration sensor according to a second embodiment of the invention.

FIG. 4 is an oblique view of an acceleration sensor 10 according to a second embodiment of the invention. This embodiment differs from the first embodiment in that it houses an acceleration sensor of the first embodiment in a package 6a, and makes it easier to extract the output of the piezoelectric element electrodes from external electrodes on the sides of the package. The polarization directions of the piezoelectric bodies 4 of the piezoelectric elements 1 and 2 in this acceleration sensor 10 are the same as in the acceleration sensor of the first embodiment. The piezoelectric elements 1 and 2 of the acceleration sensor 10 are fixed to the package 6a at the respective support blocks 3. A recess 7 is formed in the package 6a so that the cantilevers of the piezoelectric elements do not contact the package 6a, and the package 6a thus does not interfere with flexure caused by the transmission of acceleration.

Figure 5:
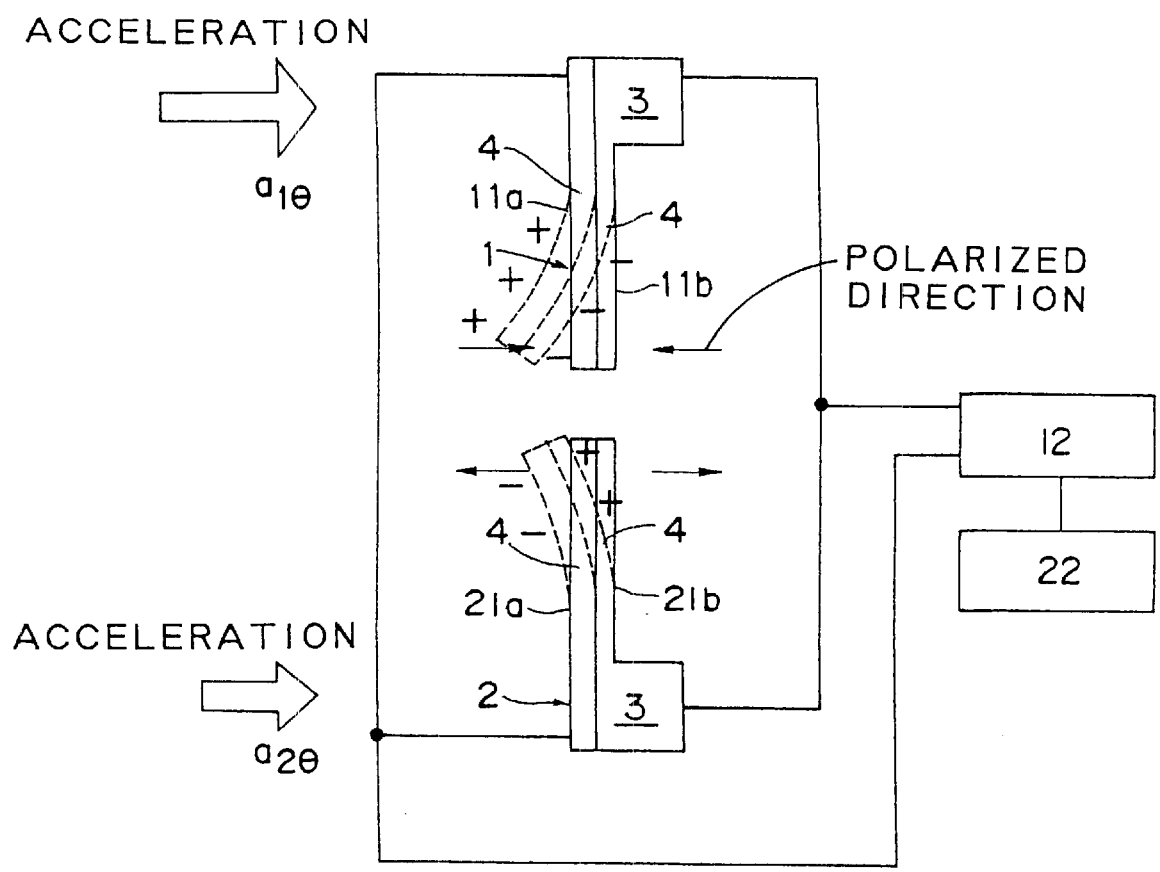
FIG. 5 is a block diagram of acceleration detection using an acceleration sensor according to a second embodiment of the invention.

An external electrode 8a, 8b forms an output terminal at each end of the package 6a. Electrode 11a of piezoelectric element 1 and electrode 21a of piezoelectric element 2 are connected to external electrode 8a by an intervening conductive layer on the package 6a. Electrode 11b of piezoelectric element 1 and electrode 21b of piezoelectric element 2 are connected to external electrode 8b by an intervening conductive layer on the package 6a. The conductive layer and electrodes are electrically connected by a conductive paste 9. The package 6a is then covered by package 6b, forming acceleration sensor 100 (FIG. 5).

By establishing conductivity between the conductive layer of the package and the surface of support blocks 3 of piezoelectric elements 1 and 2 in FIG. 4 using a conductive paste 9, it is not necessary to establish conductivity at the cantilever of the vibrating portion of the piezoelectric element, and the amount of conductive paste applied to the cantilever thus has no effect on the resonance frequency of the cantilever. More specifically, variation in the resonance frequency, sensitivity, and other piezoelectric element characteristics can be reduced by connecting from the support block 3 to the external electrode using a conductive paste at the one flat surface 11a and 21a.

In other words, if the external connection is made to the cantilever of the piezoelectric element using a conductive paste, variations in the amount of conductive paste applied and differences in the overspread of conductive paste onto the cantilever will affect and cause variations in the characteristics of the piezoelectric element. On the other hand, if connection is made to the support block 3, there is no direct effect on cantilever vibration, piezoelectric element characteristics are determined only by the shape of the piezoelectric element with no relationship to the amount of conductive paste, and performance variations can be reduced. The step between the support block and cantilever at the other side 11b and 21b means that the electrode portion is divided into two parts, but these two parts are still electrically conductive. The small area of the cantilever on this side limits the amount of conductive paste that can be applied, and it is therefore desirable to connect to the electrode portion on the support block 3. Performance characteristics will also be affected on this side by variations in the amount of paste used and overspread of the paste onto the cantilever if connection is made from the cantilever using conductive paste. It is therefore also desirable to connect to the external electrode from the electrode portion on the support block 3 on this side of the cantilever.

If solder, for example, is used to make an electrically conductive connection directly to the cantilever, the heat conducted to the piezoelectric body of the piezoelectric element can raise the piezoelectric body to a high temperature, causing such problems as degraded performance and reduced sensitivity. These problems can be avoided, however, by soldering to the support block 3 because heat transfer to the cantilever is more difficult.

A method for detecting acceleration using this acceleration sensor is described next with reference to the acceleration detection block diagram shown in FIG. 5. Electrodes 11a and 21a of piezoelectric elements 1 and 2 are connected to a common node connected to one terminal of a signal detector 12. The other electrodes 11b and 21b are likewise connected to a common node connected to another terminal of the signal detector 12. A reference potential generator 22 is also provided for applying a reference potential.

The polarization directions of piezoelectric elements 1 and 2 are described next. These piezoelectric elements are formed by bonding two piezoelectric bodies having mutually opposite directions of polarization with the same-polarity sides together. In addition, the polarization direction of corresponding piezoelectric bodies are mutually opposite in piezoelectric element 1 and piezoelectric element 2. In other words, the polarity of the bonding surfaces in piezoelectric element 1 is opposite the polarity of the bonding surfaces in piezoelectric element 2. The polarization directions of the piezoelectric bodies are shown in FIG. 5 with the arrows pointing from the positive polarity side to the negative polarity side. The arrows thus start from the positive polarity side and point to the negative polarity side. It should be noted that the polarity is determined by the polarization, and does not necessarily match the polarity of the charge generated when stress is applied.

The output obtained from the two piezoelectric elements 1 and 2 when rotational acceleration acts on this acceleration sensor is described next with reference to FIG. 5. When the center of rotation is at some point offset along an extension of the longitudinal axis of the cantilevers of piezoelectric elements 1 and 2, acceleration a1 θ applied to piezoelectric element 1 at a point farther from the center of rotation will be greater than acceleration a2 θ applied to piezoelectric element 2 as indicated by the size of the arrows in FIG. 5. When the respective acceleration is applied in the directions indicated by the arrows in FIG. 5, cantilever displacement will be greater at piezoelectric element 1 than in piezoelectric element 2 as indicated by the dotted lines.

Of the two piezoelectric bodies of piezoelectric element 1, the piezoelectric body on the side of electrode 11b will be extended and the piezoelectric body on the side of electrode 11a will compress as shown in FIG. 5. The piezoelectric body that compresses produces a charge of the same polarity as the polarity of polarization, but the charge produced by the piezoelectric body that stretches is the inverse of polarity of polarization, and a potential occurs between the opposing surfaces. This means that electrode 11a on the compressed piezoelectric body is positively charged matching the polarity of polarization, and electrode 11b on the extended piezoelectric body is negatively charged, which is the inverse of the polarity of polarization.

As noted above, the polarization directions of the piezoelectric bodies of piezoelectric element 2 are opposite those in piezoelectric element 1. As a result, the electrode 21a on the compressed piezoelectric body is negatively charged, and the electrode 21b on the stretched piezoelectric body is positively charged.

Electrodes 11a and 21a, and electrodes 11b and 21b are respectively connected and output through common nodes. The charges generated at each electrode move, and the difference of the overall charge produced by piezoelectric element 1 and piezoelectric element 2 can be detected. The charge generated by the piezoelectric element 1 farther from the center of rotation is greater than the charge generated by the other piezoelectric element 2. The charge from piezoelectric element 2 is thus decimated by the charge from piezoelectric element 1, and the difference between the charges is passed to the node. This charge is then detected by the signal detector 12, and the rotational acceleration can be derived from the resulting output signal. By thus wiring the electrodes of different polarity charges generated by the respective piezoelectric elements, the generated charges cancel each other and the difference of the respective outputs can be obtained. It is therefore possible to detect the difference of the outputs without providing a separate difference circuit, and thereby determine the rotational acceleration. It should be noted that the charge generated due to translational acceleration is effectively the same at each piezoelectric element, and is therefore cancelled by the wiring. Furthermore, this embodiment has been described with the center of rotation at a point on a line extended along the cantilevers of piezoelectric elements 1 and 2 as also shown in FIG. 5, but it is also possible to detect rotational acceleration in the same way for any center of rotation because the magnitude of rotational acceleration is proportional to the difference in the distance from the center of rotation to piezoelectric element 1 and piezoelectric element 2.

It should be noted that rotational acceleration is thought to be instantly applied. Movement of the piezoelectric body produces a reciprocating vibration from the maximum displacement that results when the rotational acceleration is applied, but the rotational acceleration can be detected by detecting the output at the point of greatest displacement.

Figure 6:
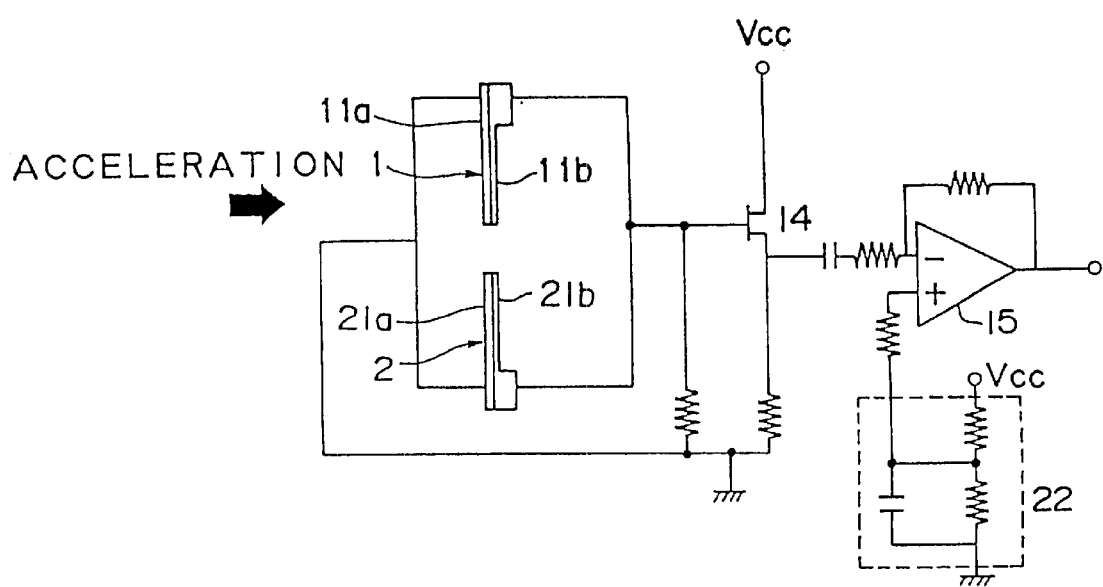
FIG. 6 is a circuit diagram of acceleration detection using an acceleration sensor according to a second embodiment of the invention.

FIG. 6 shows a circuit diagram for a signal detection means that detects acceleration using an acceleration sensor according to this second embodiment. This signal detection means has a field effect transistor (FET) 14 and resistance as a source follower, and an operating amplifier 15. Output from electrodes 11b, 21b of piezoelectric elements 1 and 2 is input to the gate of FET 14. Electrodes 11a and 21a are grounded by an external electrode of the package. A resistance is connected between the ground and the gate of FET 14, converting output from the piezoelectric element to a voltage. A resistance is also connected to the source of FET 14, forming a source following circuit. This source follower constitutes an impedance conversion circuit.

Output from the FET 14 is input through the resistance to operating amplifier 15 and amplified. Operating amplifier 15 is an amplifier circuit. The reference potential is obtained by resistance voltage dividing the source voltage. It will thus be apparent that the difference of the acceleration applied to two piezoelectric bodies can be detected using only a simple amplifier circuit, and it is not necessary to use a differential amplifier or other such circuit.

Figure 7:
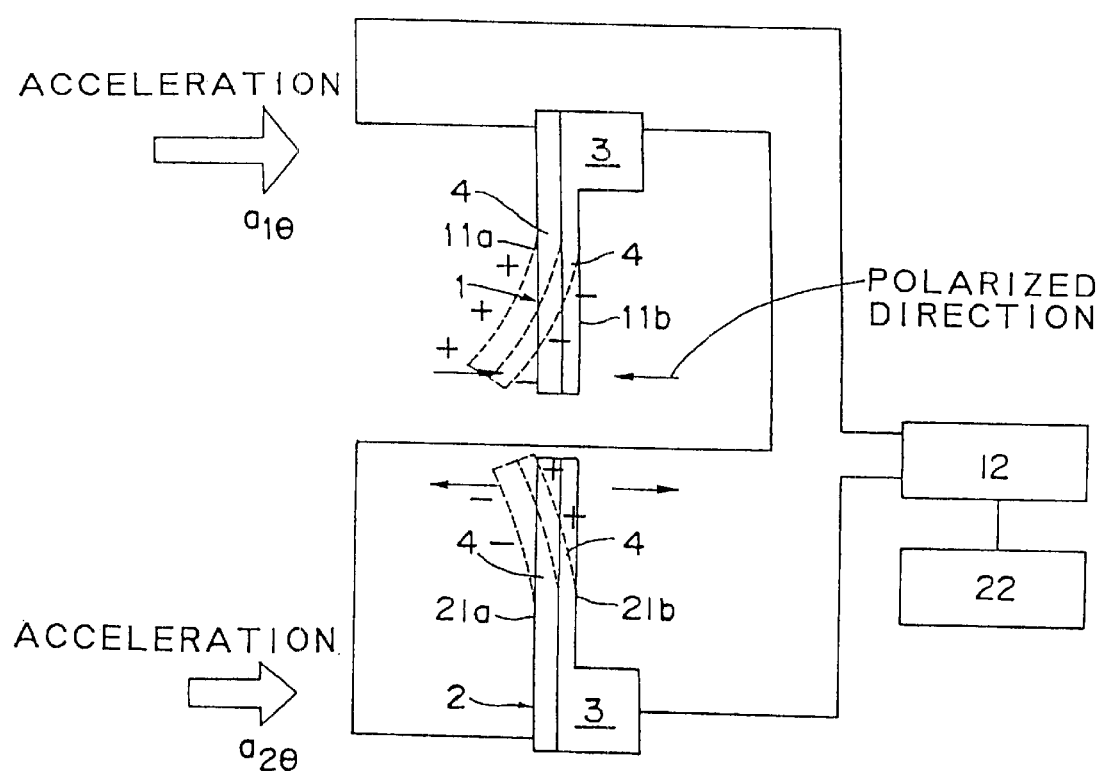
FIG. 7 is an alternative block diagram of acceleration detection using an acceleration sensor according to a second embodiment of the invention.

Another method of detecting acceleration using this acceleration sensor is described next below. FIG. 7 is a block diagram of this acceleration detection method using the acceleration sensor of the second embodiment of the invention. Electrodes 11b and 21a of the piezoelectric elements 1 and 2 are connected together, and electrodes 11a and 21b are connected to an input terminal of the signal detector 12. The two piezoelectric elements are, as a result, connected in series. A reference potential generator 22 is also provided for applying a reference potential.

The output obtained from the two piezoelectric elements 1 and 2 when rotational acceleration acts on this acceleration sensor is described next with reference to FIG. 7. When the center of rotation is at some point offset along an extension of the longitudinal axis of the cantilevers of piezoelectric elements 1 and 2, acceleration a1 θ applied to piezoelectric element 1 at a point farther from the center of rotation will be greater than acceleration a2 θ applied to piezoelectric element 2 as indicated by the size of the arrows in FIG. 7. When the respective acceleration is applied in the directions indicated by the arrows in FIG. 7, cantilever displacement will be greater at piezoelectric element 1 than in piezoelectric element 2 as indicated by the dotted lines.

Of the two piezoelectric bodies of piezoelectric element 1, the piezoelectric body on the side of electrode 11b will be extended and the piezoelectric body on the side of electrode 11a will compress as shown in FIG. 7. The piezoelectric body that compresses produces a charge of the same polarity as the polarity of polarization, but the charge produced by the piezoelectric body that stretches is the inverse of polarity of polarization, and a potential occurs between the opposing surfaces. This means that electrode 11a on the compressed piezoelectric body is positively charged matching the polarity of polarization, and electrode 11b on the extended piezoelectric body is negatively charged, which is the inverse of the polarity of polarization.

As noted above, the polarization directions of the piezoelectric bodies of piezoelectric element 2 are opposite those in piezoelectric element 1. As a result, the electrode 21a on the compressed piezoelectric body is negatively charged, and the electrode 21b on the stretched piezoelectric body is positively charged.

Because electrodes 11b and 21a are connected, the respective charges travel and the difference between the same-polarity charges to electrode 11a of piezoelectric element 1 and electrode 21b of piezoelectric element 2 can be detected. Rotational acceleration acting on this acceleration sensor produces a higher charge in the piezoelectric element farther from the center of rotation, which cancels the charge generated by the other piezoelectric element and results in the difference between the charges being input to the signal detector 12. This charge is then detected by the signal detector 12, and the rotational acceleration can be derived from the resulting output signal. Because the two piezoelectric elements are serially connected, the static capacitance of the acceleration sensor viewed from the input terminal of the signal detector 12 is lower, and the voltage output at the same charge is higher compared with the configuration shown in FIG. 5. The configuration shown in FIG. 7 thus provides higher sensitivity.

Figure 8:
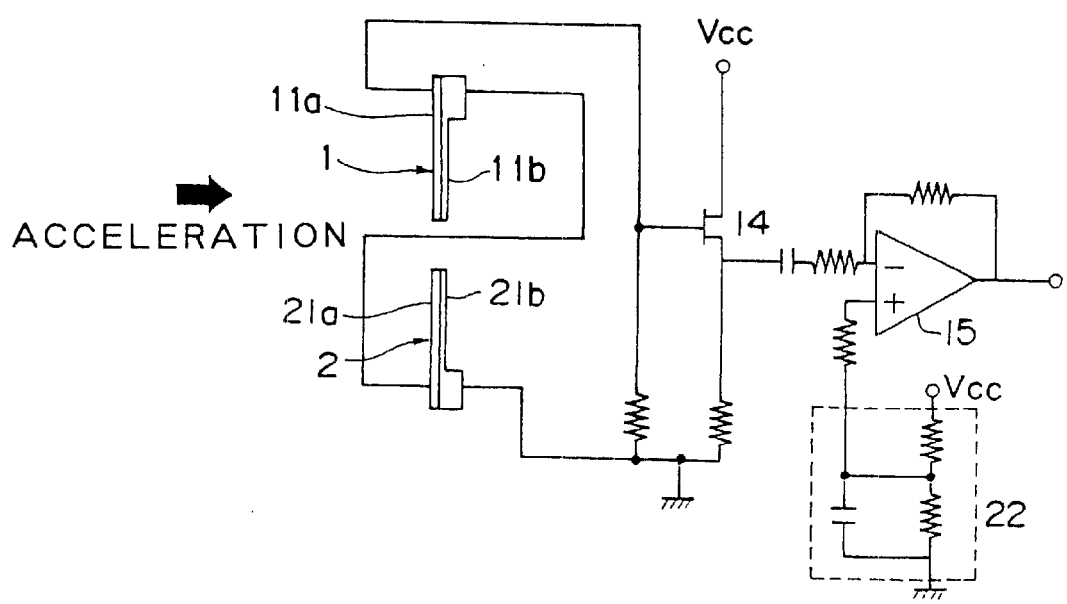
FIG. 8 is a circuit diagram of acceleration detection equivalent to the block diagram in FIG. 7.

FIG. 8 shows a circuit diagram of the signal detection means for this other acceleration detection method using an acceleration sensor according to this second embodiment of the invention. The circuit elements are the same as shown in FIG. 6, and further description thereof is thus omitted.

It should be noted that the configuration of this acceleration sensor shall not be limited to the configuration of the present embodiment. It is also possible, for example, to arrange the two piezoelectric elements with the cantilevers pointing in the same direction as shown in FIG. 12A; to dispose the support block in the middle of the piezoelectric elements as shown in FIG. 12B; or to dispose support blocks at both ends of the deflection member of the piezoelectric elements as shown in FIG. 12C.

It will also be noted that while the above embodiments are described with the support block disposed to only one side of the cantilever deflection member of the piezoelectric element, the support block could be provided on both sides.

Furthermore, while lithium niobate is used for the piezoelectric bodies in the above embodiments, the invention shall not be so limited. Lithium tantalate, quartz, and other piezoelectric single crystals could alternatively be used. Piezoelectric elements using a piezoelectric ceramic or piezoelectric ceramic laminate could further alternatively be used.

Furthermore, the piezoelectric bodies are preferably bonded using direct bonding as described above, but the invention shall not be so limited and an adhesive could be used.

Yet further, the signal processing circuits of the above embodiments use field-effect transistors and operating amplifiers, but it is also possible to directly input piezoelectric element output to the operating amplifier. Further, a reference voltage circuit or filter circuit could be provided, or an analog/digital converter could be incorporated.

Conductive paste is used for connecting the electrodes of the piezoelectric elements 1 and 2 to the conductive layer on the package 6a, but the invention shall not be so limited. Solder or lead-free solder could alternatively be used. Reliability under high temperature, high humidity operating conditions can be improved by using solder, for example.

Embodiment 3

Figure 9:
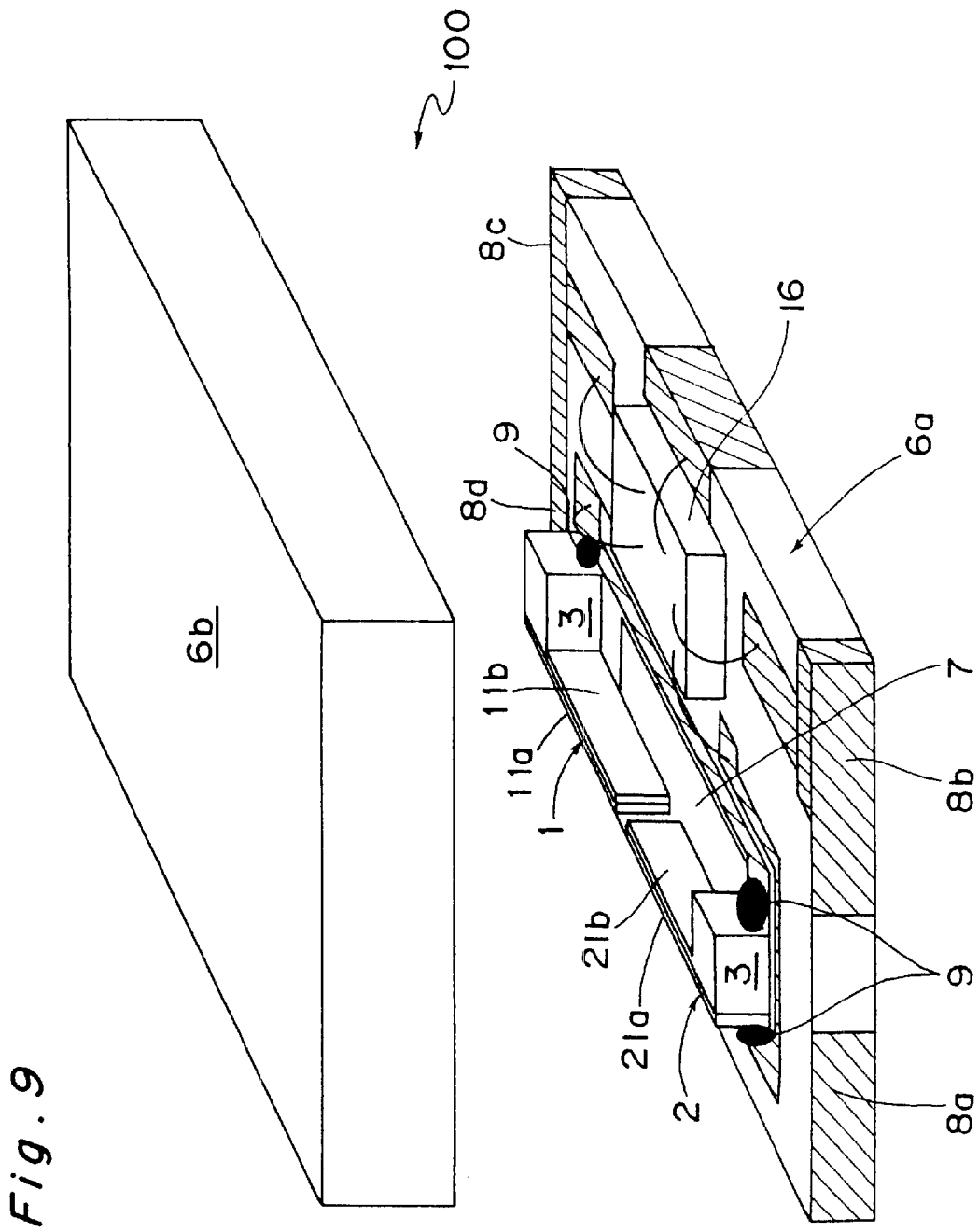
FIG. 9 is an oblique view of an acceleration sensor according to a third embodiment of the invention.

FIG. 9 is an oblique view of an acceleration sensor 100 according to a third embodiment of the invention. This embodiment differs from the first and second embodiments in that it houses an acceleration sensor 10 of the first embodiment in a package 6a, 6b with connections to external electrodes 8a, 8b, 8c, 8d, and further incorporates a semiconductor element 16 for processing piezoelectric element output inside the same package. This acceleration sensor 100 thus consists of piezoelectric elements 1 and 2, semiconductor element 16, package 6a, 6b, and external electrodes 8a, 8b, 8c, 8d. Piezoelectric elements 1 and 2 are identical to the piezoelectric elements of the acceleration sensor according to the first embodiment. The semiconductor element 16 is used as a bare chip, thus helping to make the overall acceleration sensor small.

Electrodes on the top of the semiconductor element 16 are connected to the conductive layer on package 6a by wire bonding, while electrodes on the bottom are die bonded. The piezoelectric element electrodes and conductive layer are connected with conductive paste. The external electrodes 8a, 8b, 8c, 8d are used as a power supply terminal, ground terminal, and output terminals.

The semiconductor element 16 integrates the circuit shown in the block diagram in FIG. 5 according to the acceleration sensor of the second embodiment. More specifically, the signal processing circuit integrated in this semiconductor element comprises a field-effect transistor and resistance as a source following circuit, and an operating amplifier. The source following circuit is an impedance conversion circuit. FET output passes the resistance and is input to the operating amplifier 15 for amplification. The operating amplifier thus constitutes an amplifier circuit. The signal processing circuit thus consists of one impedance circuit and an amplifier circuit. Circuit operation is as described in the second embodiment. The circuit design of the semiconductor element 16 using a FET is as shown in FIG. 6, the operation of the semiconductor element 16 is as described in the second embodiment, and further description is therefore omitted.

An equivalent detection circuit can also be built by disposing the elements on a printed circuit board, but the longer wiring lengths increase the effects of noise and lower the S/N ratio. On the other hand, noise can be reduced and a high S/N ratio achieved by housing the semiconductor element and resistance in proximity to the piezoelectric elements inside the same package. Sensor detection resolution is determined by the S/N ratio, and high resolution can be achieved by housing the semiconductor element and other components in the same package. This is particularly important with piezoelectric elements made of lithium niobate or piezoelectric single crystal because the static capacitance is low, impedance is high, and the piezoelectric elements are thus susceptible to noise. In addition, the resistance of the current-voltage converting resistor must be increased when the cut-off frequency on the low frequency side is lowered, and susceptibility to noise is thus increased. The construction of the present embodiment is a particularly effective means of avoiding these problems.

Furthermore, differences in the amplification rate due to differences in temperature or other environmental factors can also be substantially ignored as a result of housing the piezoelectric element and semiconductor element in the same package. Rotational acceleration can therefore be detected with excellent accuracy.

It will be further noted that the circuit configuration of the semiconductor element shall not be limited to that described above. For example, piezoelectric element output could be input directly to an amplifier circuit without using a buffer amplifier or impedance conversion circuit, or an amplifier circuit for additional gain could be provided downstream. An amplifier circuit for obtaining even greater gain, or an analog/digital conversion circuit could also be provided downstream of the adder.

It is yet further possible to house only some of the circuit elements inside the same package 6a, 6b and place the remaining circuit elements on a printed circuit board instead of housing all circuit elements in the package 6a, 6b.

It will also be obvious that the construction of the acceleration sensor shall not be limited to that of the first embodiment. It is also possible, for example, to arrange the two piezoelectric elements with the cantilevers pointing in the same direction as shown in FIG. 12A; to dispose the support block in the middle of the piezoelectric elements as shown in FIG. 12B; or to dispose support blocks at both ends of the deflection member of the piezoelectric elements as shown in FIG. 12C.

An acceleration sensor according to this embodiment of the invention is thus compact, can detect rotational acceleration with good sensitivity using only one sensor, and features a high S/N ratio and resolution.

Embodiment 4

Figure 10:
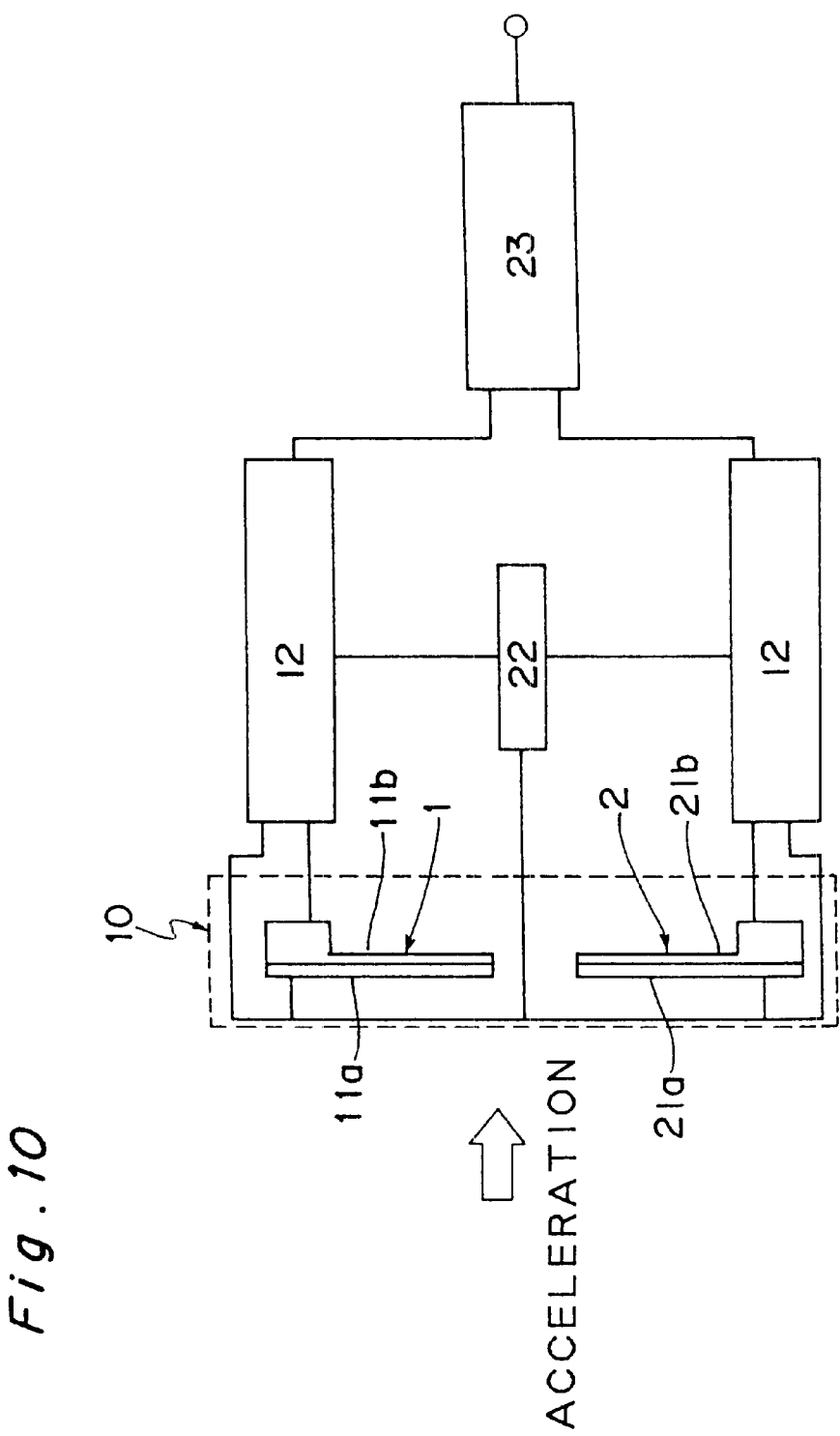
FIG. 10 is a block diagram of an acceleration detection apparatus according to a fourth embodiment of the invention.

An acceleration detection apparatus according to a fourth embodiment of the invention is the same as the acceleration detection apparatus of the third embodiment in appearance as shown in FIG. 9, but differs therefrom in the circuit configuration of the semiconductor element 16 housed inside package 6a, 6b. FIG. 10 is a block diagram of an acceleration detection apparatus 100 according to the present embodiment. The acceleration sensor 10 of this acceleration detection apparatus is the same as the acceleration sensor of the first embodiment. The piezoelectric elements 1 and 2 are connected to a respective signal detector 12 and reference potential generator 22. The electrodes on the same right and left sides of the piezoelectric elements 1 and 2 are connected to the same-function terminals of the signal detectors 12. Output signals from the piezoelectric elements are input to an adder 23. Because the polarity at the bonding interface of the two piezoelectric bodies forming piezoelectric element 1 is the inverse of the same polarity in piezoelectric element 2, the signal detectors 12 will output inverse polarity signals in response to acceleration in the same direction. When these output signals are then in put to adder 23, the adder 23 outputs a signal proportional to the difference in acceleration acting on the two piezoelectric elements, and rotational acceleration can be detected.

Figure 11:
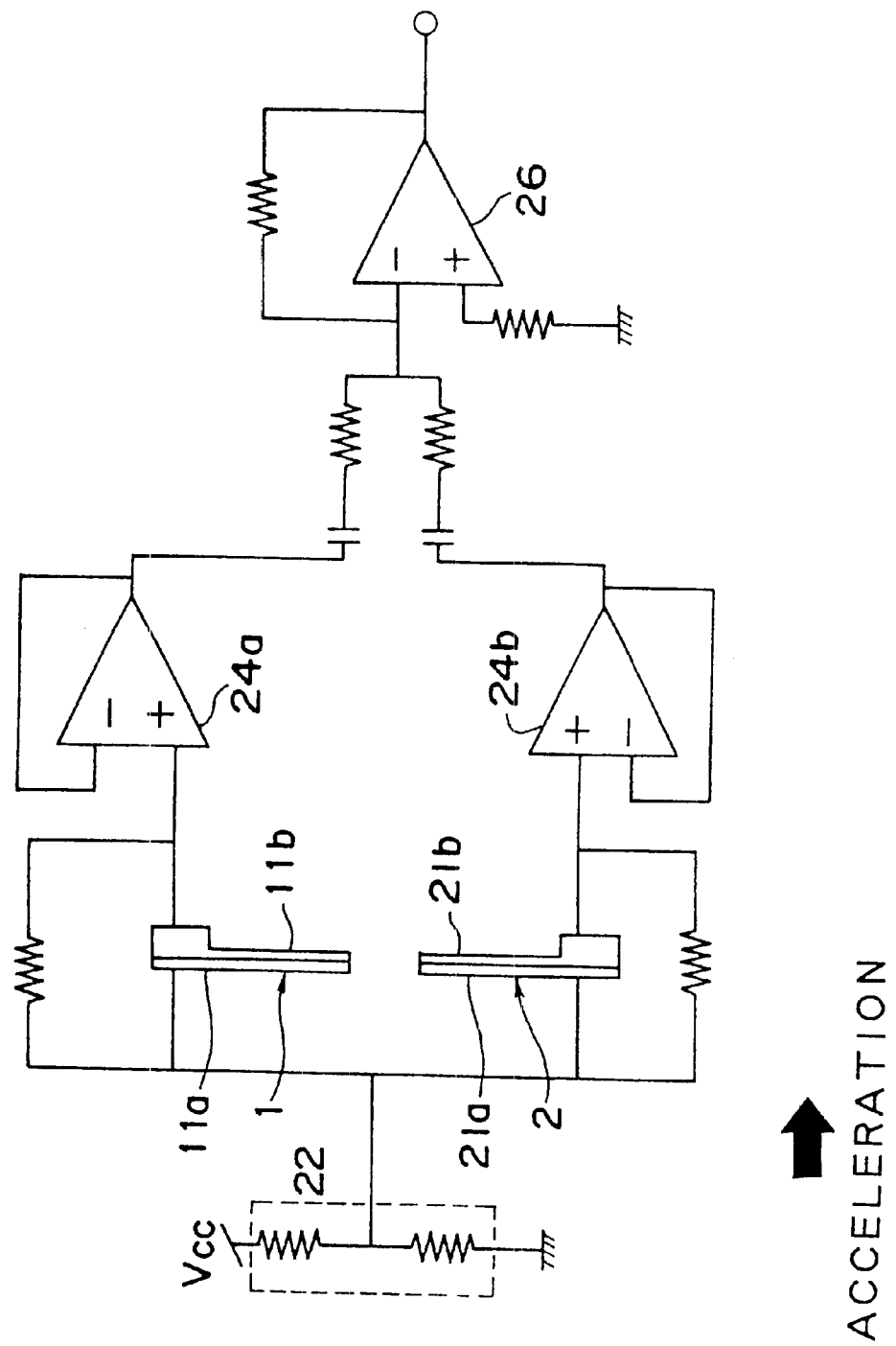
FIG. 11 is a circuit diagram of an acceleration detection apparatus according to a fourth embodiment of the invention.

FIG. 11 shows the equivalent circuit diagram for an acceleration detection apparatus according to this fourth embodiment of the invention. The signal detectors 12 comprise a buffer amplifier 24a, 24b and resistance; adder 23 comprises a downstream differential circuit 26 and resistance, and outputs a rotational acceleration signal. The reference potential generator 22 is a resistance voltage divider. The buffer amplifiers and differential circuit are operating amplifiers. Operating amplifiers can therefore be used for the semiconductor elements, which can thus be simplified. The signal processing circuit in this configuration consists of two signal detectors 12 each having a buffer amplifier and resistance, and an adder 23 having a differential circuit and resistance. More specifically, the signal processing circuit consists of two impedance conversion circuits and an adder. With this configuration the adder outputs a signal proportional to the rotational acceleration. It should be noted that some wiring, including the power source and ground, are not shown in FIG. 11.

When the output signals from the two piezoelectric elements are added, rotational acceleration can be ignored in practice if the difference is zero because the output signal are practically the same in magnitude but inverse polarity. In this case, however, the output signal from one of the signal detection means can be used as indicative of translational acceleration. This translational acceleration can be detected by, for example, connecting the output of buffer amplifier 24*a* in FIG. 9 to an external electrode. It is therefore possible using this one acceleration detection apparatus to detect both rotational acceleration and detect translational acceleration when rotational acceleration is effectively zero and there is only translational acceleration.

This acceleration detection apparatus 100 can house the acceleration sensor 10 and semiconductor element 16 in the same package in the same way as the acceleration detection apparatus of the third embodiment shown in FIG. 7. It is therefore simple to connect electrodes on the same sides of the piezoelectric elements to terminals of the same function in the semiconductor element, and wiring is thus simplified. Furthermore, an adder can be used because the outputs of the piezoelectric elements 1 and 2 are inverse polarity, it is not necessary to use an operating amplifier with a high common-mode rejection ratio when using a differential circuit, and the configuration of the semiconductor element can be simplified.

An equivalent detection circuit can also be built by disposing the elements on a printed circuit board, but the longer wiring lengths increase the effects of noise and lower the S/N ratio. On the other hand, noise can be reduced and a high S/N ratio achieved by housing the semiconductor element and resistance in proximity to the piezoelectric elements inside the same package. Sensor detection resolution is determined by the S/N ratio, and high resolution can be achieved by housing the semiconductor element and other components in the same package. This is particularly important with piezoelectric elements made of lithium niobate or piezoelectric single crystal because the static capacitance is low, impedance is high, and the piezoelectric elements are thus susceptible to noise. In addition, the resistance of the current-voltage converting resistor must be increased when the cut-off frequency on the low frequency side is lowered, and susceptibility to noise is thus increased. The construction of the present embodiment is a particularly effective means of avoiding these problems.

Furthermore, differences in the amplification rate due to differences in temperature or other environmental factors can also be substantially ignored as a result of housing the piezoelectric element and semiconductor element in the same package. Rotational acceleration can therefore be detected with excellent accuracy.

It will be further noted that the circuit configuration of the semiconductor element shall not be limited to that described above. For example, piezoelectric element output could be input directly to an amplifier circuit without using a buffer amplifier or impedance conversion circuit, or an amplifier circuit for additional gain could be provided downstream. An amplifier circuit for obtaining even greater gain, or an analog/digital conversion circuit could also be provided downstream of the adder.

It is yet further possible to house only some of the circuit elements inside the same package and place the remaining circuit elements on a printed circuit board instead of housing all circuit elements in the package.

It will also be obvious that the construction of the acceleration sensor shall not be limited to that of the first embodiment. It is also possible, for example, to arrange the two piezoelectric elements with the cantilevers pointing in the same direction as shown in FIG. 12A; to dispose the support block in the middle of the piezoelectric elements as shown in FIG. 12B; or to dispose support blocks at both ends of the deflection member of the piezoelectric elements as shown in FIG. 12C.

An acceleration sensor according to this embodiment of the invention is thus compact, can detect rotational acceleration with good sensitivity using only one sensor, and features a high S/N ratio and resolution.

Embodiment 5

Figure 13A:
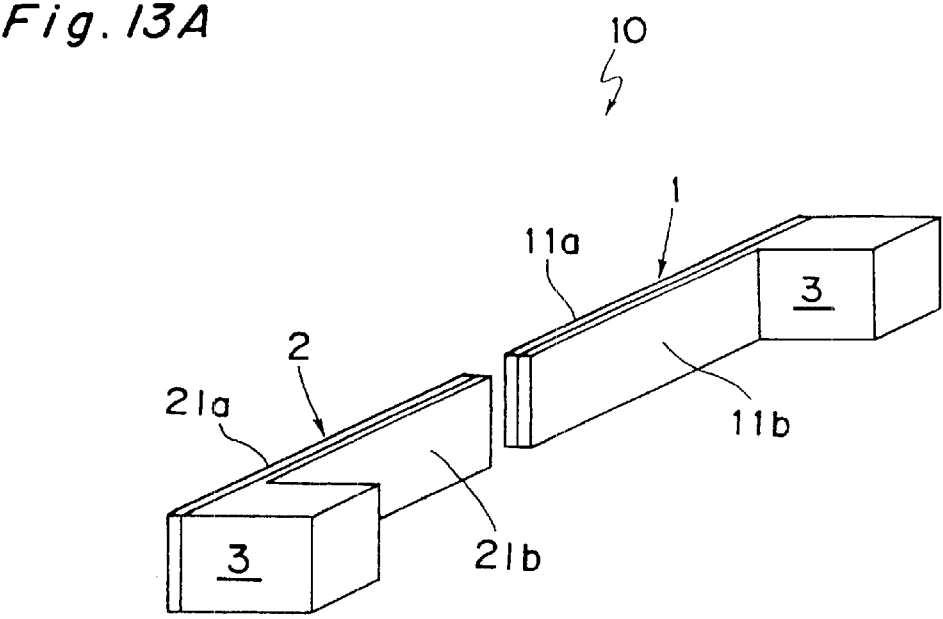
FIG. 13A is an oblique view of an acceleration sensor according to a fifth embodiment of the invention.
Figure 13B:
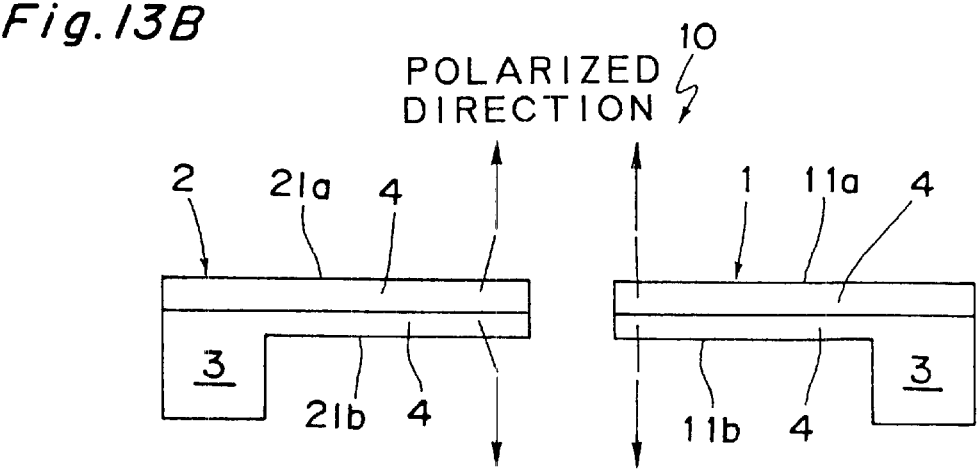
FIG. 13B is a plan view of the same.

FIG. 13A is an oblique view of an acceleration sensor according to a fifth embodiment of the invention, and FIG. 13B is a plan view of the same. This acceleration sensor 10 is the same as the acceleration sensor of the first embodiment in that two piezoelectric bodies with opposite polarization directions are bonded with the same polarity sides thereof together in one of the piezoelectric elements. This acceleration sensor 10 differs in that the polarization directions of the piezoelectric bodies are the same in piezoelectric element 1 and piezoelectric element 2. More specifically, the piezoelectric bodies are bonded with the same polarity sides together so that the polarity of polarization of the bonded surfaces is the same in piezoelectric elements 1 and 2. In other words, the polarization directions of the two piezoelectric bodies forming one piezoelectric element are symmetrically oriented in opposite directions, and the polarization directions of the piezoelectric bodies on the same sides of the piezoelectric elements 1 and 2 are oriented in the same direction.

An acceleration sensor according to this embodiment comprises two piezoelectric elements 1 and 2. Each piezoelectric element has a cantilevered structure in which one end of a bimorph cantilever is supported by a support block 3; each bimorph cantilever comprises two bonded piezoelectric bodies with the direction of polarization oriented in opposite directions. An electrode 11*a*, 11*b*, 21*a*, 21*b* is formed on the two opposite sides of the cantilever of each piezoelectric element 1 and 2. Because of the step between the cantilever and support block 3, the electrodes 11*b* and 21*b* on the same side as the support block 3 are formed continuously to the step face so that there is electrical conductivity between the cantilever and support block 3. The electrodes 11*a* and 21*a* on the side opposite the support block 3 are formed over the entire surface.

Because their bimorph structure bonding two piezoelectric bodies, the cantilevers convert vibration induced by acceleration to an electrical signal, which can be extracted from the electrodes. The surfaces of the cantilever portions of the piezoelectric elements 1 and 2 are aligned effectively on the same plane in order to detect acceleration in the same direction using two piezoelectric elements. In order to improve the precision with which rotational acceleration is detected in a limited space, it is preferable to place the two piezoelectric elements so that the support blocks 3 to which acceleration is conveyed are separated as much as possible and the free ends of the cantilever portions are in mutual proximity. More specifically, the piezoelectric elements 1 and 2 are aligned in line on the same longitudinal axis with the free ends of the cantilevers in proximity and the support block ends of the cantilevers disposed to the outside in mutually opposite directions as shown in FIG. 13.

The piezoelectric elements 1 and 2 of this acceleration sensor 10 are manufactured by direct bonding of two piezoelectric bodies in the same was as the piezoelectric elements of the acceleration sensor according to the first embodiment.

Embodiment 6

Figure 14:
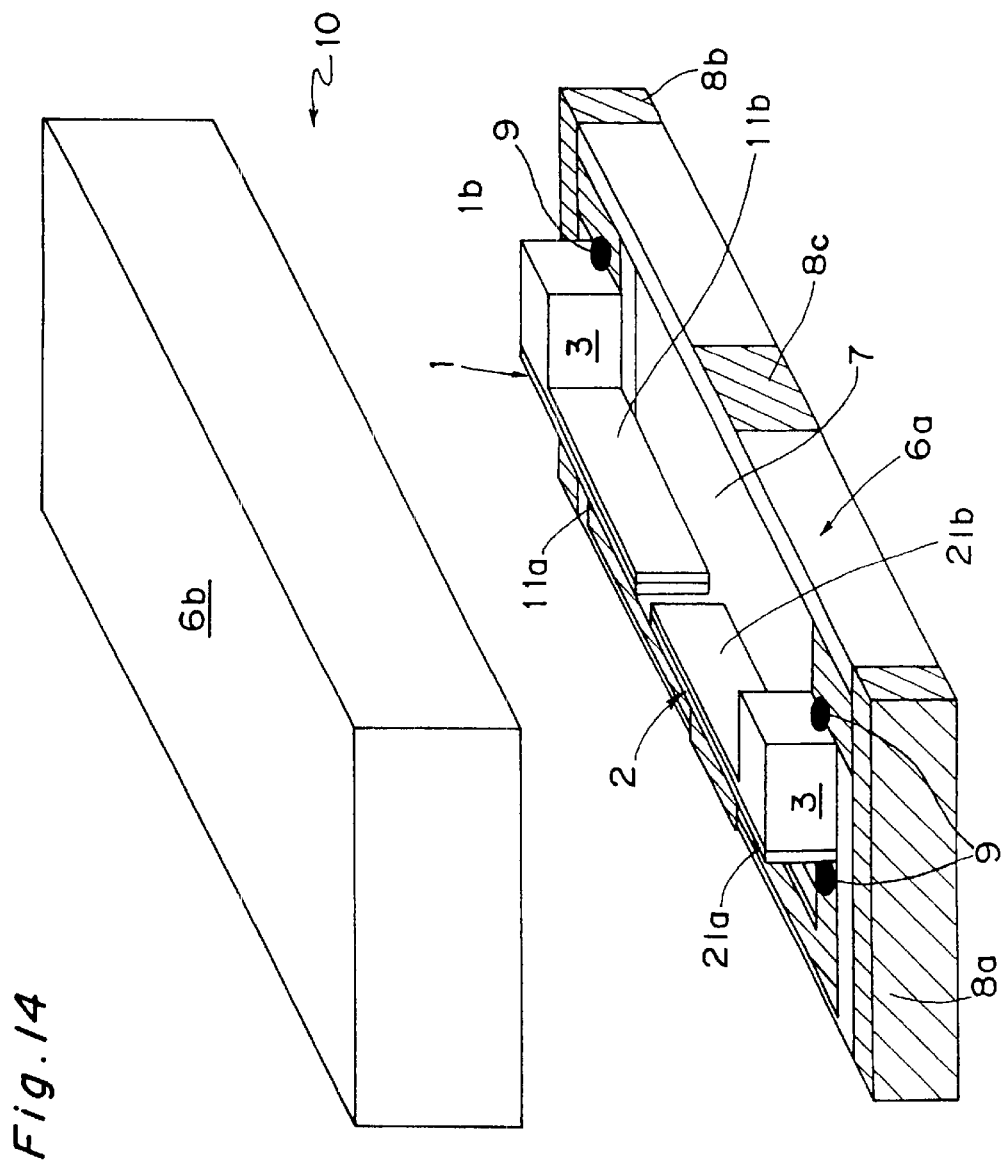
FIG. 14 is an oblique view of an acceleration sensor according to a sixth embodiment of the invention.

FIG. 14 is an oblique view of an acceleration sensor 10 according to a sixth embodiment of the invention. This embodiment differs from the fifth embodiment in that it houses an acceleration sensor of the fifth embodiment in a package 6a, 6b and makes it easier to extract the output of the piezoelectric element electrodes from external electrodes on the sides of the package. The piezoelectric elements 1 and 2 of the acceleration sensor 10 are fixed to the package 6a at the respective support blocks 3. A recess 7 is formed in the package 6a so that the cantilevers of the piezoelectric elements do not contact the package 6a, and the package 6a thus does not interfere with flexure caused by the transmission of acceleration.

External electrodes 8a, 8b, and 8c form an output terminal at each end and at the middle of the package 6a. Electrodes 11a and 11b of piezoelectric element 1 are connected to external electrodes 8c and 8b by way of the conductive layer on package 6a. Electrodes 21a and 21b of piezoelectric element 2 are connected to external electrodes 8c and 8a by way of the conductive layer on package 6a. The conductive layer and electrodes are electrically connected by a conductive paste 9. The package 6a is then covered by package 6b, forming acceleration sensor 10.

With this configuration of an acceleration sensor 10, conductivity between the surface of support block 3 and the conductive layer on the package is achieved with the conductive paste, and the amount of conductive paste applied thus has no effect on the resonance frequency of the cantilever, for example. More specifically, by connecting the support block 3 to the electrodes using a conductive paste, variation in such characteristics as the resonance frequency and sensitivity of the piezoelectric elements 1 and 2 can be reduced. If output is obtained from the cantilevers of the piezoelectric elements by applying the conductive paste thereto, differences in the amount of paste applied and overspread to the cantilever will cause piezoelectric element characteristics to vary. However, by obtained piezoelectric element output from the support block portion, performance is determined substantially only by the shape of the piezoelectric element regardless of the amount of conductive paste applied, and variation in piezoelectric element characteristics can be reduced. The smaller area of the connection on the surface where the electrode is divided into two parts limits the amount of conductive paste that can be applied, and it is therefore preferable to connect to the support block electrode.

If solder, for example, is used to make an electrically conductive connection directly to the cantilever, the heat conducted to the piezoelectric body of the piezoelectric element can raise the piezoelectric body to a high temperature, causing such problems as degraded performance and reduced sensitivity. These problems can be avoided, however, by soldering to the support block 3 because heat transfer to the cantilever is more difficult.

Figure 15:
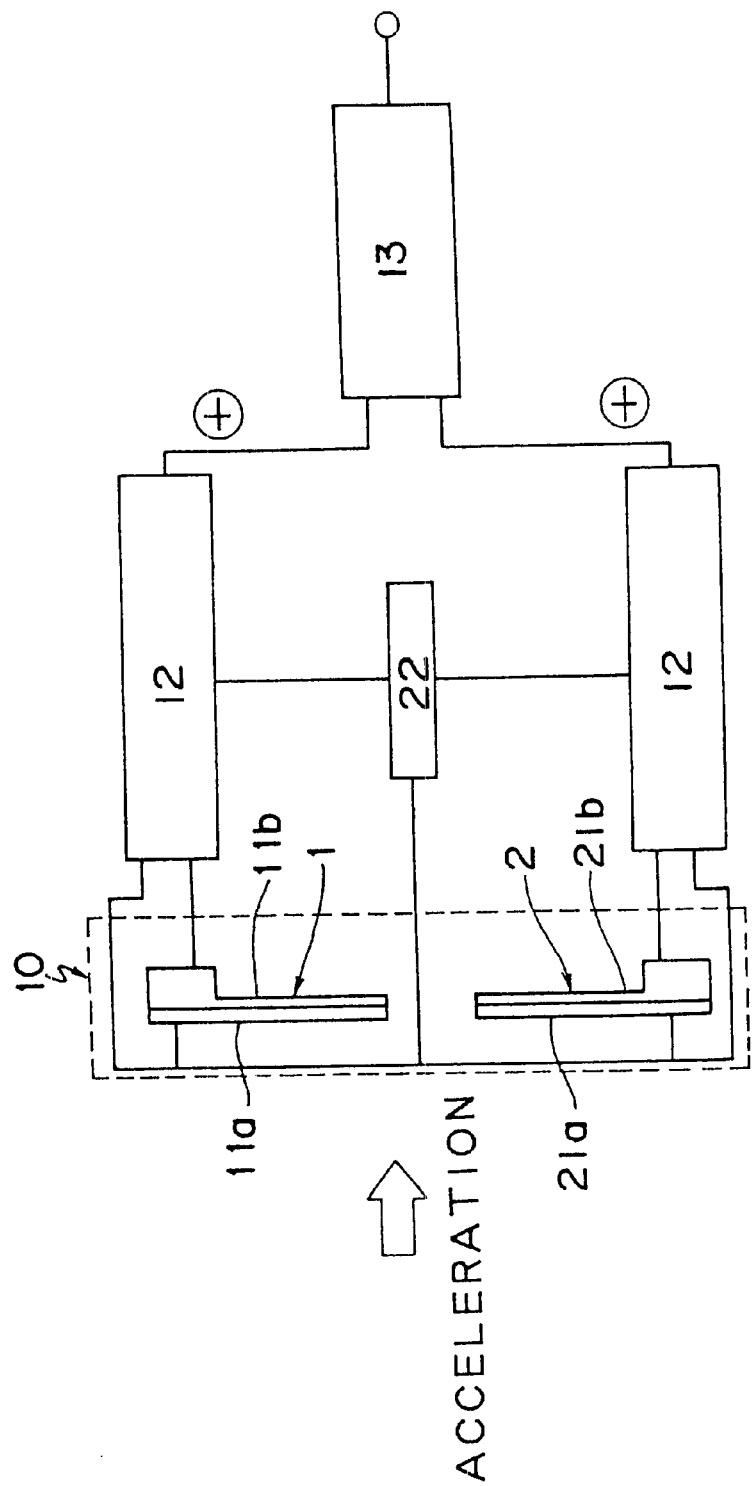
FIG. 15 is a block diagram of acceleration detection using an acceleration sensor according to a sixth embodiment of the invention.

A method for detecting acceleration using this acceleration sensor is described next. FIG. 15 is a block diagram of acceleration detection using the acceleration sensor according to this embodiment of the invention. Output from piezoelectric elements 1 and 2 of acceleration sensor 10 is connected to the respective signal detector 12, and the output of signal detector 12 is connected to differential amplifier 13. A reference potential generator 22 is also provided for applying a reference potential. The same-side electrodes (that is, 11a and 21a, and 11b and 21b) of the cantilever portion of piezoelectric elements 1 and 2 are respectively connected to the same-function terminals of the signal detectors 12. This assures that a positive signal is output from signal detectors 12 when acceleration is applied as indicated by the arrow in the figure.

Figure 16:
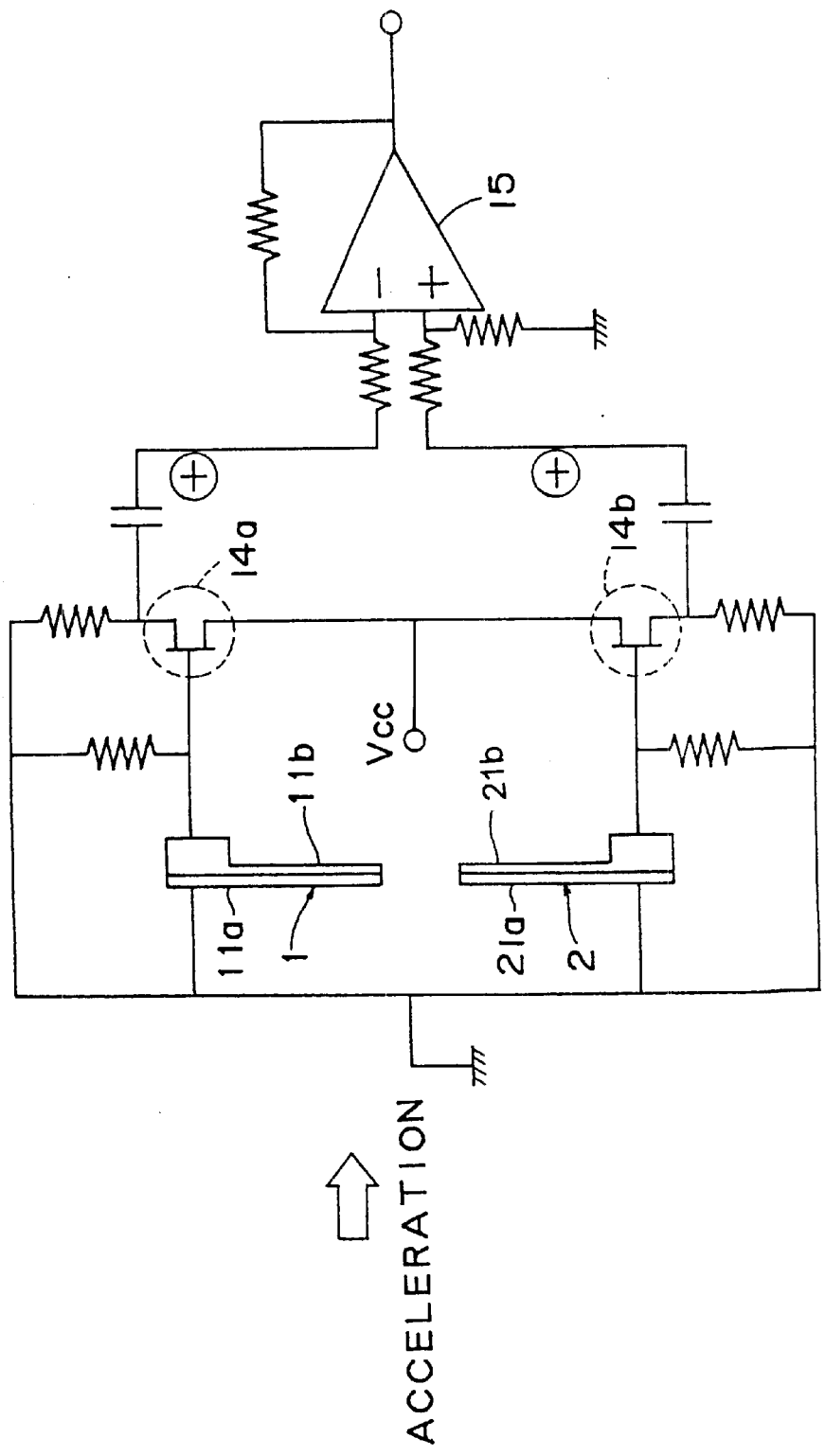
FIG. 16 is a circuit diagram of an acceleration detection apparatus according to a sixth embodiment of the invention.

FIG. 16 is a circuit diagram of the signal detection means of this embodiment. Output from electrodes 11b, 21b of piezoelectric elements 1 and 2 is input to the gate of FET 14a and 14b, respectively. Electrodes 11a and 21a are grounded by an external electrode of the package. A resistance is connected parallel to piezoelectric elements 1 and 2, converting piezoelectric element output to a voltage. A resistance is also connected to the source of FET 14a and 14b, forming a source following circuit. This source follower constitutes an impedance conversion circuit. The reference potential is the ground potential.

When acceleration occurs as indicated by the arrow in FIG. 16, both piezoelectric elements output a positive signal. Output from FETs 14a and 14b is input through the resistance to operating amplifier 15 and amplified. The operating amplifier 15 is a differential amplifier that outputs the difference between the output signals from FETs 14a and 14b. The difference between the output signals from the two piezoelectric elements 1 and 2 is thus detected. It is thus possible to detect the difference between the acceleration applied to the two piezoelectric elements.

As described above, rotational acceleration can be detected from the differential output. As described above with reference to FIG. 3, rotational acceleration detection sensitivity is proportional to the interval δ r between the support blocks 3 of the two piezoelectric elements 1 and 2. It is therefore necessary to increase distance δ r as much as possible in order to increase rotational acceleration detection sensitivity. A cantilever type acceleration sensor operates in a fixed-end drive mode in which acceleration is transferred from the support block. It is therefore preferable to increase the distance between the support blocks 3 of the two piezoelectric elements as much as possible. In this embodiment the support blocks 3 are positioned at opposite ends inside the package 6a, 6b, thereby maximizing the distance therebetween.

It should be noted that the signal processing circuits 12 use field-effect transistors and operating amplifiers, but it is also possible to directly input piezoelectric element output to the operating amplifier without using FETs. Further, a reference voltage circuit or filter circuit could be provided, or an analog/digital converter could be incorporated.

Embodiment 7

An acceleration sensor according to this seventh embodiment is the same as the acceleration sensor of the sixth embodiment in that it houses an acceleration sensor according to the fifth embodiment in a package 6a, 6b, but differs from the sixth embodiment in the external electrodes provided as output terminals. More specifically, this acceleration sensor has a set of external electrodes connecting electrodes of the same charge polarity between the piezoelectric elements. More specifically, electrode 11a of piezoelectric element 1 and electrode 21b of piezoelectric element 2 are connected to a common node connected to one external electrode, electrode 11b of piezoelectric element 1 and electrode 21a of piezoelectric element 2 are connected to another common node connected to another external electrode, and these external electrodes form a pair of output terminals.

Figure 17:
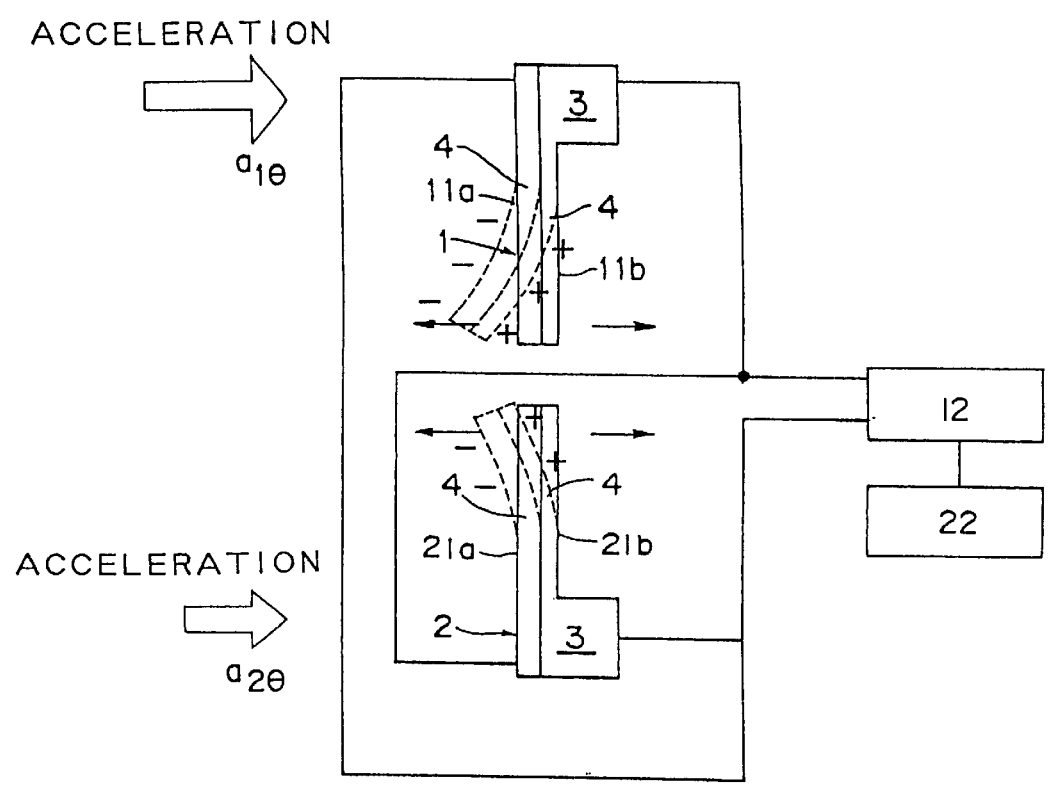
FIG. 17 is a block diagram of acceleration detection using an acceleration sensor according to a seventh embodiment of the invention.

An acceleration detection method using this acceleration sensor 10 is described next with reference to FIG. 17. As shown in FIG. 17, electrodes of different charge polarities generated by the piezoelectric elements are connected to the same outputs, and these outputs from the piezoelectric elements 1 and 2 of acceleration sensor 10 are connected to signal detector 12. More specifically, electrodes (11*a* and 21*b*, and 11*b* and 21*a*) on different sides of the cantilevers of piezoelectric elements 1 and 2 are connected to common nodes, which are then connected to a respective terminal of signal detector 12. As a result, when acceleration is applied as indicated by the arrows in the figure, rotational acceleration can be detected from the output signal of the signal detector 12, which corresponds to the difference between the charges generated by the piezoelectric elements 1 and 2.

Figure 18:
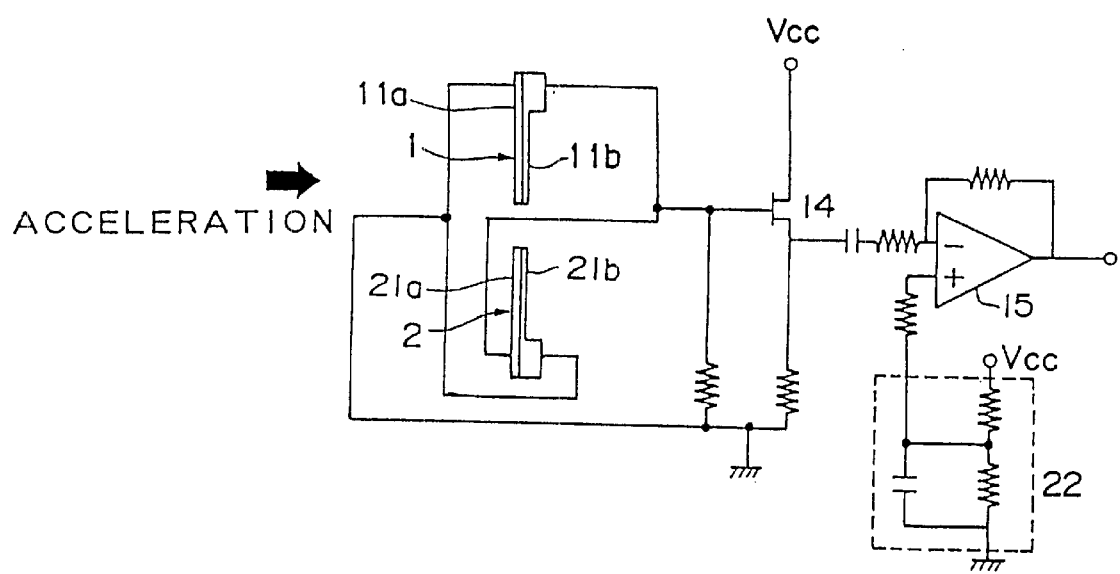
FIG. 18 is a circuit diagram of an acceleration detection apparatus according to a seventh embodiment of the invention.

FIG. 18 shows an equivalent circuit diagram for the block diagram shown in FIG. 17. This signal detection means has a field effect transistor (FET) 14 and resistance as a source follower, and an operating amplifier 15. Output from electrodes 11*b*, 21*a* of piezoelectric elements 1 and 2 is input to the gate of FET 14. Electrodes 11*a* and 21*b* are grounded by an external electrode of the package. A resistance is connected between the ground and the gate of FET 14, converting output from the piezoelectric element to a voltage. A resistance is also connected to the source of FET 14, forming a source following circuit. This source follower constitutes an impedance conversion circuit.

Output from the FET 14 is input through the resistance to operating amplifier 15 and amplified. Operating amplifier 15 is an amplifier circuit. The reference potential is obtained by resistance voltage dividing the source voltage. It will thus be apparent that the difference of the acceleration applied to two piezoelectric bodies can be detected using only a simple amplifier circuit, and it is not necessary to use a differential amplifier or other such circuit.

Figure 19:
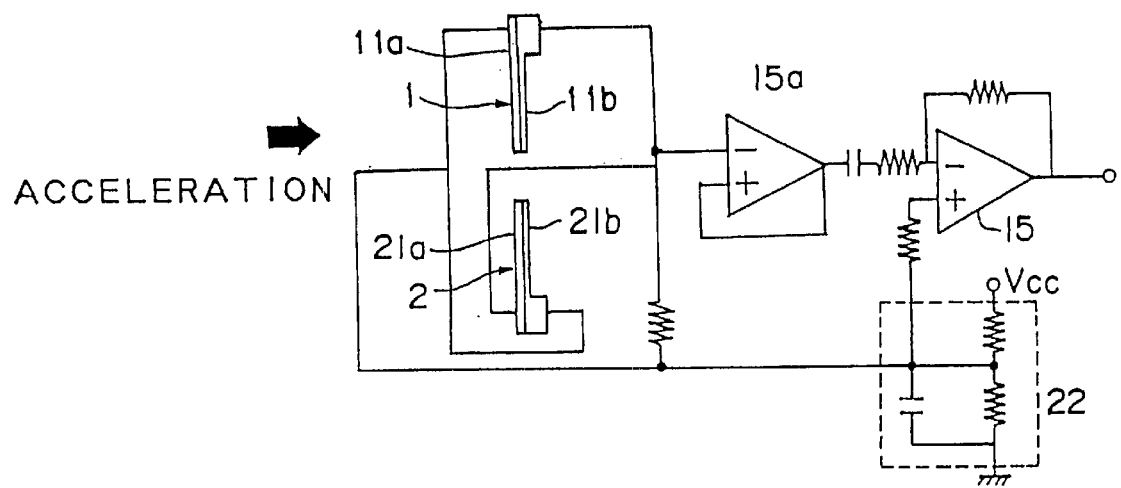
FIG. 19 is a circuit diagram of an acceleration detection apparatus according to a seventh embodiment of the invention.

FIG. 19 shows another equivalent circuit diagram for the block diagram shown in FIG. 17. With the signal detection means shown in FIG. 19 piezoelectric element output is input directly to the operating amplifier without using a FET 14, and comprises two operating amplifiers and a resistance. Output from electrodes 11*b* and 21*a* of piezoelectric elements 1 and 2 is input to the operating amplifier 15*a*. Electrodes 11*a* and 21*b* are grounded from an external electrode of the package. Output from operating amplifier 15*a* is input through a resistance to operating amplifier 15 and amplified. Operating amplifier 15 is thus an amplifier circuit. The reference potential is obtained by resistance voltage dividing the source voltage. It will thus be apparent that the difference of the acceleration applied to two piezoelectric bodies can be detected using a simple amplifier circuit consisting of an operating amplifier.

A further method for detecting acceleration using the acceleration sensor 10 of this embodiment is described below with reference to the block diagram in FIG. 20. In this case output electrodes of the same charge polarities generated by the piezoelectric elements are connected, and the other output electrodes of the piezoelectric elements 1 and 2 of acceleration sensor 10 are connected to signal detector 12. More specifically, electrodes 11*a* and 21*a* on the same sides of the cantilever portions of the piezoelectric elements 1 and 2 are interconnected, and the electrodes 11*b* and 21*b* on the other sides of the cantilevers are connected to the terminals of the signal detector 12. The two piezoelectric elements are thus connected in series. Therefore, when acceleration is applied as indicated by the arrows in the figure, the signal detector 12 outputs a signal corresponding to the difference in the charges generated by the two piezoelectric elements 1 and 2, and rotational acceleration can be detected from this signal detector output signal. Because the two piezoelectric elements are serially connected, the static capacitance of the acceleration sensor viewed from the input terminal of the signal detector 12 is lower, and sensitivity is thus increased.

Figure 20:
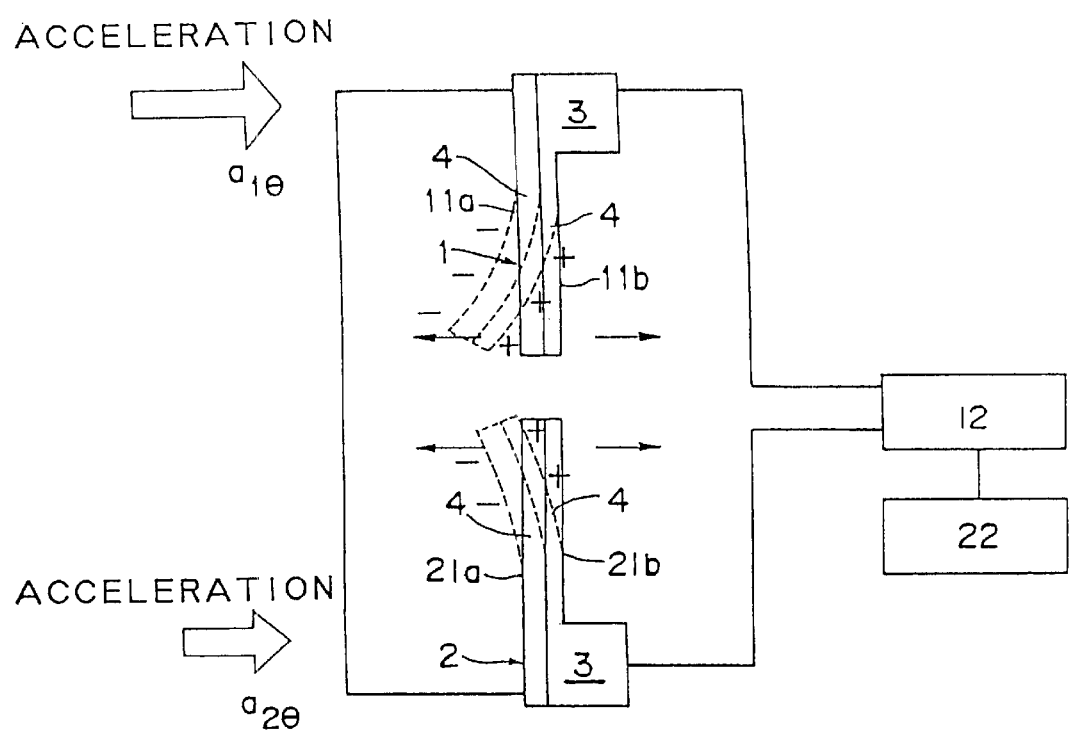
FIG. 20 is a block diagram of another acceleration detection method using an acceleration sensor according to a seventh embodiment of the invention.
Figure 21:
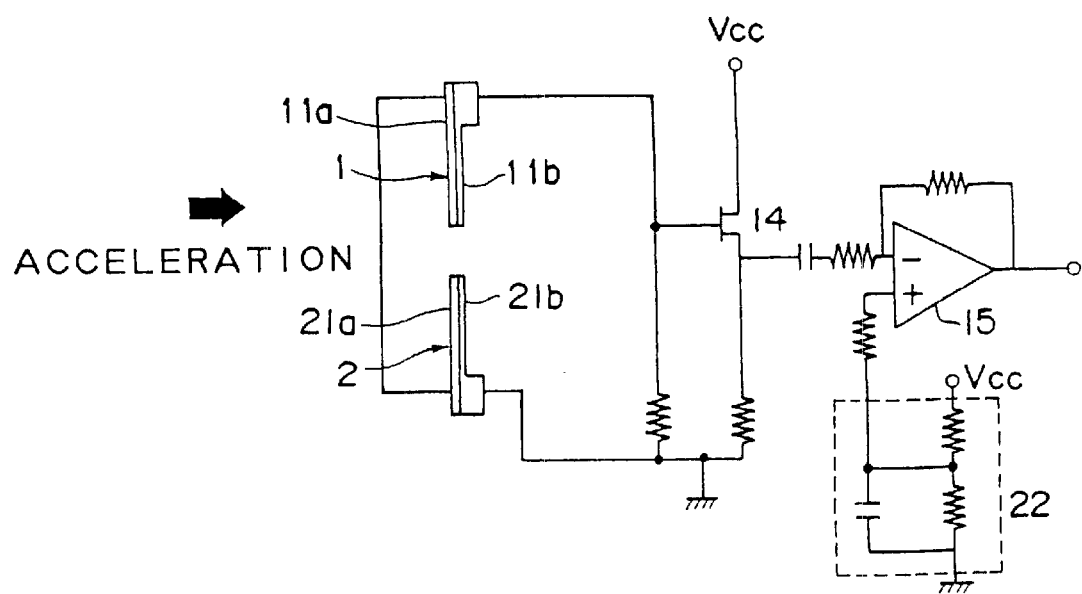
FIG. 21 is a circuit diagram of another acceleration detection method using an acceleration sensor according to a seventh embodiment of the invention.

A circuit diagram equivalent to the block diagram shown in FIG. 20 is shown in FIG. 21. The elements of this circuit are the same as shown in FIG. 18, and further description is omitted. It will also be noted that the circuit shown in FIG. 19 may also be used.

Embodiment 8

Figure 22:
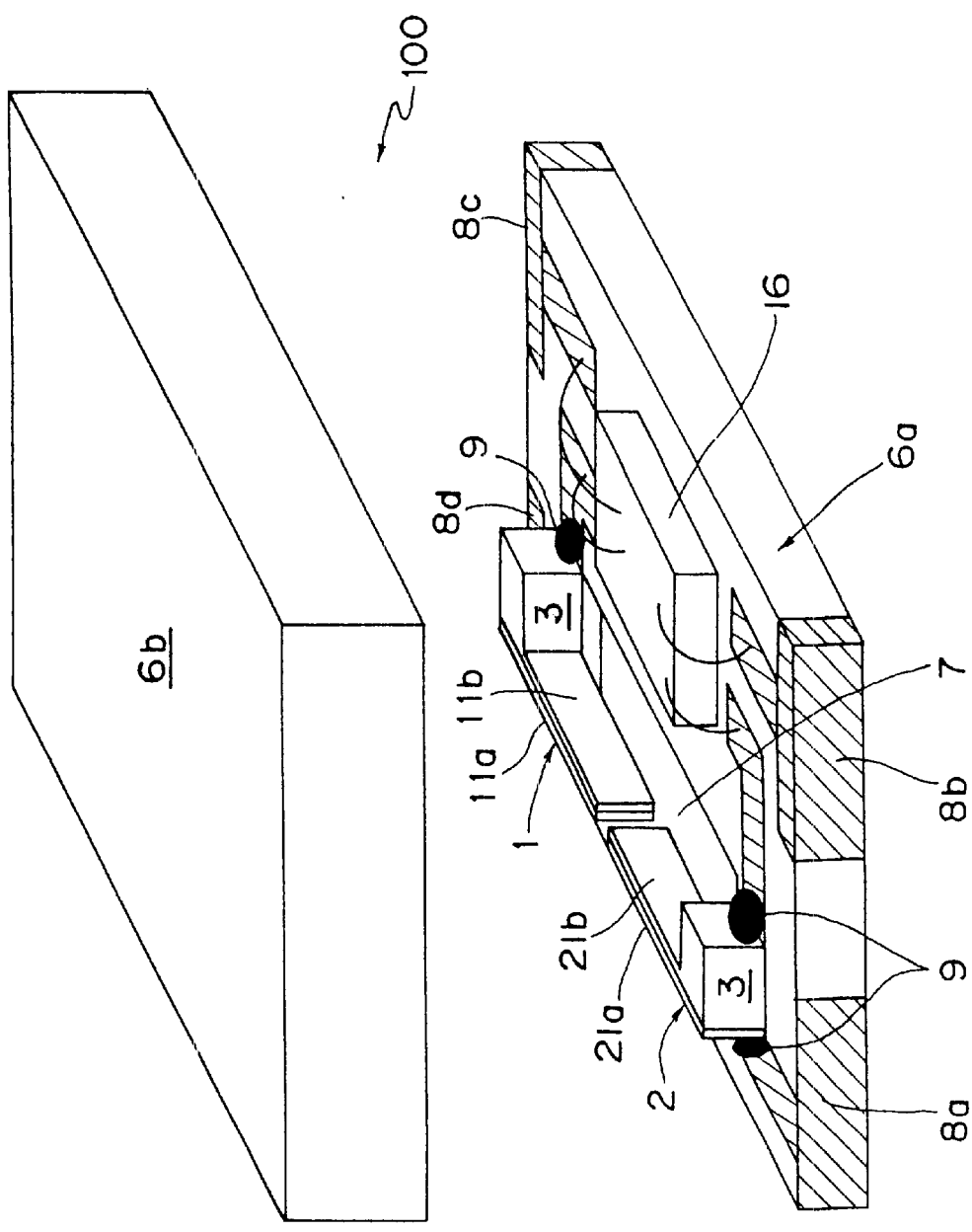
FIG. 22 is an oblique view of an acceleration detection apparatus according to an eighth embodiment of the invention.

FIG. 22 is an oblique view of an acceleration sensor 100 according to an eighth embodiment of the invention. This embodiment differs from the acceleration sensor of the sixth embodiment in that it houses a semiconductor element 16 for processing piezoelectric element output inside the package 6*a*, 6*b*. This acceleration sensor 100 consists of piezoelectric elements 1 and 2, semiconductor element 16, package 6*a*, 6*b*, and external electrodes 8*a*, 8*b*, 8*c*, 8*d*. Piezoelectric elements 1 and 2 are identical to the piezoelectric elements of the acceleration sensor according to the fifth embodiment. The semiconductor element 16 is used as a bare chip, thus helping to make the overall acceleration sensor small.

The semiconductor element 16 integrates the signal processing circuit, and comprises two impedance conversion circuits and a differential amplifier. Electrodes on the top of the semiconductor element 16 are connected to the conductive layer on package 6*a* by wire bonding, while electrodes on the bottom are die bonded. The piezoelectric element electrodes and conductive layer are connected with conductive paste. The external electrodes 8*a*, 8*b*, 8*c*, 8*d* are used as a power supply terminal, ground terminal, and output terminals.

The semiconductor element 16 integrates the circuit shown in the block diagram in FIG. 15, and operates as described in the fifth embodiment. A semiconductor element 16 using FETs can be achieved as shown in FIG. 16. The operation is again as described in the fifth embodiment, and further description is therefore omitted.

Embodiment 9

Figure 23:
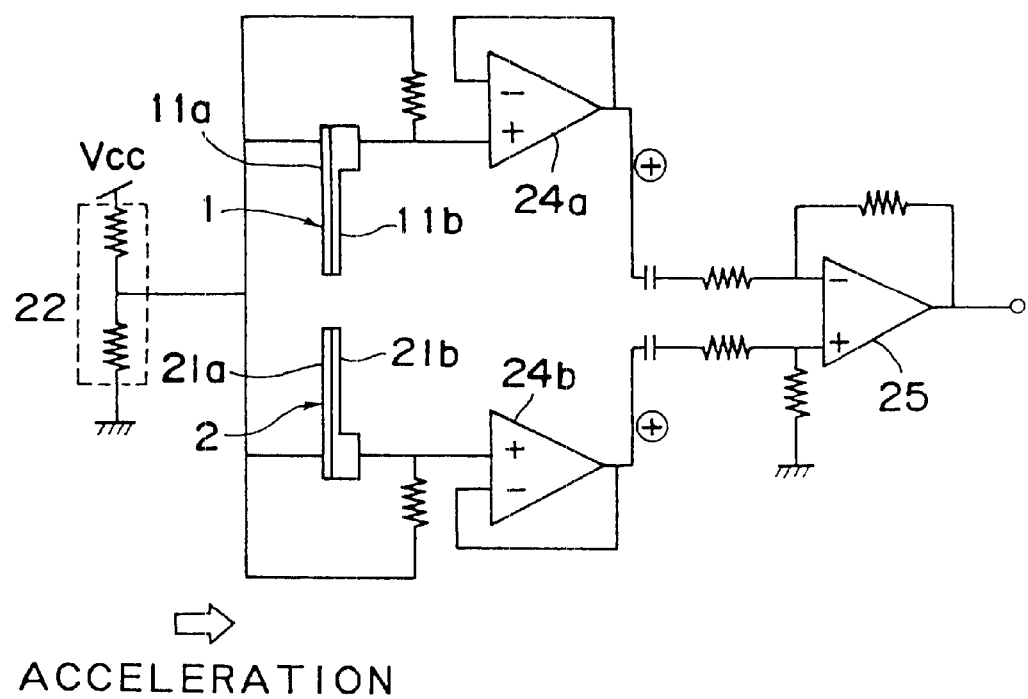
FIG. 23 is a circuit diagram of an acceleration detection apparatus according to a ninth embodiment of the invention.

An acceleration detection apparatus according to a ninth embodiment of the invention is the same as the acceleration detection apparatus of the eighth embodiment in appearance as shown in FIG. 22, but differs therefrom in the circuit configuration of the semiconductor element 16 housed inside package 6*a*, 6*b*. FIG. 23 is a block diagram of an acceleration detection apparatus according to the present embodiment. This is one configuration that differs from the circuit diagram shown in FIG. 16 for the block diagram shown in FIG. 15. In this case the signal detector 12 is a pair of buffer amplifiers 24*a*, 24*b* with a differential amplifier 25 disposed downstream, and the differential amplifier 25 outputting a rotational acceleration signal. The reference potential generator 22 is a resistance voltage divider. Because operating amplifiers can be used for the buffer amplifiers and differential amplifier, simple operating amplifiers can be used for the semiconductor elements. It should be noted that power supply, grounding, and other wiring is not shown in the figure.

Embodiment 10

Figure 24:
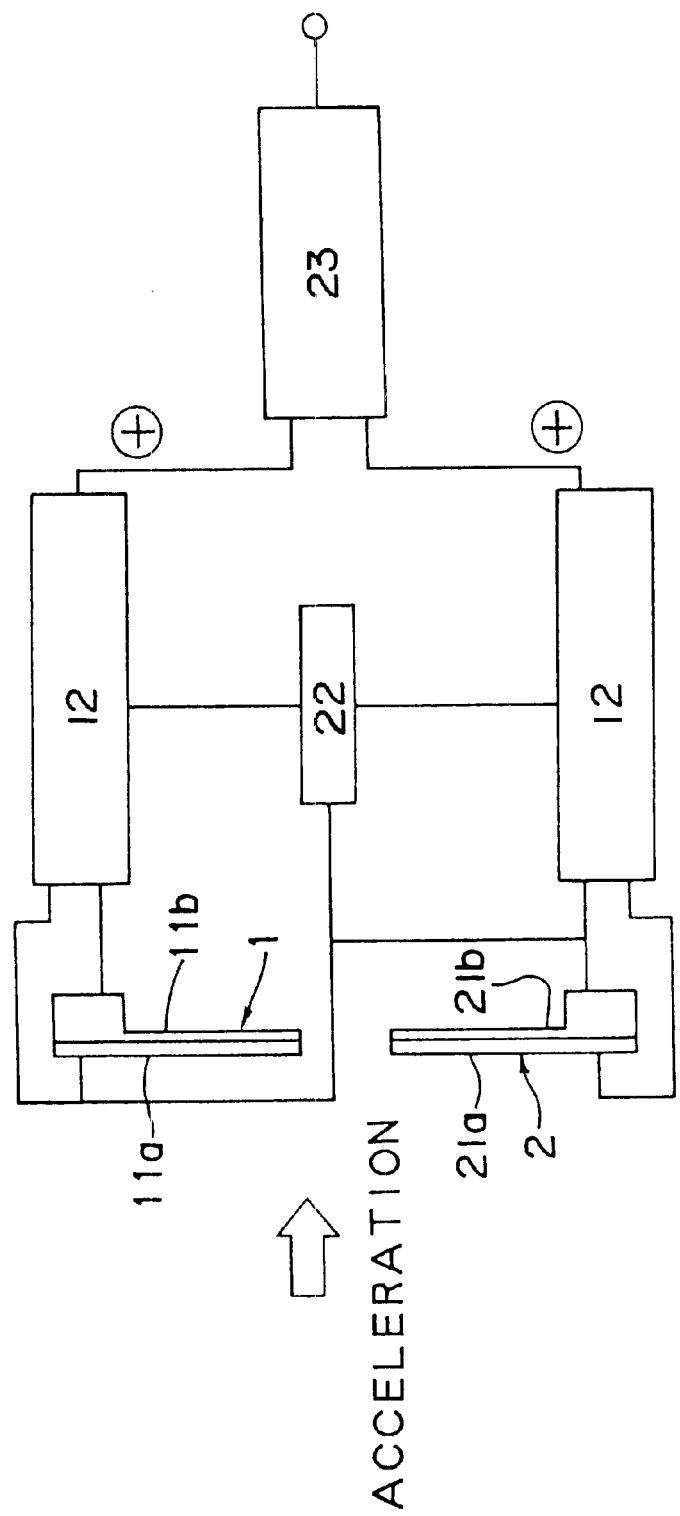
FIG. 24 is a block diagram of an acceleration detection apparatus according to a tenth embodiment of the invention.

An acceleration detection apparatus according to a tenth embodiment of the invention is the same as the acceleration detection apparatus of the eighth embodiment in appearance as shown in FIG. 22, but differs therefrom in the circuit configuration of the semiconductor element 16 housed inside package 6*a*, 6*b*. A circuit diagram of this acceleration detection apparatus 100 is shown in FIG. 24. Unlike the configuration shown in the block diagram in FIG. 15, electrodes on the same sides of the cantilevers of piezoelectric elements 1 and 2 (that is, 11a and 21a, and 11b and 21b), and the signal detector 12 and reference potential generator 22 are connected. That is, electrode 11a and electrode 21b are connected to reference potential generator 22, and electrode 11b and electrode 21a are connected directly to signal detector 12. As a result, when acceleration is applied in the direction indicated by the arrows in the figure, the signals output from piezoelectric elements 1 and 2 via signal detector 12 are opposite polarity. These output signals are then input to adder 23. Because the outputs from piezoelectric elements 1 and 2 are opposite polarity, a signal proportional to the difference in acceleration applied to the two piezoelectric elements is output from adder 23, and rotational acceleration can be detected.

Figure 25:
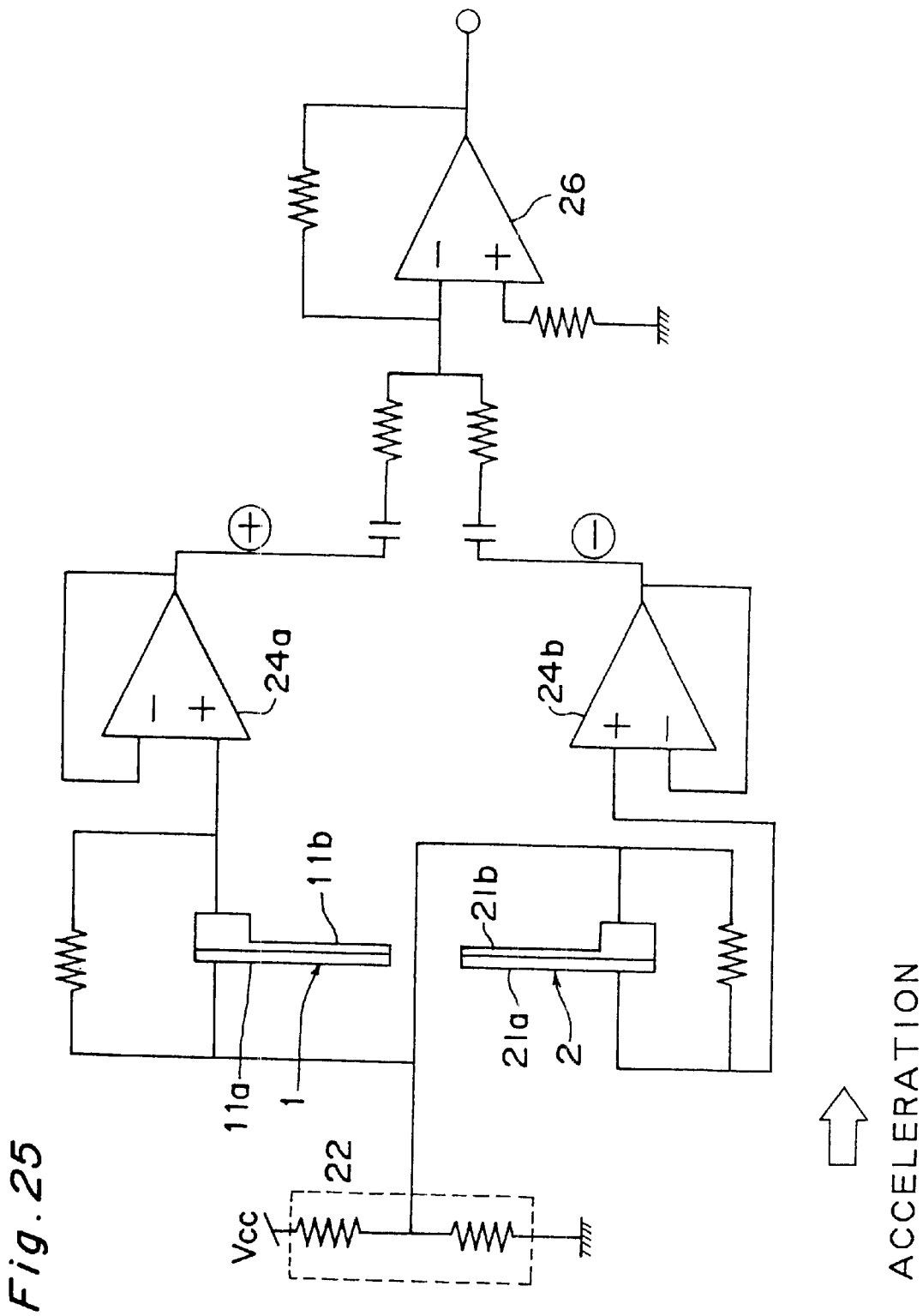
FIG. 25 is a circuit diagram of an acceleration detection apparatus according to a tenth embodiment of the invention.

An equivalent circuit diagram for the block diagram shown in FIG. 24 is shown in FIG. 25. Similarly to the configuration shown in FIG. 23, this acceleration detection apparatus 100 can be achieved using operating amplifiers. The buffer amplifiers 24a and 24b output opposite polarity signals because the placement of the electrodes for connecting to the non-inverting input terminal of the buffer amplifiers 24 and the reference potential generator 22 is different in piezoelectric elements 1 and 2. The adder 26 is also an operating amplifier. A signal proportional to rotational acceleration is output from the output terminal of the adder with this circuit design. It should be noted that some wiring, including the power source and ground, are not shown in the figure.

An equivalent detection circuit can also be built by disposing the elements separated from the piezoelectric elements on a printed circuit board, but the longer wiring lengths increase the effects of noise and lower the S/N ratio. On the other hand, noise can be reduced and a high S/N ratio achieved by housing the semiconductor element and resistance in proximity to the piezoelectric elements inside the same package. Acceleration sensor detection resolution is determined by the S/N ratio, and high resolution can be achieved by housing the semiconductor element and other components in the same package. This is particularly important with piezoelectric elements made of lithium niobate or piezoelectric single crystal because the static capacitance is low, impedance is high, and the piezoelectric elements are thus susceptible to noise. In addition, the resistance of the current-voltage converting resistor must be increased when the cut-off frequency on the low frequency side is lowered, and susceptibility to noise is thus increased. The construction of the present embodiment is a particularly effective means of avoiding these problems.

Furthermore, differences in the amplification rate, for example, due to differences in temperature or other environmental factors can also be substantially ignored as a result of housing not only the piezoelectric elements but also two semiconductor elements in the same package. Rotational acceleration can therefore be detected with excellent accuracy.

It will be further noted that the circuit configuration of the semiconductor element shall not be limited to that described above. For example, piezoelectric element output could be input directly to an amplifier circuit without using a buffer amplifier or impedance conversion circuit, or an amplifier circuit for additional gain could be provided downstream. An amplifier circuit for obtaining even gain, or an analog/digital conversion circuit, could also be provided downstream of the adder or differential circuit.

It is yet further possible to house only some of the circuit elements inside the same package and place the remaining circuit elements on a printed circuit board.

It will also be obvious that the construction of the acceleration sensor shall not be limited to that of the present embodiment. It is also possible, for example, to arrange the two piezoelectric elements with the cantilevers pointing in the same direction as shown in FIG. 26A; to dispose the support block in the middle of the piezoelectric elements as shown in FIG. 26B; or to dispose support blocks at both ends of the deflection member of the piezoelectric elements as shown in FIG. 26C.

An acceleration sensor according to this embodiment of the invention is thus compact, can detect rotational acceleration with good sensitivity using only one sensor, and features a high S/N ratio and resolution.

Embodiment 11

FIG. 27 is a plan view of an acceleration sensor according to an eleventh embodiment of the invention. Unlike the acceleration sensor of the first embodiment, this acceleration sensor 10 is a unimorph type in which each piezoelectric element has only one piezoelectric body bonded to a silicon substrate support block. This acceleration sensor 10 has two piezoelectric elements 1 and 2, each piezoelectric element 1, 2 having a unimorph cantilever comprising one piezoelectric body bonded to silicon substrate 30 with the cantilever supported on one end by a support block 3. In addition, the polarization directions of the piezoelectric body are opposite in piezoelectric element 1 and piezoelectric element 2. Electrodes 11a, 11b, 21a, and 21b are formed on opposing surfaces of the cantilevers of piezoelectric elements 1 and 2. Output from electrodes 11b and 21b on the surfaces bonded to silicon substrate 30 is extracted from the end. Electrodes 11a and 21a formed on the side opposite the support block 3 are formed over the entire surface.

The cantilever structure of these piezoelectric elements 1 and 2 enables a potential difference produced in the piezoelectric bodies 4 by flexible vibration of the cantilever as a result of acceleration transmitted from the support block 3 to be detected from the electrodes 11a, 11b, 21a, and 21b.

The piezoelectric elements 1 and 2 of this acceleration sensor 10 are disposed parallel to each other so that one side of each is on the same plane. The piezoelectric elements are further aligned in line on the same longitudinal axis with the free ends of the cantilevers in proximity at the inside and the support block 3 ends of the cantilevers disposed to the outside in mutually opposite directions as shown in FIG. 27.

It should be noted that the piezoelectric bodies 4 and the silicon substrate forming the support block can be bonded with an adhesive or by direct bonding. Bonding by direct bonding is preferable.

The piezoelectric elements 1 and 2 of this acceleration sensor 10 are arranged so that the polarization directions of the piezoelectric bodies 4 are different. The arrows in FIG. 27 indicate the direction of polarization of the piezoelectric bodies with the arrows starting from the positive side and pointing to the negative side. Electrode 11a of piezoelectric element 1 is therefore on the positive side, and electrode 11b is on the negative side. Electrode 21a of piezoelectric element 2 is thus on the negative side, and electrode 21b is on the positive side.

A method of detecting acceleration using this acceleration sensor is described next with reference to the block diagram in FIG. 28. Electrodes 11a and 21a of piezoelectric elements 1 and 2 are interconnected and connected to signal detector 12. Electrodes 11b and 21b of piezoelectric elements 1 and 2 are also interconnected and connected to another terminal of signal detector 12. A reference potential generator 22 is also provided for applying a reference potential.

Figure 28:
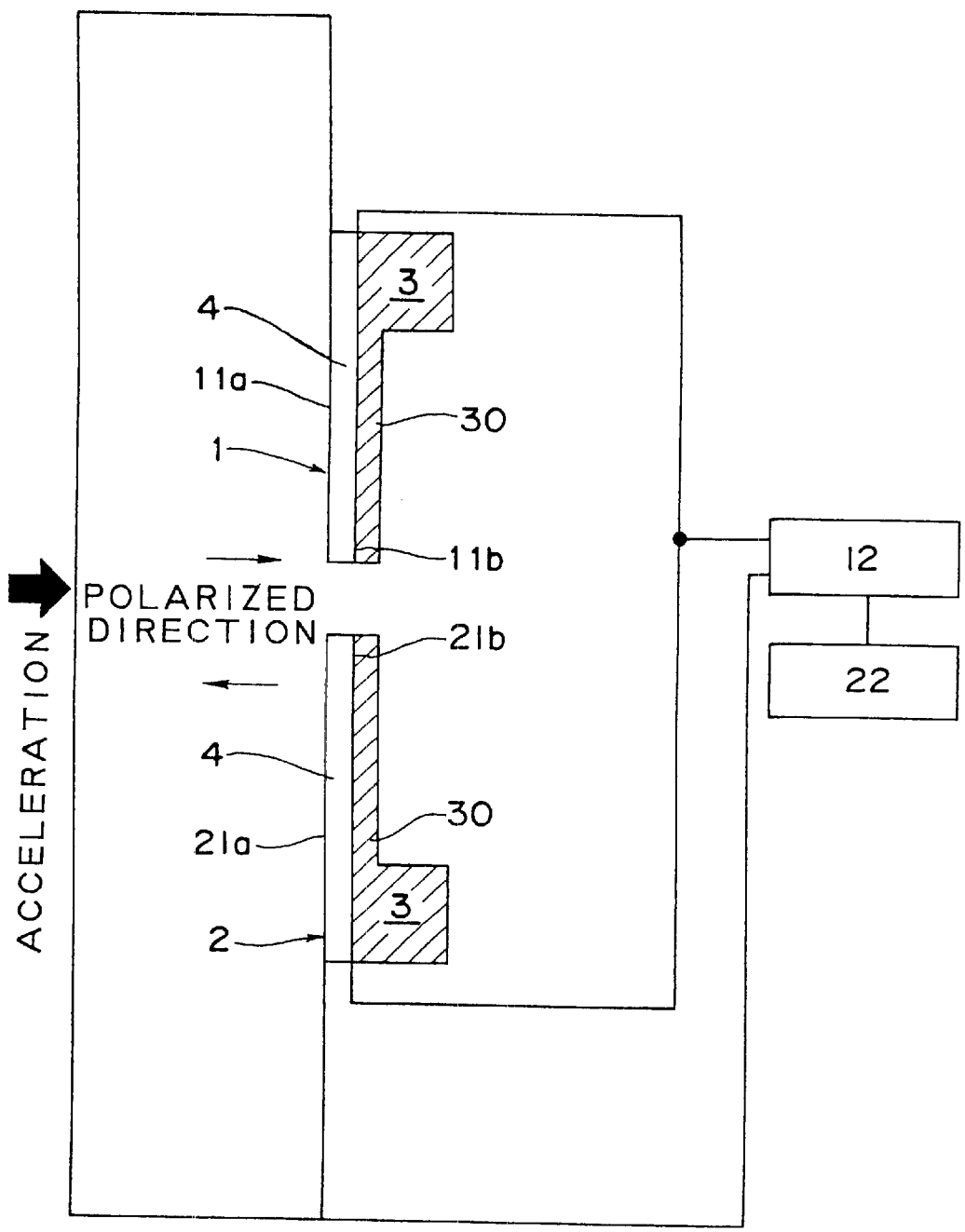
FIG. 28 is a block diagram of acceleration detection using an acceleration sensor according to an 11th embodiment of the invention.

When acceleration is applied as indicated by the arrow in FIG. 28, piezoelectric element 1 generates a positive charge at electrode 11a and a negative charge at electrode 11b. Because the polarization directions of the constituent piezoelectric bodies of the two piezoelectric elements are opposite, piezoelectric element 2 generates a negative charge in electrode 21a and a positive charge in electrode 21b. Furthermore, because electrodes 11a and 21a, and electrodes 11b and 21b are connected to each other, the charges move, and the charges produced by piezoelectric elements 1 and 2. are balanced. However, when rotational acceleration is applied, the charge produced by the piezoelectric element farther from the center of rotation will be greater. The charge produced by the other piezoelectric element will thus be decimated by the stronger charge, and the difference between the charges will be passed to the node. These charges are applied as signals to the signal detector 12, which then outputs a rotational acceleration signal.

Embodiment 12

Figure 29:
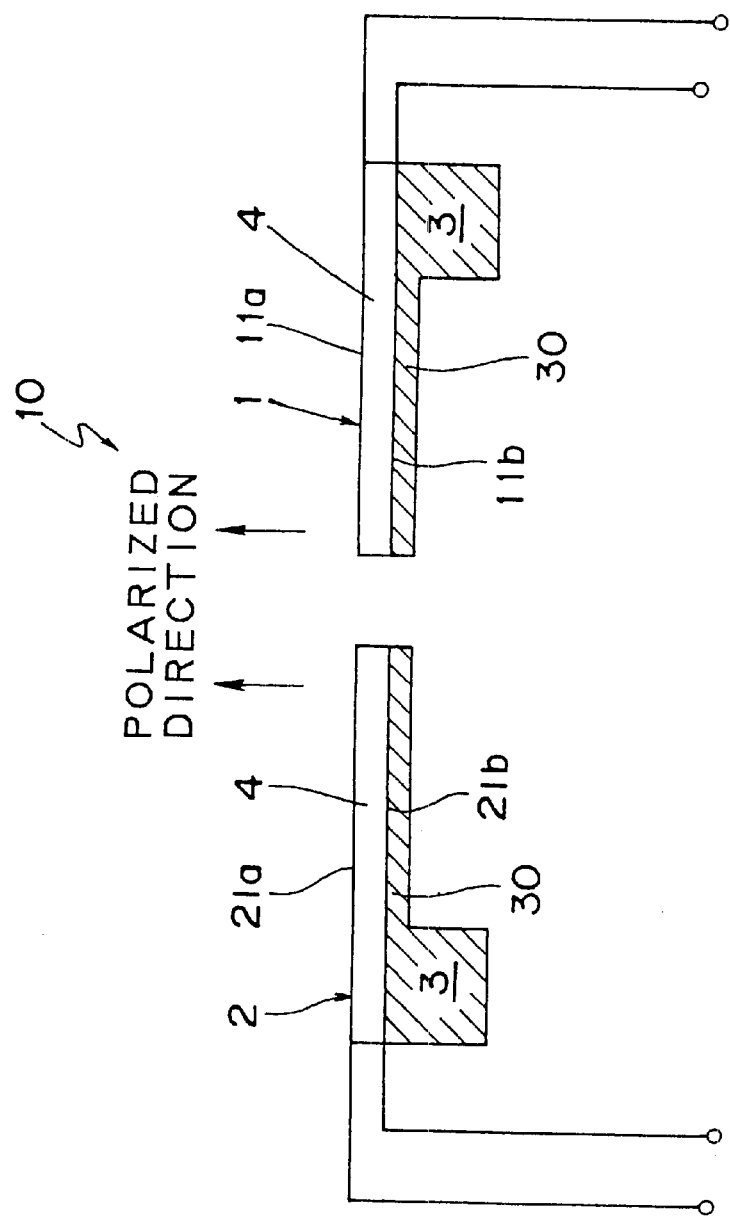
FIG. 29 is a plan view of an acceleration sensor according to a 12th embodiment of the invention.

FIG. 29 is a plan view of an acceleration sensor according to a twelfth embodiment of the invention. This acceleration sensor differs from the acceleration sensor of the eleventh embodiment in that the polarization directions of the piezoelectric bodies are the same. The acceleration sensor 10 comprises two piezoelectric elements 1 and 2. Each piezoelectric elements 1 and 2 has a unimorph cantilever comprising one piezoelectric body bonded to silicon substrate 30 with the cantilever supported on one end by a support block 3. In addition, the direction of polarization of the piezoelectric body is the same in piezoelectric element 1 and piezoelectric element 2.

Embodiment 13

Figure 30:
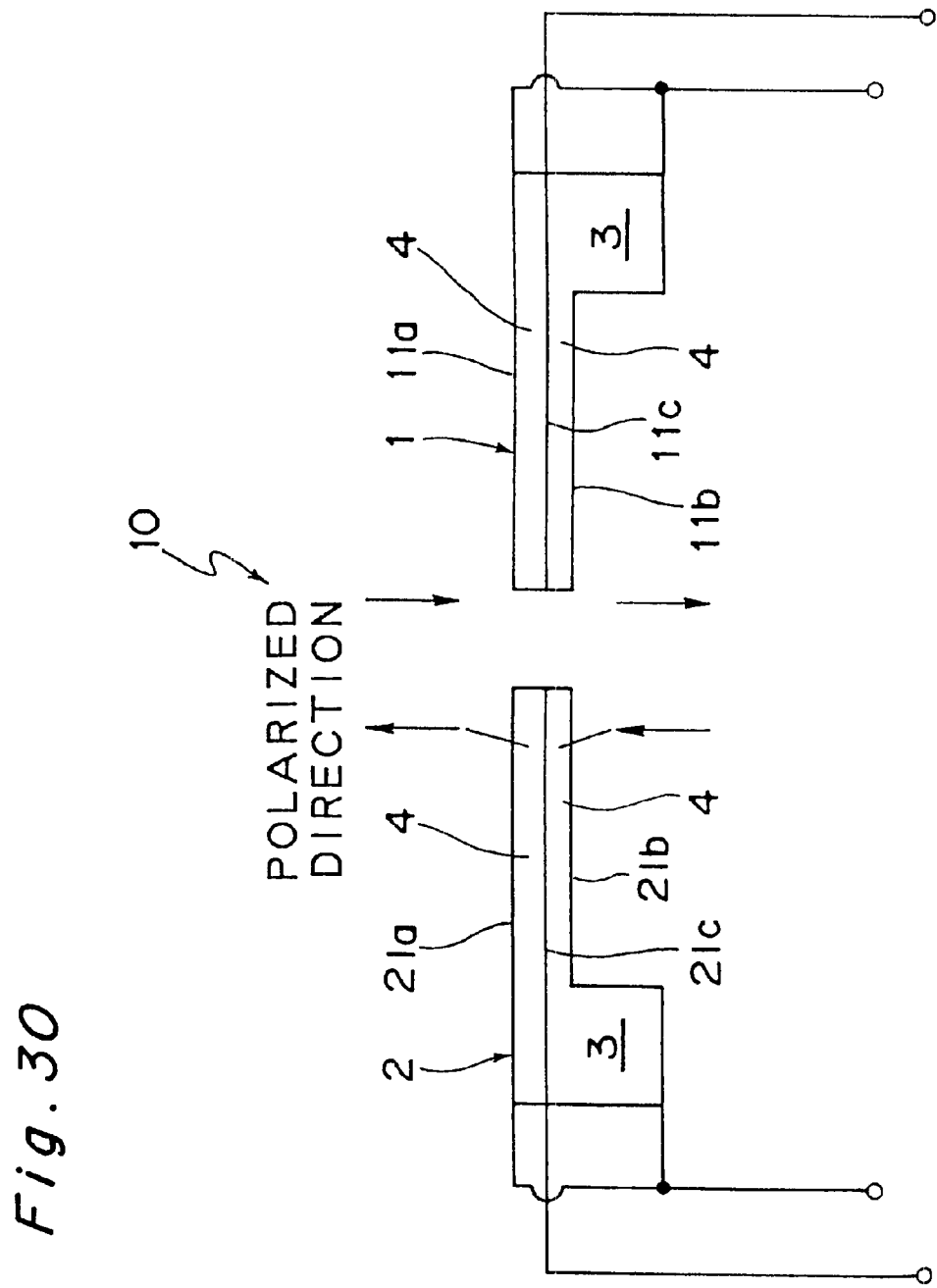
FIG. 30 is a plan view of an acceleration sensor according to a 13th embodiment of the invention.

FIG. 30 is a plan view of an acceleration sensor according to a thirteenth embodiment of the invention. This acceleration sensor 10 differs from the acceleration sensor of the first embodiment in that the piezoelectric elements are made by bonding two piezoelectric bodies having the same direction of polarization. In other words, the direction of polarization of each piezoelectric body constituting one piezoelectric element is the same. Furthermore, because the surfaces of the piezoelectric bodies at the bonding interface, that is, the surfaces that are bonded together, have different polarities, the potential occurring at the bonding interface must be used as the piezoelectric element output. This acceleration sensor 10 therefore further differs from the acceleration sensor of the first embodiment in that an electrode is provided at the bonded surfaces.

This acceleration sensor 10 thus has two piezoelectric elements 1 and 2, each piezoelectric element comprising two bonded piezoelectric bodies and each of the piezoelectric bodies having the same direction of polarization. In addition, the direction of polarization of the piezoelectric bodies in piezoelectric element 1 is opposite the direction of polarization of the piezoelectric bodies in piezoelectric element 2.

Each piezoelectric element has a cantilevered structure in which one end of a bimorph cantilever formed by bonding two piezoelectric bodies is supported by a support block 3. Electrodes 11a, 11b, 21a, 21b are formed on the two opposite sides of the cantilevers of each piezoelectric element 1 and 2. An electrode 11c and 21c is also disposed to the bonding surface between each of the two piezoelectric bodies.

Because of the step between the cantilever and support block 3, the electrodes 11b and 21b on the same side as the support block 3 are electrically connected to the support block. The electrodes 11a and 21a on the side opposite the support block 3 are formed over the entire surface. The electrodes 11c, 21c at the bonding interface are preferably disposed thereto before bonding.

As a result of the bimorph cantilever structure bonding two piezoelectric bodies as described above, the piezoelectric bodies 4 of these piezoelectric elements 1 and 2 produce a potential difference as a result of the flexible vibration of the cantilever portion induced by acceleration transmitted to the cantilever from the support block 3. This potential difference can then be extracted from the electrodes 11a, 11b, 21a, 21b on the opposing sides of the cantilever, and the electrodes 11c, 21c at the bonding surface.

The piezoelectric elements 1 and 2 of this acceleration sensor 10 are disposed so that they have one mutually parallel side, and more specifically so that one side of each cantilever is on the same plane. The piezoelectric elements 1 and 2 are further aligned in line on the same longitudinal axis with the free ends of the cantilevers in proximity at the inside and the support block 3 ends of the cantilevers disposed to the outside in mutually opposite directions as shown in FIG. 30.

This acceleration sensor 10 comprises piezoelectric element 1 and piezoelectric element 2. Each of the piezoelectric elements is made by bonding two piezoelectric bodies 4 having the same direction of polarization. The piezoelectric bodies 4 are disposed so that the direction of polarization of the piezoelectric bodies 4 in piezoelectric element 1 is opposite the direction of polarization of the piezoelectric bodies 4 in piezoelectric element 2. The direction of polarization of the piezoelectric bodies in this acceleration sensor 10 is indicated by the arrows in FIG. 30. The arrows start at the positive side and point to the negative side. It will thus be known that electrode 11a of piezoelectric element 1 is the positive side and electrode 11b is the negative side, and electrode 11c is at the interface between positive and negative surfaces. Likewise, electrode 21a of piezoelectric element 2 is the negative side and electrode 21b is the positive side, and electrode 21c is at the interface between positive and negative surfaces.

A method for detecting acceleration using this acceleration sensor is described next with reference to the acceleration detection block diagram shown in FIG. 31. Electrodes 11a and 21a of piezoelectric elements 1 and 2 are connected to a common node connected to one terminal of a signal detector 12. The other electrodes 11b and 21b are likewise connected to a common node connected to another terminal of the signal detector 12. A reference potential generator 22 is also provided for applying a reference potential.

Figure 31:
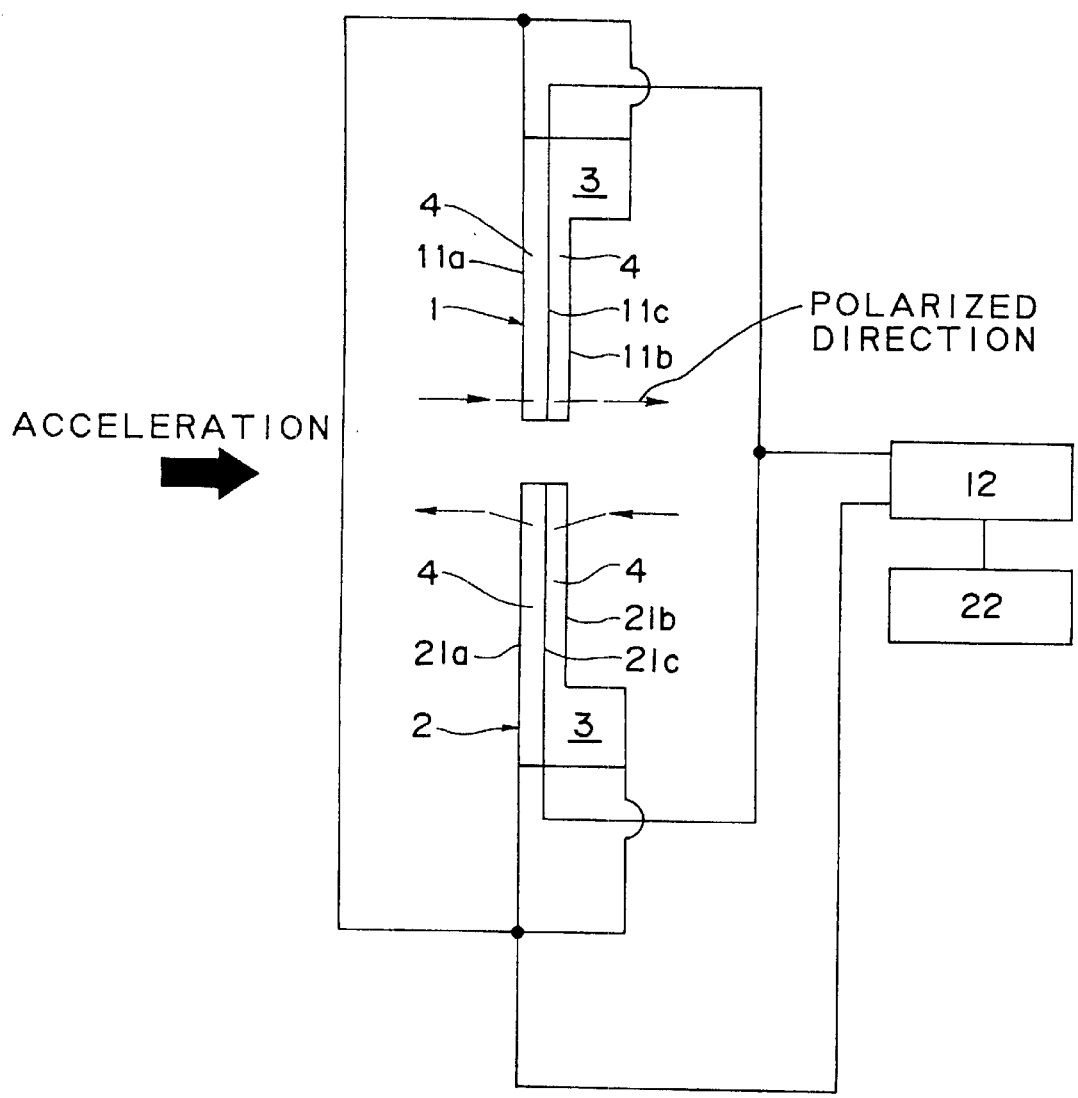
FIG. 31 is a block diagram of acceleration detection using an acceleration sensor according to a 13th embodiment of the invention.

When acceleration is applied as indicated by the arrow in FIG. 31, piezoelectric element 1 generates a positive charge at electrode 11a, a positive charge at electrode 11b, and a negative charge at electrode 11c. Because the direction of polarization is opposite in piezoelectric elements 1 and 2, piezoelectric element 2 generates a negative charge at electrode 21a, a negative charge at electrode 21b, and a positive charge at electrode 21c. Electrodes 11a, 11b, 21a, and 21b are interconnected, and electrodes 11c and 21c are interconnected. The respective charges therefore move and the charges produced by piezoelectric elements 1 and 2 are balanced. However, if rotational acceleration is applied, the charge generated by the piezoelectric element farther from the center of rotation will be greater. The charge produced by the other piezoelectric element will thus be decimated by the stronger charge, and the difference between the charges will be passed to the node. These charges are applied as signals to the signal detector 12, which then outputs a rotational acceleration signal.

Embodiment 14

Figure 32:
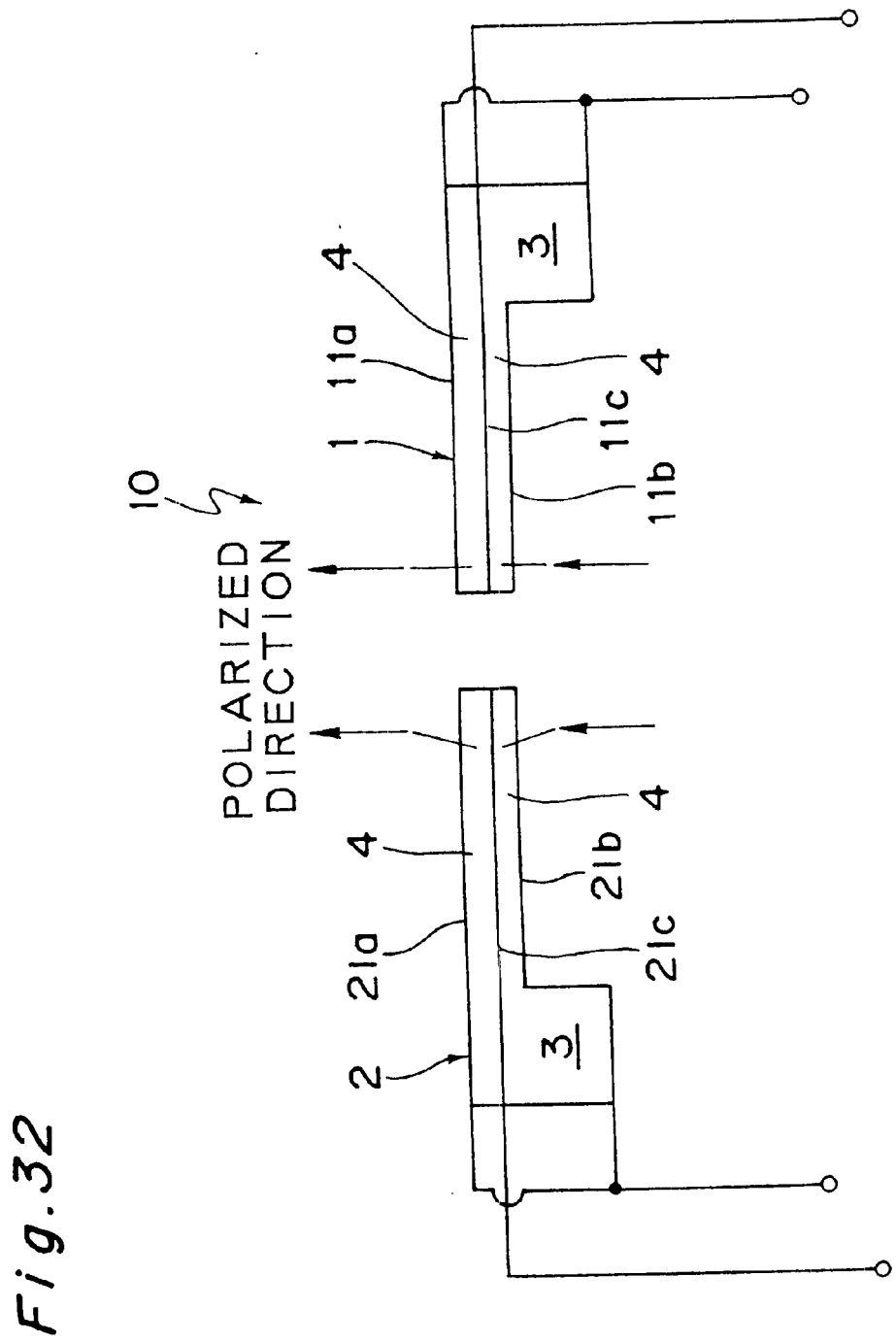
FIG. 32 is a plan view of an acceleration sensor according to a 14th embodiment of the invention.

FIG. 32 is a plan view of an acceleration sensor according to a fourteenth embodiment of the invention. This acceleration sensor differs from the acceleration sensor of the thirteenth embodiment in that the direction of polarization of the piezoelectric bodies is the same in each of the piezoelectric elements 1 and 2. This acceleration sensor 10 comprises two piezoelectric elements 1 and 2. Each of the piezoelectric elements 1 and 2 has a bimorph cantilever comprising two piezoelectric bodies bonded so that the direction of polarization is the same in each piezoelectric element 1 and 2. Each cantilever is supported on one end by a support block 3.

Embodiment 15

Figure 33:
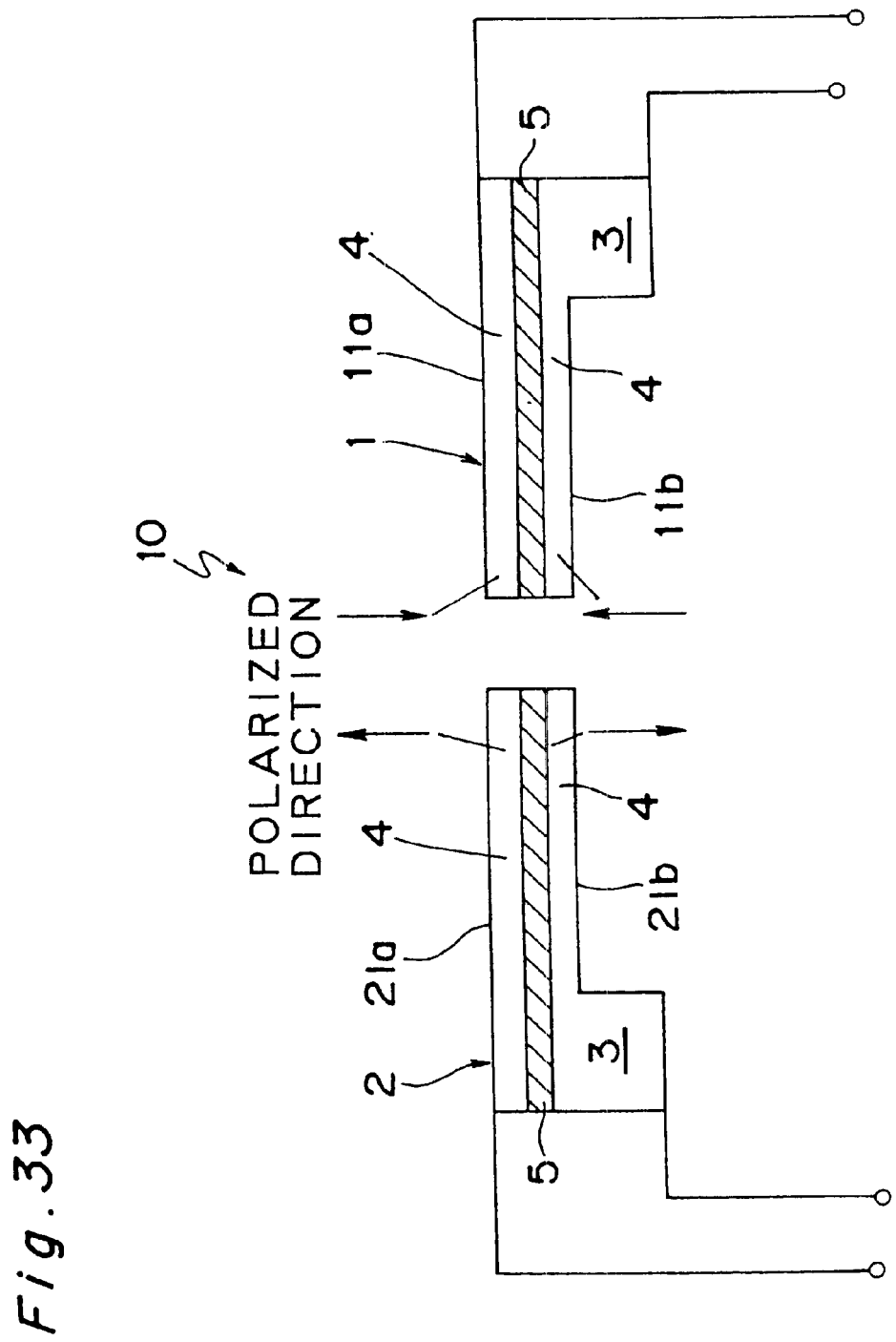
FIG. 33 is a plan view of an acceleration sensor according to a 15th embodiment of the invention.

FIG. 33 is a plan view of an acceleration sensor according to a fifteenth embodiment of the invention. This acceleration sensor 10 differs from the acceleration sensor of the first embodiment in that the piezoelectric elements are made by bonding two piezoelectric bodies with an intervening shim therebetween rather than bonding the piezoelectric bodies directly to each other. More specifically, the acceleration sensor 10 comprises two piezoelectric elements 1 and 2. Each of the piezoelectric elements 1 and 2 comprises two piezoelectric bodies with different directions of polarization. The piezoelectric bodies are bonded with an intervening shim 5 between the piezoelectric bodies. The piezoelectric bodies are further arranged so that the directions of polarization of the piezoelectric bodies are mutually opposite in piezoelectric elements 1 and 2. In other words, the directions of polarization of the piezoelectric bodies in the proximally positioned piezoelectric elements are oriented in opposite directions so that the polarity of polarization at the bonding interface between the piezoelectric body and shim is different in each piezoelectric element.

Each piezoelectric element has a cantilevered structure in which one end of a bimorph cantilever is supported by a support block 3. Each bimorph cantilever is formed by bonding two piezoelectric bodies with an intervening shim therebetween. An electrode 11a, 11b, 21a, 21b is formed on the two opposite sides of the cantilever of each piezoelectric element 1 and 2. Because of the step between the cantilever and support block 3, the electrodes 11b and 21b on the same side as the support block 3 are electrically connected to the support block. The electrodes 11a and 21a on the side opposite the support block 3 are formed over the entire surface.

As a result of the cantilever structure described above, the piezoelectric bodies 4 of these piezoelectric elements 1 and 2 produce a potential difference as a result of the flexible vibration of the cantilever portion induced by acceleration transmitted to the cantilever from the support block 3. This potential difference can then be extracted from the electrodes 11a, 11b, 21a, 21b on the opposing sides of the cantilever.

The piezoelectric elements 1 and 2 of this acceleration sensor 10 are disposed so that they have one mutually parallel side, and more specifically so that one side of each cantilever is on the same plane. The piezoelectric elements 1 and 2 are further aligned in line on the same longitudinal axis with the free ends of the cantilevers in proximity at the inside and the support block 3 ends of the cantilevers disposed to the outside in mutually opposite directions as shown in FIG. 33.

The direction of polarization of the piezoelectric bodies in this acceleration sensor 10 is indicated by the arrows in FIG. 33. The arrows start at the positive side and point to the negative side. It will thus be known that electrode 11a of piezoelectric element 1 is on a positive side and electrode 11b is on a positive side. Likewise, electrode 21a of piezoelectric element 2 is on a negative side and electrode 21b is on a negative side.

A method for detecting acceleration using this acceleration sensor is described next with reference to the acceleration detection block diagram shown in FIG. 34. Electrodes 11a and 21a of piezoelectric elements 1 and 2 are connected to a common node connected to one terminal of a signal detector 12. The other electrodes 11b and 21b are likewise connected to a common node connected to another terminal of the signal detector 12. A reference potential generator 22 is also provided for applying a reference potential.

Figure 34:
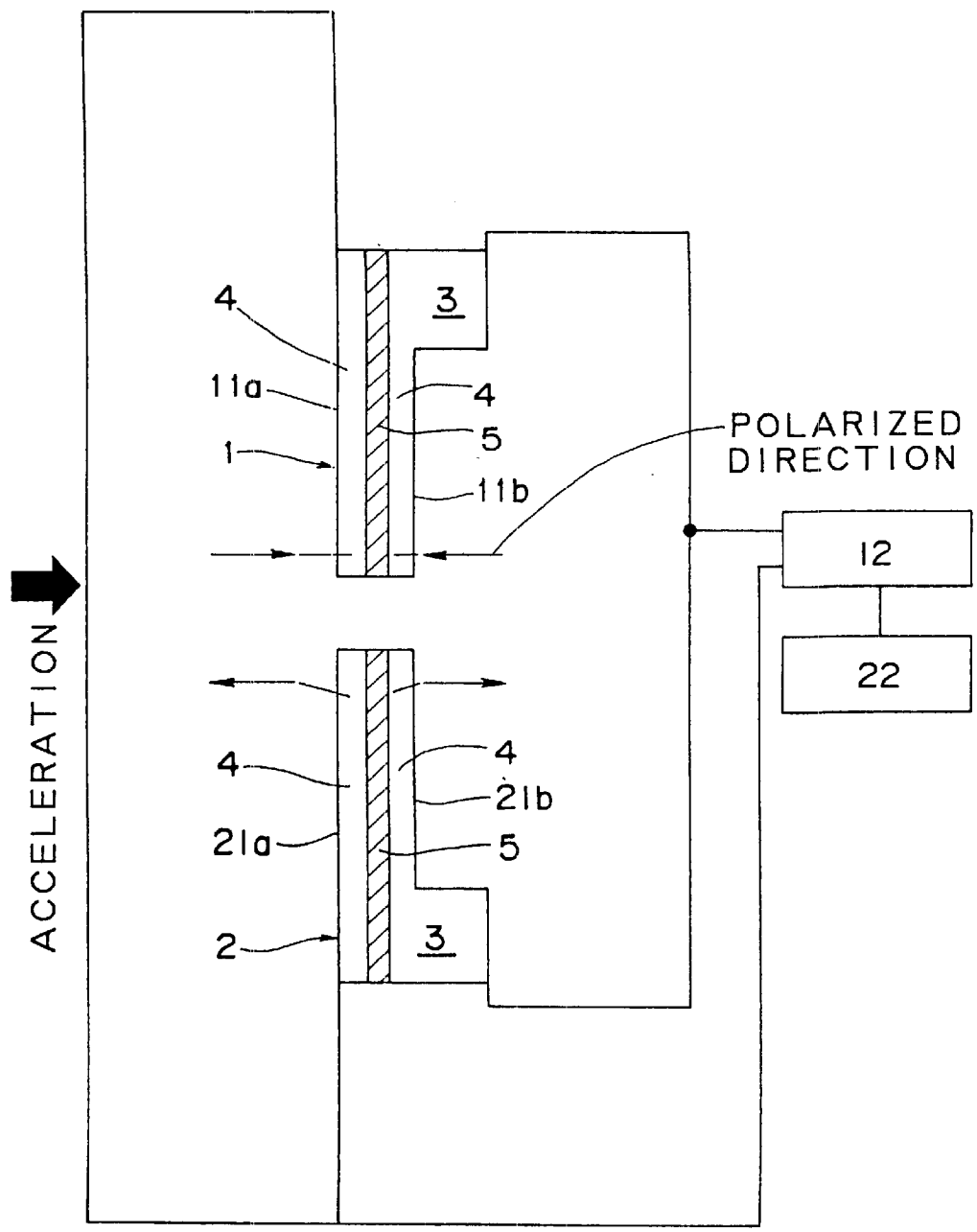
FIG. 34 is a block diagram of acceleration detection using an acceleration sensor according to a 15th embodiment of the invention.

When acceleration is applied as indicated by the arrow in FIG. 34, piezoelectric element 1 generates a positive charge at electrode 11a and a negative charge at electrode 11b. Because the direction of polarization is opposite in piezoelectric elements 1 and 2, piezoelectric element 2 generates a negative charge at electrode 21a and a positive charge at electrode 21b. Because electrodes 11a and 21a, and 11b and 21b are interconnected, the respective charges move and the charges produced by piezoelectric elements 1 and 2 are balanced. However, if rotational acceleration is applied, the charge generated by the piezoelectric element farther from the center of rotation will be greater. The charge produced by the other piezoelectric element will thus be decimated by the stronger charge, and the difference between the charges will be passed to the node. These charges are applied as signals to the signal detector 12, which then outputs a rotational acceleration signal.

Embodiment 16

Figure 35:
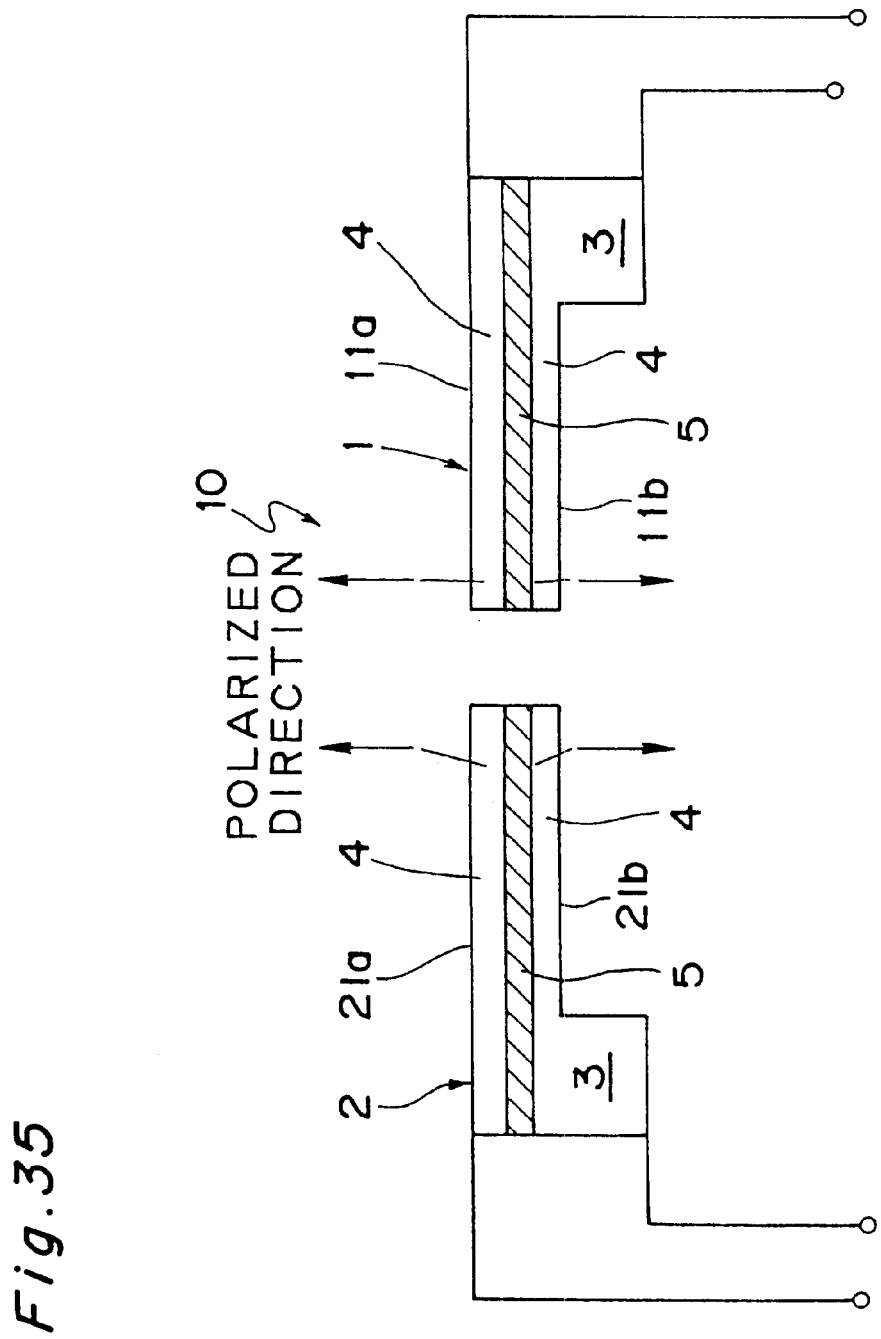
FIG. 35 is a plan view of an acceleration sensor according to a 16th embodiment of the invention.

FIG. 35 is a plan view of an acceleration sensor according to a sixteenth embodiment of the invention. This acceleration sensor differs from the acceleration sensor of the fifteenth embodiment in that the direction of polarization of corresponding piezoelectric bodies is the same in each of the piezoelectric elements 1 and 2. In other words, the polarity of polarization at the bonding interface between the shim and each piezoelectric body of the piezoelectric element is the same in piezoelectric element 1 and piezoelectric element 2.

This acceleration sensor 10 thus comprises two piezoelectric elements 1 and 2. Each piezoelectric element has a cantilevered structure in which one end of a bimorph cantilever is supported by a support block 3. Each bimorph cantilever is formed by bonding two piezoelectric bodies having mutually opposite directions of polarization with an intervening shim therebetween.

Embodiment 17

Figure 36:
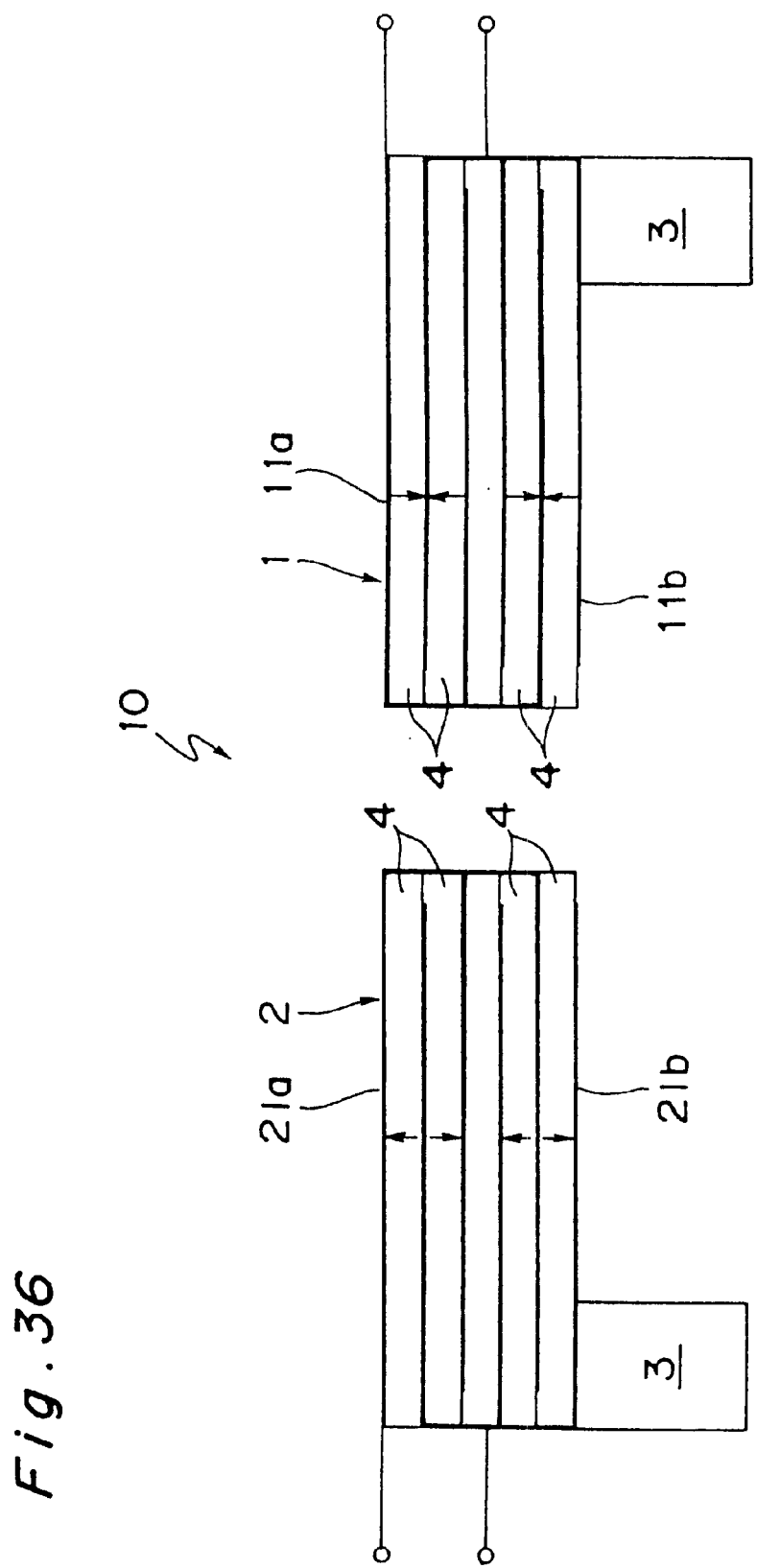
FIG. 36 is a plan view of an acceleration sensor according to a 17th embodiment of the invention.

FIG. 36 is a plan view of an acceleration sensor according to a seventeenth embodiment of the invention. This acceleration sensor 10 differs from the acceleration sensor of the first embodiment in that each piezoelectric element is made by bonding four piezoelectric bodies. This acceleration sensor 10 has two piezoelectric elements 1 and 2. Each piezoelectric element 1 and 2 is a laminate of two laminates each formed by bonding two piezoelectric bodies with different directions of polarization. In addition, the directions of polarization of the corresponding piezoelectric bodies are mutually opposite in piezoelectric elements 1 and 2. In other words, the polarity at the bonded surfaces of the piezoelectric bodies in piezoelectric element 1 is opposite that in piezoelectric element 2.

Each piezoelectric element has a cantilevered structure in which one end of the cantilever is supported by a support block 3. The cantilever is formed by combining two laminates of two bonded piezoelectric bodies. Electrodes 11a, 11b, 21a, 21b are formed on the two opposite sides of the cantilevers of each piezoelectric element 1 and 2.

As shown in FIG. 36, electrode 11a electrically connects surfaces producing a charge of the same polarity when acceleration is applied, and electrode 11b also electrically connects surfaces producing a charge of the same polarity when acceleration is applied. Electrodes 21a and 21b do the same.

As a result of the cantilever structure described above, the piezoelectric bodies 4 of these piezoelectric elements 1 and 2 produce a potential difference as a result of the flexible vibration of the cantilever portion induced by acceleration transmitted to the cantilever from the support block 3. This potential difference can then be extracted from the electrodes 11a, 11b, 21a, 21b of the piezoelectric elements 1 and 2.

The piezoelectric elements 1 and 2 of this acceleration sensor 10 are disposed so that they have one mutually parallel side, and more specifically so that one side of each cantilever is on the same plane. The piezoelectric elements 1 and 2 are further aligned in line on the same longitudinal axis with the free ends of the cantilevers in proximity at the inside and the support block 3 ends of the cantilevers disposed to the outside in mutually opposite directions as shown in the figure.

The direction of polarization of the piezoelectric bodies in this acceleration sensor 10 is indicated by the arrows in FIG. 36. The arrows start at the positive side and point to the negative side. It will thus be known that the negative sides of the piezoelectric bodies 4 are bonded together in piezoelectric element 1, and the positive sides of the piezoelectric bodies 4 are bonded together in piezoelectric element 2.

A method for detecting acceleration using this acceleration sensor is described next with reference to the acceleration detection block diagram shown in FIG. 37. Electrodes 11a and 21a of piezoelectric elements 1 and 2 are connected to a common node connected to one terminal of a signal detector 12. The other electrodes 11b and 21b are likewise connected to a common node connected to another terminal of the signal detector 12. A reference potential generator 22 is also provided for applying a reference potential.

Figure 37:
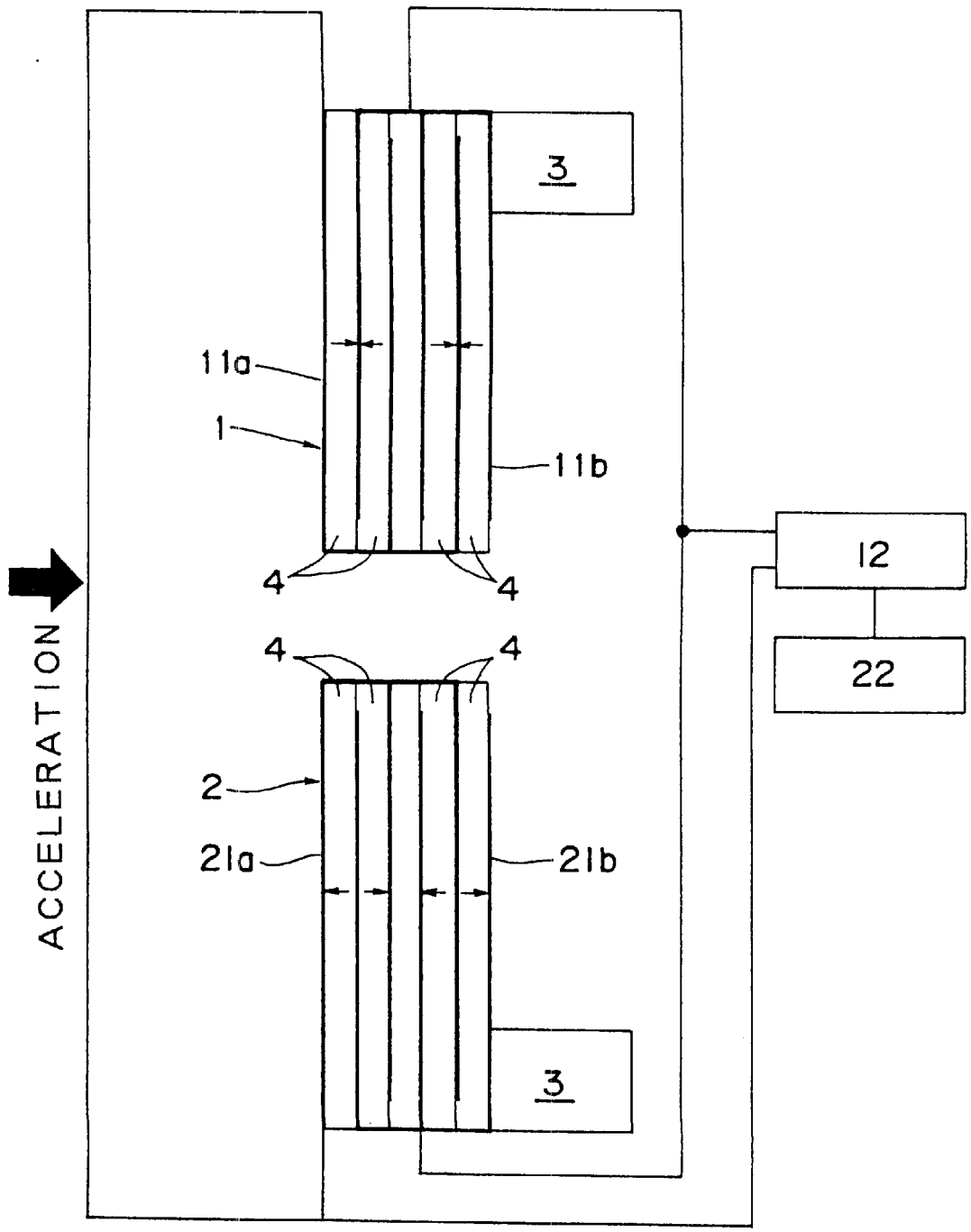
FIG. 37 is a block diagram of acceleration detection using an acceleration sensor according to a 17th embodiment of the invention.

When acceleration is applied as indicated by the arrow in FIG. 37, piezoelectric element 1 generates a positive charge at electrode 11a and a negative charge at electrode 11b. Because the direction of polarization is opposite in piezoelectric elements 1 and 2, piezoelectric element 2 generates a negative charge at electrode 21a and a positive charge at electrode 21b. Electrodes 11a and 21a, and 11b and 21b are interconnected. The respective charges therefore move and the charges produced by piezoelectric elements 1 and 2 are balanced. However, if rotational acceleration is applied, the charge generated by the piezoelectric element farther from the center of rotation will be greater. The charge produced by the other piezoelectric element will thus be decimated by the stronger charge, and the difference between the charges will be passed to the node. These charges are applied as signals to the signal detector 12, which then outputs a rotational acceleration signal.

Embodiment 18

Figure 38:
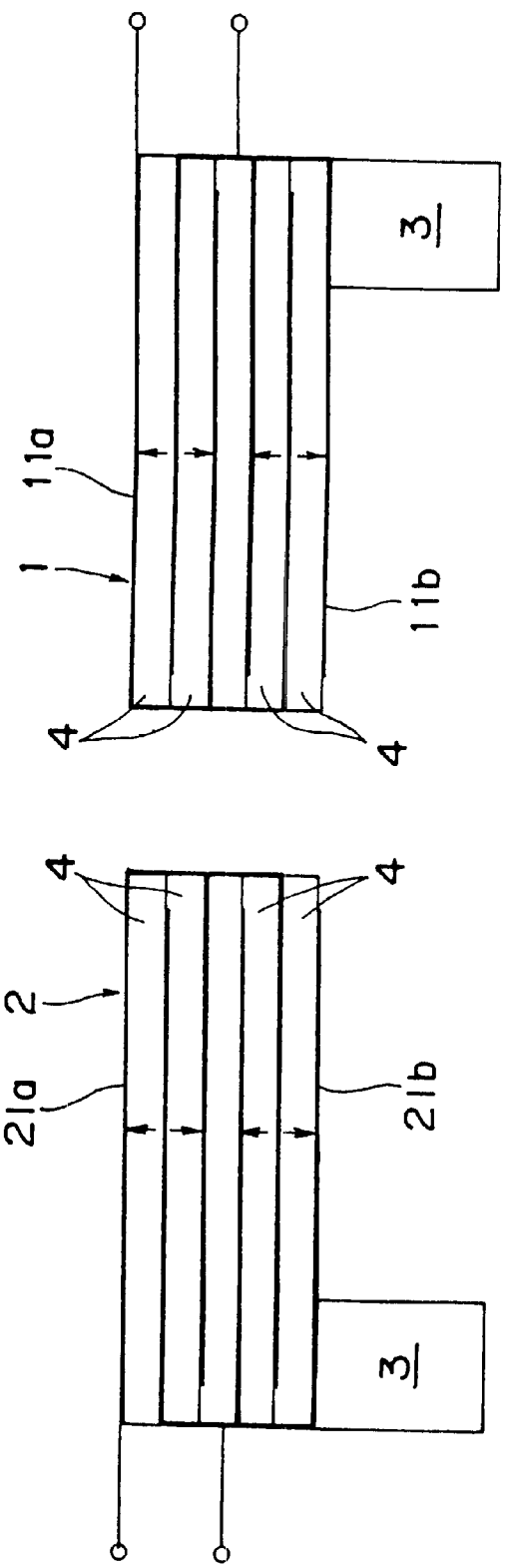
FIG. 38 is a plan view of an acceleration sensor according to a 18th embodiment of the invention.

FIG. 38 is a plan view of an acceleration sensor according to an eighteenth embodiment of the invention. This acceleration sensor 10 differs from the acceleration sensor of the seventeenth embodiment in that corresponding piezoelectric bodies have the same direction of polarization in piezoelectric element 1 and piezoelectric element 2. In other words, the polarity at the bonded surfaces of the piezoelectric bodies is the same in piezoelectric element 1 and piezoelectric element 2. This acceleration sensor 10 has two piezoelectric elements 1 and 2. Each piezoelectric element 1 and 2 has a cantilevered structure, the cantilever being a laminate of two laminates each formed by bonding two piezoelectric bodies with different directions of polarization, and one end of each cantilever supported by a support block 3.

Embodiment 19

FIG. 39 is an oblique view of an acceleration sensor according to a nineteenth embodiment of the invention. The acceleration sensor of this embodiment can detect rotational acceleration on two different axial directions. More specifically, this acceleration sensor can detect a rotational acceleration component in the direction parallel to the mounting surface of package 6a, and can also detect a rotational acceleration component in the direction perpendicular to the mounting surface. The rotational acceleration component parallel to the mounting surface is detected by piezoelectric elements 1a and 2a. This corresponds to acceleration detection as shown in FIG. 4. The rotational acceleration component perpendicular to the mounting surface is detected by piezoelectric elements 1b and 2b.

These two piezoelectric elements 1b and 2b are disposed so that the surface of the cantilever is parallel to the mounting surface of the package (also referred to as "horizontal" below), the free ends of the cantilevers are in mutual proximity, and the cantilevers are fixed to support blocks disposed substantially in line. The cantilevers of these piezoelectric elements 1b and 2b are above the surface of the package and can vibrate freely, and it is therefore not necessary to provide a recess in the surface of the package 6a so that the cantilevers can vibrate. The bottom of the support blocks is fixed with a conductive paste, and an electrode conductive to the support block portion is electrically connected to an external electrode 8d on the package 6a. The electrodes on the top of the cantilevers are also electrically connected to the external electrode 8d of package 6a by wire bonding. This configuration enables rotational acceleration components on two axes to be separately detected using a single package.

It will be obvious that piezoelectric elements as described in any of the preceding embodiments 1 through 18 can be used in this embodiment. In addition, any of the described circuit designs and electrode connections between the piezoelectric elements. Furthermore, semiconductor circuits as shown in FIG. 9 can be incorporated for the two axes. It will also be readily apparent that a third set of piezoelectric elements can be additionally provided for separately detecting a rotational acceleration component on a third axis.

Embodiment 20

Figure 40A:
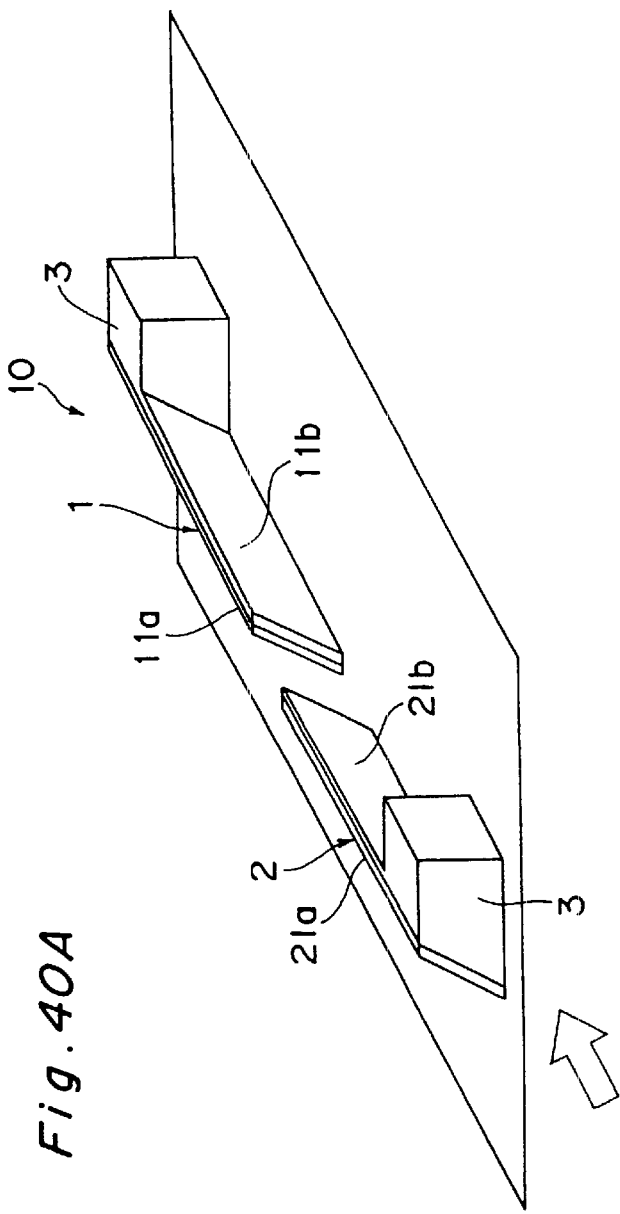
FIG. 40A is an oblique view of an acceleration sensor according to a 20th embodiment of the invention.
Figure 40B:
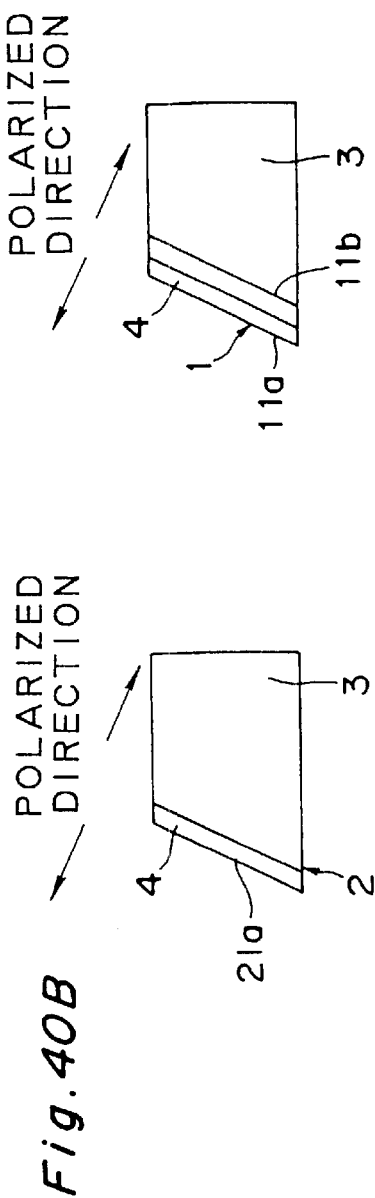
FIG. 40B is a side view of the same.

In an acceleration sensor according to a twentieth embodiment of the invention the surface of the cantilever of the piezoelectric element is inclined to the mounting surface. FIG. 40A is an oblique view of the piezoelectric elements of an acceleration sensor according to this embodiment. FIG. 40B is an end view of the acceleration sensor as seen from the arrow in FIG. 40A. Note that FIG. 40B shows side by side end views of piezoelectric elements 1 and 2. The portions of these piezoelectric elements 1 and 2 are the same as in the acceleration sensor of the fifth embodiment, and the directions of polarization of the piezoelectric bodies in one piezoelectric element are mutually opposite. This acceleration sensor differs with that of the fifth embodiment, however, in that the primary surface of the cantilever is inclined 25 degrees to a line perpendicular to the mounting surface.

These piezoelectric elements 1 and 2 can sense acceleration both parallel to (horizontal) and perpendicular to (vertical) the mounting surface as a result of the cantilevers and vibration direction of the cantilevers being inclined to the mounting surface.

Using this acceleration sensor and the signal processing method of the piezoelectric elements of the fifth embodiment enables a single device package to measure rotational acceleration including rotational acceleration components in two directions, although the horizontal and vertical rotational acceleration components cannot be separated.

Figure 41A:
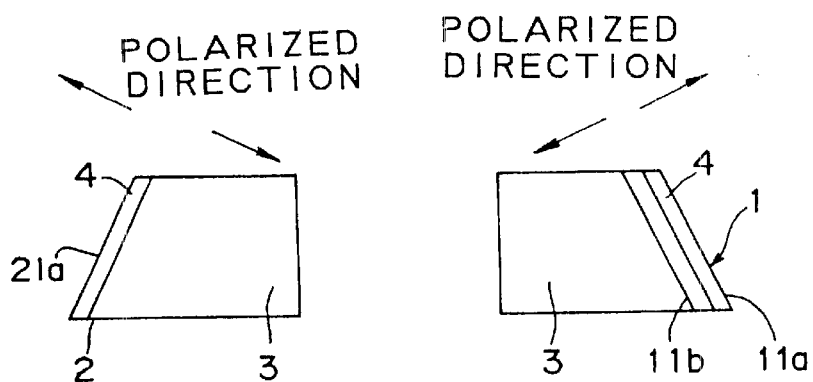
FIG. 41A shows side views of other arrangements of the acceleration sensor showing the directions of polarization the same with the incline of the cantilevers symmetrical to the vertical plane according to the 20th embodiment of the invention.
Figure 41B:
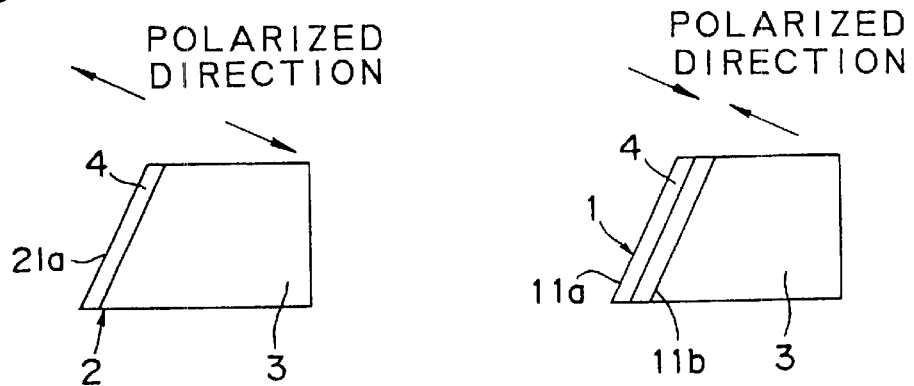
FIG. 41B shows side views of other arrangements of the acceleration sensor showing opposite directions of polarization with the cantilevers inclined in the same direction.
Figure 41C:
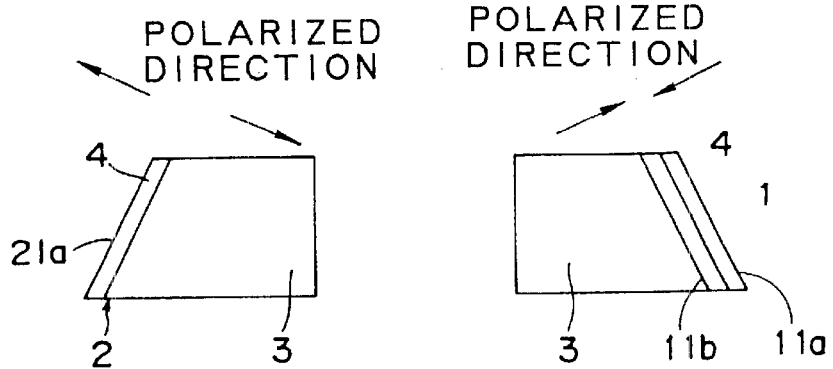
FIG. 41C shows side views of other arrangements of the acceleration sensor showing opposite directions of polarization with the incline of the cantilevers symmetrical to the vertical plane.

FIG. 41A to FIG. 41C are end views of other combinations of piezoelectric elements having the cantilever inclined to the package surface. Note that these figures show the end views of piezoelectric elements 1 and 2 side by side. The directions of polarization shown in FIG. 41A are the same as shown in FIG. 40B, but the inclines of the cantilevers face in opposite directions. When the piezoelectric elements 1 and 2 shown in FIG. 41A are connected as shown in FIG. 15, FIG. 17, or FIG. 20, rotational acceleration is detected as a horizontal component and translational acceleration is detected as a vertical component. When connected as shown in FIG. 5, FIG. 7, or FIG. 10, the horizontal component is detected as translational acceleration and the vertical component is detected as rotational acceleration.

The directions of polarization of the piezoelectric bodies of the piezoelectric elements 1 and 2 shown in FIG. 41B are opposite, but the cantilevers are inclined in the same direction. When these piezoelectric elements are connected as shown in FIG. 5 or FIG. 7, rotational acceleration can be detected in both horizontal and vertical directions. When the angle of inclinations differ as shown in FIG. 41C and the piezoelectric elements 1 and 2 are connected as shown in FIG. 15, FIG. 17, or FIG. 20, the horizontal component is detected as translational acceleration and the vertical component is detected as rotational acceleration; when connected as shown in FIG. 5, FIG. 7, or FIG. 10, the horizontal component is detected as rotational acceleration and the vertical component is detected as translational acceleration.

It will thus be known that rotational acceleration in both horizontal and vertical directions can be detected by inclining the primary sensing axis. In addition, translational acceleration can be detected by changing the orientation of the inclined surfaces.

Embodiment 21

Figure 42A:
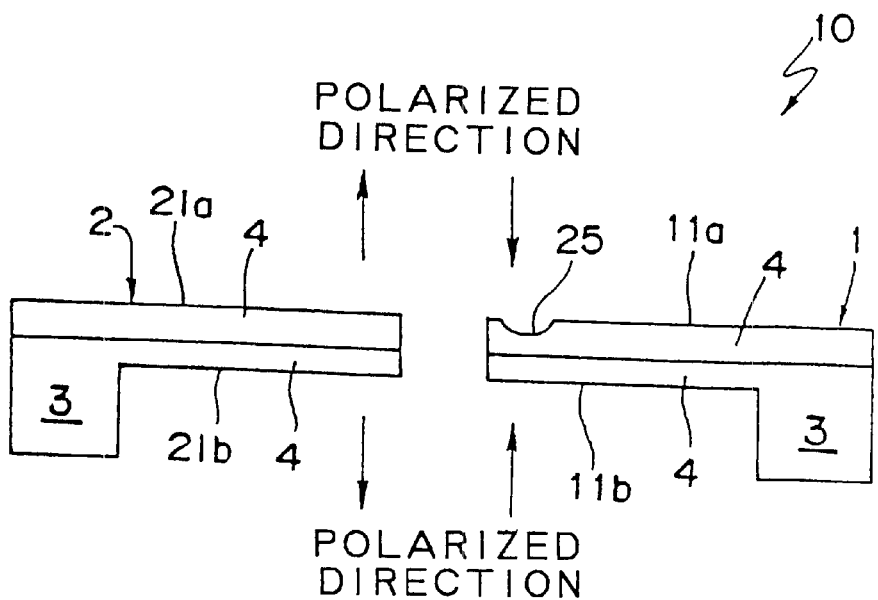
FIG. 42A shows methods for adjusting the sensitivity of the piezoelectric elements of the acceleration sensor in a 21st embodiment of the invention.
Figure 42B:
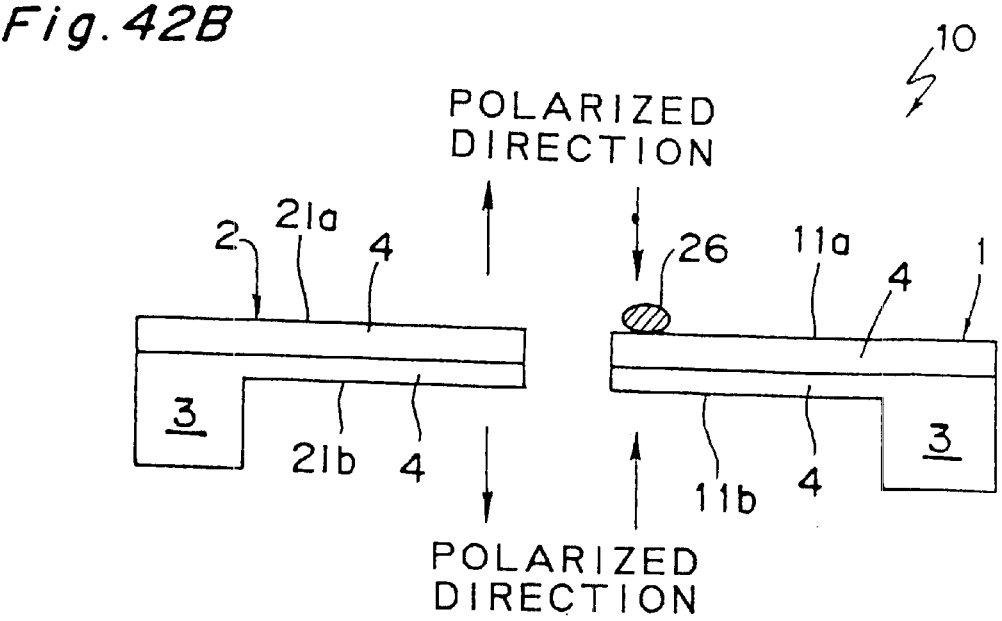
FIG. 42B shows other methods for adjusting the sensitivity of the piezoelectric elements of the acceleration sensor in a 21st embodiment of the invention.

FIG. 42A and FIG. 42B illustrate a method for adjusting the sensitivity of a piezoelectric element in the acceleration sensor according to a twenty-first embodiment of the invention.

When rotational acceleration is detected using two piezoelectric elements and there is a difference in the sensitivity of the two piezoelectric elements, the translational acceleration component cannot be sufficient removed from the output of the two piezoelectric elements and detection sensitivity drops. It is therefore desirable to minimize the sensitivity difference between the two piezoelectric elements. When two acceleration sensors are separately installed for detecting angular acceleration, the user must adjust the sensitivity after the sensors are installed. However, because the acceleration sensors are typically housed in a package, there is no way to adjust the piezoelectric elements. Using the method of the present embodiment, however, it is possible for the manufacturer to adjust piezoelectric element sensitivity of an acceleration sensor supplied housed inside a single package before factory shipping.

A method for adjusting the sensitivity of one piezoelectric element to practically match the sensitivity of the other piezoelectric element in this acceleration sensor is described next.

As shown in FIG. 42A, one method for adjusting piezoelectric element sensitivity is to remove a portion of the cantilever. By removing a portion (notch 25) of the cantilever of piezoelectric element 1, the sensitivity of piezoelectric element 1 can be changed to substantially equal the sensitivity of piezoelectric element 2. Part of the cantilever can be removed by processing with a grinding wheel, by laser, or other technique.

Another method for adjusting piezoelectric element sensitivity is to add a sensitivity adjusting weight 26 to the cantilever of one piezoelectric element as shown in FIG. 42B. Sensitivity can be increased by adding a weight 26 to the cantilever of piezoelectric element 1, thereby matching the sensitivity of piezoelectric element 1 to the sensitivity of piezoelectric element 2. Adding material to the cantilever increases sensitivity. Various materials can be used for the sensitivity adjusting weight 26, including resin and metal. The sensitivity adjusting weight 26 can be fixed to the cantilever by coating, adhesive bonding, inkjet deposition, vapor deposition, or other method.

These methods can be used to directly adjust the sensitivity of the piezoelectric element and significantly reduce the translational acceleration component prior to shipping.

It will also be obvious that sensitivity adjustment shall not be limited to adjusting the piezoelectric element, and can also be achieved by adjusting the gain of the amplifiers when the output signals of the piezoelectric elements are passed through an amplifier as shown in FIG. 10, FIG. 11, FIG. 15, FIG. 16, FIG. 23, FIG. 24, and FIG. 25.

Embodiment 22

Figure 43A:
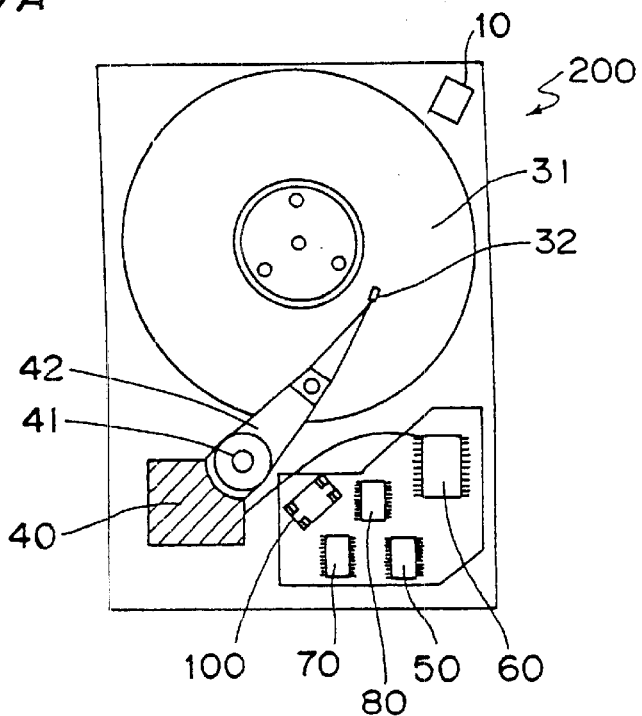
FIG. 43A shows the configuration of a disk recording and reading apparatus according to a 22nd embodiment of the invention.

A disk reading and writing apparatus (disk drive) 200 according to a twenty-second embodiment of the invention is shown in FIG. 43A. This disk drive 200 has a disk 31 for storing data, a head 32 for reading and writing to the disk 31, a head carriage 40 for moving the head 32, a position detection means 50 for detecting the position of the head 32, a controller 60 for controlling the head carriage 40, and an acceleration detector 70 for detecting rotational acceleration. The head 32 is moved radially to the disk 31 by the head carriage 40, and is thus positioned to a specific location on the disk 31. When acceleration, a type of external interference, is applied to the disk drive 200, the acceleration can cause the head 32 to shift from the specified location. Acceleration sensor 10 is provided to prevent this by detecting rotational acceleration or translational acceleration acting on the disk drive 200 and control the position of the head 32 in opposition to this interference.

The position of the center of rotation of rotational acceleration acting as interference on the disk drive 200 is generally unknown and not always the same. When the head is moved quickly by the head carriage 40, rotational vibration often occurs in reaction to the movement. In this case the pivot 41 supporting the head tends to be the center of rotation. Rotational movement in the arm 42 supporting head moves radially also tends to occur. This means that rotational acceleration can be detected with high sensitivity if the acceleration sensor 10 is installed so that the longitudinal axis of the cantilever portion of the piezoelectric elements is substantially parallel to the arm 42. The acceleration sensor 10 is therefore preferably disposed with the longitudinal axis of the cantilever portion of the piezoelectric elements parallel to the arm 42.

Figure 43B:
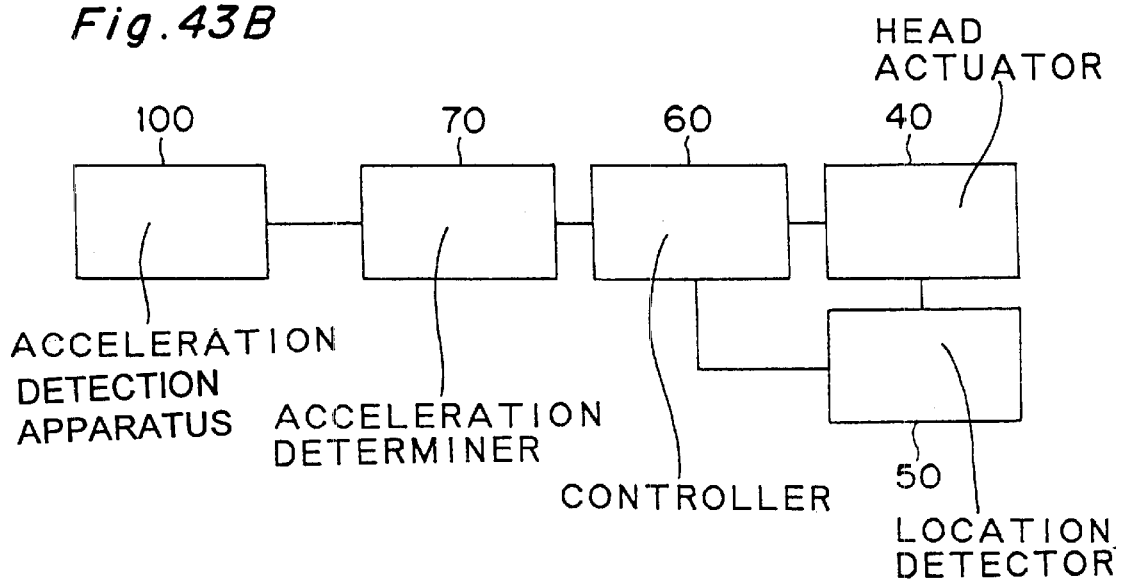
FIG. 43B shows a control block diagram for the same.

FIG. 43B is a control block diagram for this disk drive 200. When there is no external vibration, the position detection means 50 recognizes the location of head 32 based on address information recorded to the disk 31, the controller 60 determines movement of the head 32, and the head carriage 40 moves and positions the head. When there is external vibration, the acceleration detector 70 determines the presence and amount of rotational acceleration based on output from the acceleration detection apparatus 100. If the rotational acceleration can be effectively ignored, translational acceleration is detected. Based on the result supplied from acceleration detector 70, controller 60 calculates the movement of head 32 to a particular position, and applies an appropriate control signal to the head carriage 40 so as to move the head 32. It should be noted that if the acceleration detection apparatus 100 outputs only rotational acceleration, the acceleration detector 70 can be omitted. Furthermore, the process for evaluating acceleration can be accomplished by the controller 60, in which case it is not necessary to provide a separate acceleration detector 70. Yet further, the position detection means 50 can be omitted if the controller 60 also has a function for detecting the location of head 32.

By thus controlling operation, the head 32 can be positioned to a specific location when rotational acceleration applies external vibration to the disk drive 200. The head 32 can thus be precisely positioned, and a high density disk 31 can be achieved.

Advantages of the Invention

As will be known from the preceding description of preferred embodiments, an acceleration sensor according to the present invention houses at least two piezoelectric elements in a confined space so that the distance between the support block portions is greatest. It is therefore possible to detect acceleration in the same direction, and to detect rotational acceleration from the difference in the outputs of the piezoelectric elements. It is therefore possible to provide an acceleration sensor that can detect rotational acceleration (angular acceleration) with high sensitivity and high resolution using a single acceleration sensor without being affected by temperature and other environmental factors, and to identifiably detect translational acceleration when the rotational acceleration can be effectively ignored.

This invention also provides an acceleration detection apparatus and an acceleration detection method using this acceleration sensor, and a positioning apparatus using this acceleration detection apparatus.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An acceleration sensor comprising:

first piezoelectric element having first electrodes for outputting a charge produced by strain deformation, said first piezoelectric element including at least one first piezoelectric body and a first support block supporting said first piezoelectric body, said first electrodes being provided on opposite surfaces of said first piezoelectric element; and second piezoelectric element having second electrodes for outputting a charge produced by strain deformation, said second piezoelectric element including at least one second piezoelectric body and a second support block supporting said second piezoelectric body, said second electrodes being provided on opposite surfaces of said second piezoelectric element, wherein one surface of said first piezoelectric element and one surface of said second piezoelectric element are substantially parallel to each other, wherein said first support block is firmly held to provide a first cantilevered piezoelectric body, wherein said second support block is firmly held to provide a second cantilevered piezoelectric body, wherein the longitudinal axis of said first piezoelectric element is aligned with the longitudinal axis of said second piezoelectric element, and a free end portion of said first cantilevered piezoelectric body and a free portion of said second cantilevered piezoelectric body are pointing to each other.

2. An acceleration sensor comprising:

first piezoelectric element having first electrodes for outputting a charge produced by strain deformation, said first piezoelectric element including at least one first piezoelectric body and a first support block supporting said first piezoelectric body, said first electrodes being provided on opposite surfaces of said first piezoelectric element; and second piezoelectric element having second electrodes for outputting a charge produced by strain deformation, said second piezoelectric element including at least one second piezoelectric body and a second support block supporting said second piezoelectric body, said second electrodes being provided on opposite surfaces of said second piezoelectric element, wherein one surface of said first piezoelectric element and one surface of said second piezoelectric element are substantially parallel to each other, and wherein said first support block is separated from said second support block.

3. An acceleration sensor as described in claim 2, wherein said first piezoelectric element includes one first piezoelectric body, and said second piezoelectric element includes one second piezoelectric body, wherein a direction of polarization of said first piezoelectric body and a direction of polarization of said second piezoelectric body are opposite.

4. An acceleration sensor as described in claim 2, wherein said first piezoelectric element includes one first piezoelectric body, and said second piezoelectric element includes one second piezoelectric body, wherein a direction of polarization of said first piezoelectric body and a direction of polarization of said second piezoelectric body are the same.

5. An acceleration sensor as described in claim 2, wherein said first piezoelectric element includes a first plurality of layered piezoelectric bodies, and said second piezoelectric element includes a second plurality of layered piezoelectric bodies.

6. An acceleration sensor as described in claim 5, wherein a direction of polarization of each of said first plurality of layered piezoelectric bodies is the same and a direction of polarization of each of said second plurality of piezoelectric bodies is the same.

7. An acceleration sensor as described in claim 6, wherein the direction of polarization of each of said first plurality of layered piezoelectric bodies and the direction of polarization of each of said second plurality of layered piezoelectric bodies are opposite.

8. An acceleration sensor as described in claim 6, wherein the direction of polarization of each of said first plurality of layered piezoelectric bodies and the direction of polarization of each of said second plurality of layered piezoelectric bodies are the same.

9. An acceleration sensor as described in claim 6, wherein said first piezoelectric element includes at least two first piezoelectric bodies, and said second piezoelectric element includes at least two second piezoelectric bodies, wherein said at least two first piezoelectric bodies are bonded with surfaces of the same polarity of polarization and said at least two second piezoelectric bodies are bonded with surfaces of the same polarity of polarization, whereby a direction of polarization of one piezoelectric body and the direction of polarization of another piezoelectric body are opposite.

10. An acceleration sensor as described in claim 9, wherein the direction of polarization of said first plurality of layered piezoelectric bodies is opposite to the direction of polarization of said second plurality of layered piezoelectric bodies.

11. An acceleration sensor as described in claim 9, wherein the direction of polarization of said first plurality of layered piezoelectric bodies is the same as the direction of polarization of said second plurality of layered piezoelectric bodies.

12. An acceleration sensor as described in claim 5, wherein said first plurality of piezoelectric bodies comprises at least two first piezoelectric bodies bonded with a first intervening shim therebetween, and wherein said second plurality of piezoelectric bodies comprises at least two second piezoelectric bodies bonded with a second intervening shim therebetween.

13. An acceleration sensor as described in claim 5, wherein said first plurality of piezoelectric bodies is formed by bonding plural first piezoelectric bodies by direct bonding, and wherein said second plurality of piezoelectric bodies is formed by bonding plural second piezoelectric bodies by direct bonding.

14. An acceleration sensor as described in claim 13, wherein said first plurality of piezoelectric bodies is formed by bonding a plurality of first piezoelectric bodies by direct bonding by way of at least one of oxygen atoms and hydroxyl groups, and wherein said second plurality of piezoelectric bodies is formed by bonding plural second piezoelectric bodies by direct bonding by way of at least one of oxygen atoms and hydroxyl groups.

15. An acceleration sensor as described in claim 2, further comprising an output terminal for each electrode of said first and said second piezoelectric elements.

16. An acceleration sensor as described in claim 2, further comprising:

at least one output terminal interconnecting a first electrode of said first piezoelectric element and a first electrode of said second piezoelectric element, wherein a polarity of a charge generated on said first electrode of said first piezoelectric element and a polarity of a charge generated on said first electrode of said second piezoelectric element are different.

17. An acceleration sensor as described in claim 2, further comprising:

a first output terminal interconnecting a first electrode of said first piezoelectric element and a first electrode of said second piezoelectric element; and a second output terminal from an electrode other than said first electrode of said first piezoelectric element or said first electrode of said second piezoelectric element, wherein a polarity of a charge generated on said first electrode of said first piezoelectric element and a polarity of a charge generated on said first electrode of said second piezoelectric element are the same.

18. An acceleration sensor as described in claim 2, further comprising at least one output terminal set for outputting a charge generated at each electrode of said first and said second piezoelectric elements.

19. An acceleration sensor as described in claim 2, wherein said first piezoelectric element is substantially adjusted to the same sensitivity as said second piezoelectric element.

20. An acceleration sensor as described in claim 19, wherein said first piezoelectric element comprises a first cantilever portion, and wherein a portion of the cantilever portion is removed.

21. An acceleration sensor as described in claim 19, wherein said first piezoelectric element comprises a first cantilever portion, and wherein a sensitivity adjusting mass is affixed to the cantilever portion.

22. An acceleration sensor as described in claim 2, further comprising a package, wherein said first piezoelectric element comprises a first cantilever portion, and wherein said second piezoelectric element comprises a second cantilever portion, and wherein said first piezoelectric element is fixed by said first support block portion inside said package and said second piezoelectric element is fixed by said second support block portion inside said package, whereby said first cantilever portion and said second cantilever portion can vibrate freely.

23. An acceleration sensor as described in claim 22, wherein said first piezoelectric element is mounted inside said package with said first cantilever portion inclined relative to the surface of said package, and said second piezoelectric element is mounted inside said package with said second cantilever portion inclined relative to the surface of said package.

24. An acceleration sensor as described in claim 23, wherein said first piezoelectric element is mounted to said package, and said second piezoelectric element is mounted to said package, whereby a first angle of inclination between said first cantilever portion and the surface is different than a second angle of inclination between said second cantilever portion and the surface.

25. An acceleration sensor comprising:

first piezoelectric element having first electrodes for outputting a charge produced by strain deformation, said first piezoelectric element including at least one first piezoelectric body and a first support block supporting said first piezoelectric body, said first electrodes being provided on opposite surfaces of said first piezoelectric element; and second piezoelectric element having second electrodes for outputting a charge produced by strain deformation, said second piezoelectric element including at least one second piezoelectric body and a second support block supporting said second piezoelectric body, said second electrodes being provided on opposite surfaces of said second piezoelectric element, third piezoelectric element having third electrodes for outputting a charge produced by strain deformation, said third piezoelectric element including at least one third piezoelectric body and a third support block supporting said third piezoelectric body, said third electrodes being provided on opposite surfaces of said third piezoelectric element; and fourth piezoelectric element having fourth electrodes for outputting a charge produced by strain deformation, said fourth piezoelectric element including at least one fourth piezoelectric body and a fourth support block supporting said fourth piezoelectric body, said fourth electrodes being provided on opposite surfaces of said fourth piezoelectric element, wherein one surface of said first piezoelectric element and one surface of said second piezoelectric element are substantially parallel to each other, wherein first set of piezoelectric elements is mounted to the package, and second set of piezoelectric elements is mounted to the package with the cantilever portions thereof perpendicular to a package surface, wherein one surface of said third piezoelectric element and one surface of said fourth piezoelectric element are substantially parallel to each other, wherein third set of piezoelectric elements is mounted to the package, and fourth set of piezoelectric elements to the package with the cantilever portions thereof parallel to the package surface.

26. An acceleration detection apparatus comprising:

an acceleration sensor comprising an first piezoelectric element and a second piezoelectric element; and a signal processing circuit for processing output signals from said first and second piezoelectric elements, wherein said first piezoelectric element has first electrodes for outputting a charge produced by strain deformation, said first piezoelectric element including at least one first piezoelectric body and a first support block supporting said first piezoelectric body, said first electrodes being provided on opposite surfaces of said first piezoelectric element, wherein said second piezoelectric element has second electrodes for outputting a charge produced by strain deformation, said second piezoelectric element including at least one second piezoelectric body and a second support block supporting said second piezoelectric body, said second electrodes being provided on opposite surfaces of said second piezoelectric element, and wherein one surface of said first piezoelectric element and one surface of said second piezoelectric element are substantially parallel to each other.

27. An acceleration detection apparatus as described in claim 26, wherein said first and second piezoelectric elements are connected to said signal processing circuit to output same-polarity output signals for acceleration in the same direction, and wherein said signal processing circuit is operable to determine the difference between the output signals.

28. An acceleration detection apparatus as described in claim 26, wherein said first and second piezoelectric elements are connected to said signal processing circuit to output opposite-polarity output signals for acceleration in the same direction, and wherein said signal processing circuit is operable to determine the sum of the output signals.

29. An acceleration detection apparatus as described in claim 26, wherein said signal processing circuit includes a circuit operable to detect angular acceleration from the difference of an output from said first piezoelectric element and an output from said second piezoelectric element.

30. An acceleration detection apparatus as described in claim 26, wherein said signal processing circuit is operable to adjust an output thereof so that a sensitivity of said first piezoelectric element and a sensitivity of said second piezoelectric element are substantially equal.

31. An acceleration detection apparatus as described in claim 26, wherein said signal processing circuit comprises:

one impedance converting circuit operable to convert an output signal impedance from said first piezoelectric element and said second piezoelectric element; and an amplifier circuit operable to amplify the converted output signals.

32. An acceleration detection apparatus as described in claim 26, wherein said signal processing circuit comprises:

two impedance converting circuits for converting output signal impedance from said first and second piezoelectric elements; and an adding circuit for adding signals from said two impedance converting circuits.

33. An acceleration detection apparatus as described in claim 26, wherein said signal processing circuit comprises:

two impedance converting circuits for converting output signal impedance from said first and second piezoelectric elements; and a differential amplifier circuit for detecting and amplifying a difference between signals from said two impedance converting circuits.

34. An acceleration detection apparatus as described in claim 26, further comprising a plurality of output terminals operable to simultaneously externally output impedance-converted piezoelectric element output signals and amplified output of converted output after impedance conversion.

35. An acceleration detection apparatus as described in claim 26, further comprising a package, wherein said first piezoelectric elements comprises a first cantilever portion, and wherein said second piezoelectric element comprises a second cantilever portion, and wherein said first piezoelectric element is fixed, at said first support block, in said package, and said second piezoelectric element is fixed, at said second support block, in said package, whereby said first and second cantilever portions can vibrate freely, and wherein said signal processing circuit is housed inside said package.

36. A positioning apparatus comprising:

an acceleration detection apparatus comprising an acceleration sensor, including a first piezoelectric element and a second piezoelectric element, and a signal processing circuit for processing output signals from said first and second piezoelectric elements;

an object mover operable to move an object; and a controller operable to control said object mover to move and position the object based on an output signal from said acceleration detection apparatus corresponding to detected acceleration, wherein said first piezoelectric element has first electrodes for outputting a charge produced by strain deformation, said first piezoelectric element including at least one first piezoelectric body and a first support block supporting said first piezoelectric body, said first electrodes being provided on opposite surfaces of said first piezoelectric element, wherein said second piezoelectric element has second electrodes for outputting a charge produced by strain deformation, said second piezoelectric element including at least one second piezoelectric body and a second support block supporting said second piezoelectric body, said second electrodes being provided on opposite surfaces of said second piezoelectric element, and wherein one surface of said first piezoelectric element and one surface of said second piezoelectric element are substantially parallel to each other.

37. A position apparatus as described in claim 36, wherein said first piezoelectric element comprises a first cantilever portion, and wherein said second piezoelectric element comprises a second cantilever portion, and wherein said cantilever portions of said first and second piezoelectric elements of said acceleration detection apparatus are provided substantially parallel to an object supporter operable to support the object.

38. A disk recording and reading apparatus comprising:

an acceleration detection apparatus comprising an acceleration sensor, including a first piezoelectric element and a second piezoelectric element, and a signal processing circuit for processing output signals from said first and second piezoelectric elements;

a head mover operable to move a head for recording to and reading from a disk; and a controller operable to control said head mover, wherein said first piezoelectric element has first electrodes for outputting a charge produced by strain deformation, said first piezoelectric element including at least one first piezoelectric body and a first support block supporting said first piezoelectric body, said first electrodes being provided on opposite surfaces of said first piezoelectric element, wherein said second piezoelectric element has second electrodes for outputting a charge produced by strain deformation, said second piezoelectric element including at least one second piezoelectric body and a second support block supporting said second piezoelectric body, said second electrodes being provided on opposite surfaces of said second piezoelectric element, wherein one surface of said first piezoelectric element and one surface of said second piezoelectric element are substantially parallel to each other, and wherein said controller is operable to calculate movement of said head based on an output signal from said acceleration detection apparatus corresponding to detected acceleration, and to move and position said head via said head mover.

39. A disk recording and reading apparatus as described in claim 38, wherein said first piezoelectric element comprises a first cantilever portion, and wherein said second piezoelectric element comprises a second cantilever portion, and wherein said cantilever portion of said first and second piezoelectric elements of said acceleration detection apparatus are provided substantially parallel to an arm supporting said head.

* * * * *

UNITED STATES PATENT AND TRADEMARK OFFICE
CERTIFICATE OF CORRECTION

PATENT NO.    : 6,629,462 B2  
DATED         : November 7, 2003  
INVENTOR(S)   : Tetsuro Otsuchi et al.

It is certified that error appears in the above-identified patent and that said Letters Patent is hereby corrected as shown below:

Column 37,  
Line 1, please replace "claim 6" with -- claim 5 --.

Signed and Sealed this

Eleventh Day of May, 2004

JON W. DUDAS  
*Acting Director of the United States Patent and Trademark Office*